(12) United States Patent
Thompson et al.

(10) Patent No.: US 7,516,410 B2
(45) Date of Patent: Apr. 7, 2009

(54) METHOD AND SYSTEM FOR SUPPORTING COMMUNICATIONS WITHIN A VIRTUAL TEAM ENVIRONMENT

(75) Inventors: Christopher Thompson, Manotick (CA); Brian F. Beaton, Ottawa (CA); Clifford P. Grossner, Nepean (CA); Douglas E. Liversidge, Kanata (CA); Roman Romaniuk, Ottawa (CA); Colin D. R. Smith, Ottawa (CA); James F. Zdralek, Ottawa (CA); Jean J. Bouchard, Sillery (CA); Stéphane F. Fortier, Breakeyville (CA); Denis Mercier, Boischatel (CA); L. Lloyd Williams, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 327 days.

(21) Appl. No.: 11/274,280

(22) Filed: Nov. 16, 2005

(65) Prior Publication Data

US 2006/0070003 A1 Mar. 30, 2006

Related U.S. Application Data

(63) Continuation of application No. 09/738,293, filed on Dec. 18, 2000, now abandoned.

(51) Int. Cl.
*G06F 3/00* (2006.01)

(52) U.S. Cl. ...................................... 715/753; 715/758

(58) Field of Classification Search ................. 715/753, 715/755, 757, 751, 752, 754, 756, 758; 709/203, 709/204, 222, 223, 249, 250
See application file for complete search history.

(56) References Cited

U.S. PATENT DOCUMENTS

| 5,437,009 A | * | 7/1995 | Lane | 715/772 |
| 6,559,863 B1 | * | 5/2003 | Megiddo | 715/753 |
| 7,240,093 B1 | * | 7/2007 | Danieli et al. | 715/733 |

* cited by examiner

*Primary Examiner*—Weilun Lo
*Assistant Examiner*—Truc T Chuong
(74) *Attorney, Agent, or Firm*—Kent Daniels; Blake, Cassels & Graydon LLP

(57) ABSTRACT

A collaboration services suite is adapted to support a plurality of integrated telecommunications services accessed by geographically dispersed team members using a virtual team environment (VTE) client that generates a graphical user interface (GUI) for each of the respective team members. Communications sessions are automatically set up by the collaboration services suite in response to request messages generated by the VTE client when a team member initiates a communications session request using the GUI. Team members require no knowledge of another team member's communications device address in order to initiate a communications session. The collaboration services suite includes a VTE server that communicates with the VTE clients, a presence engine that collects and maintains a status of communications devices specified in a current profile of the team member; and, a call server for handling setup and control of a voice component of each communications session completed.

52 Claims, 39 Drawing Sheets

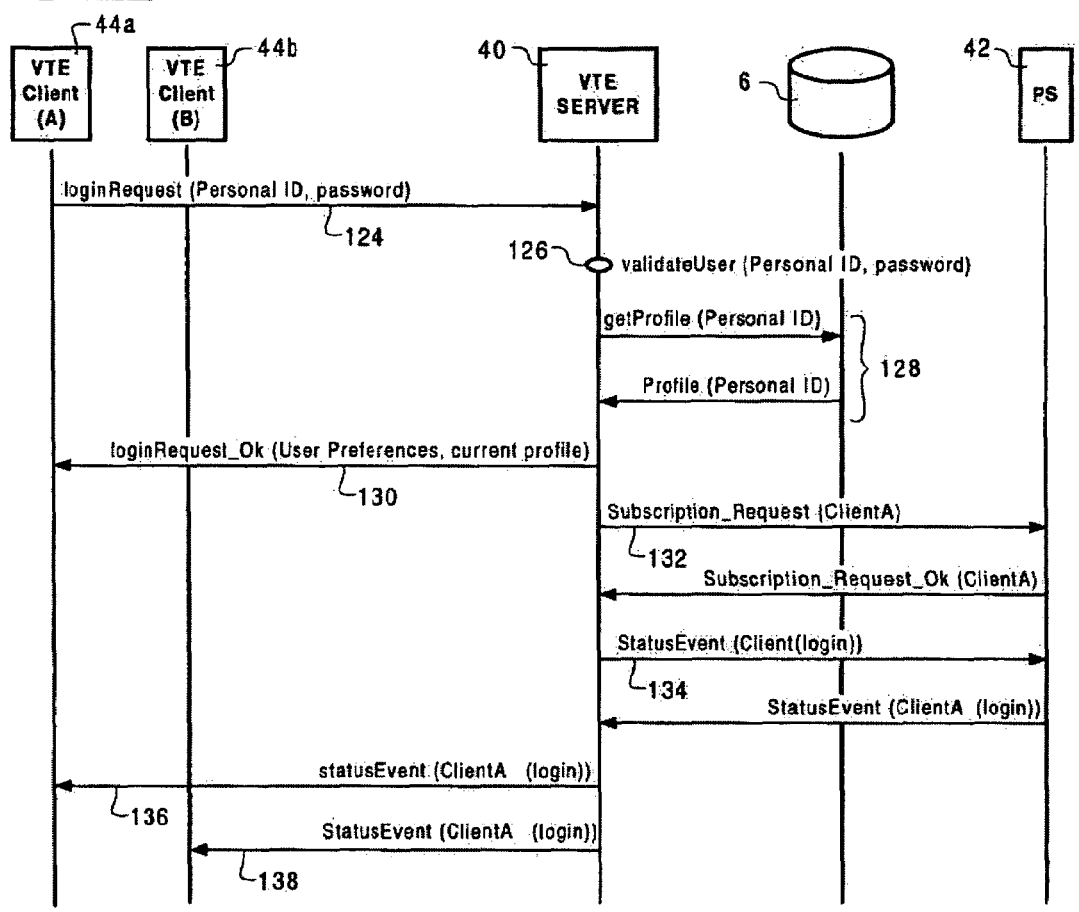
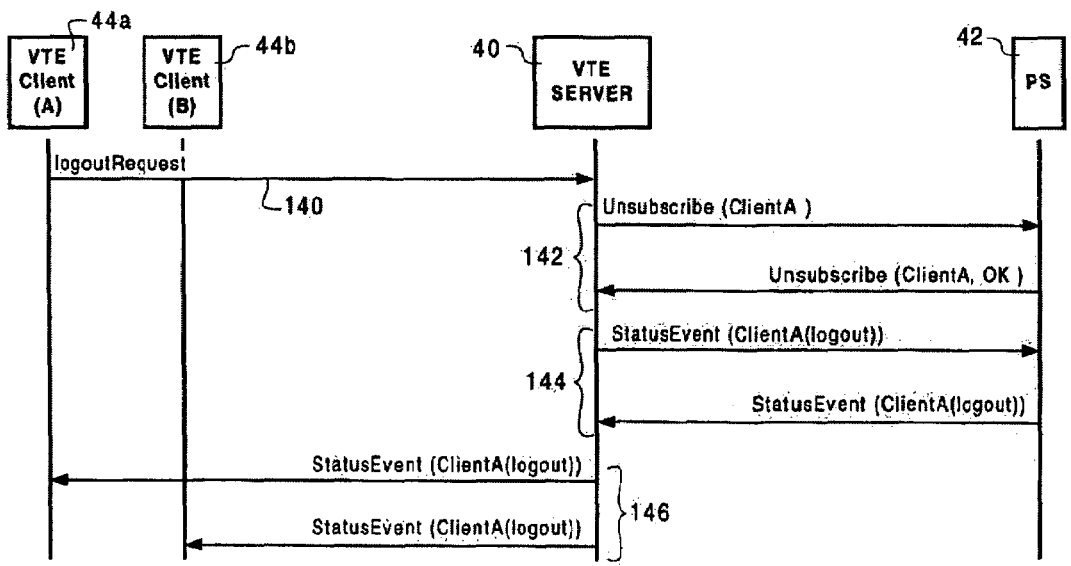

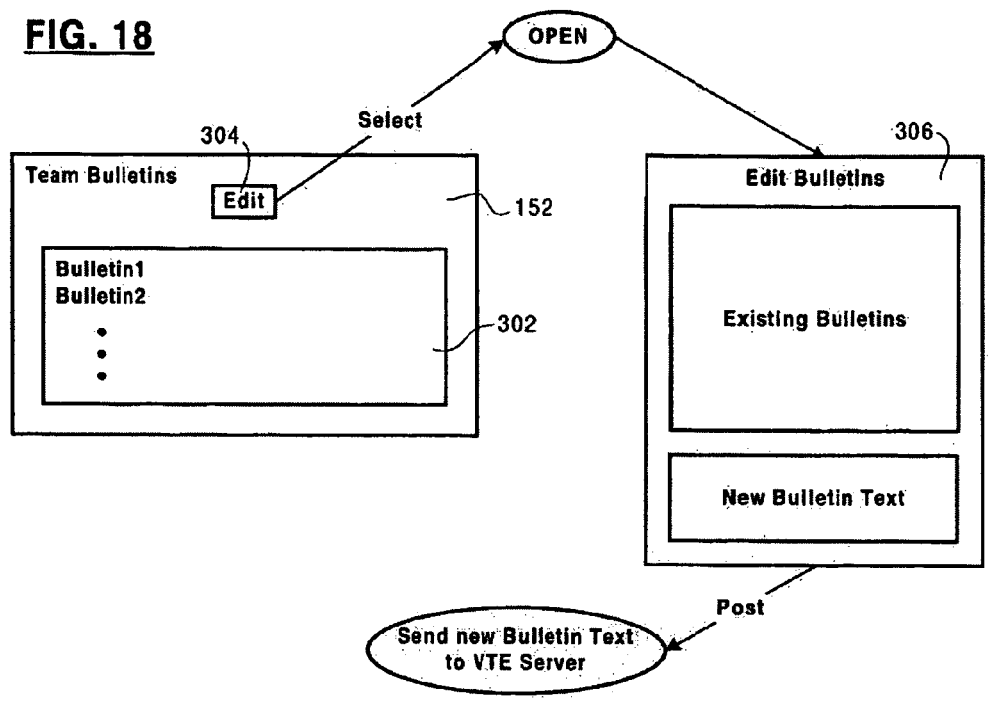

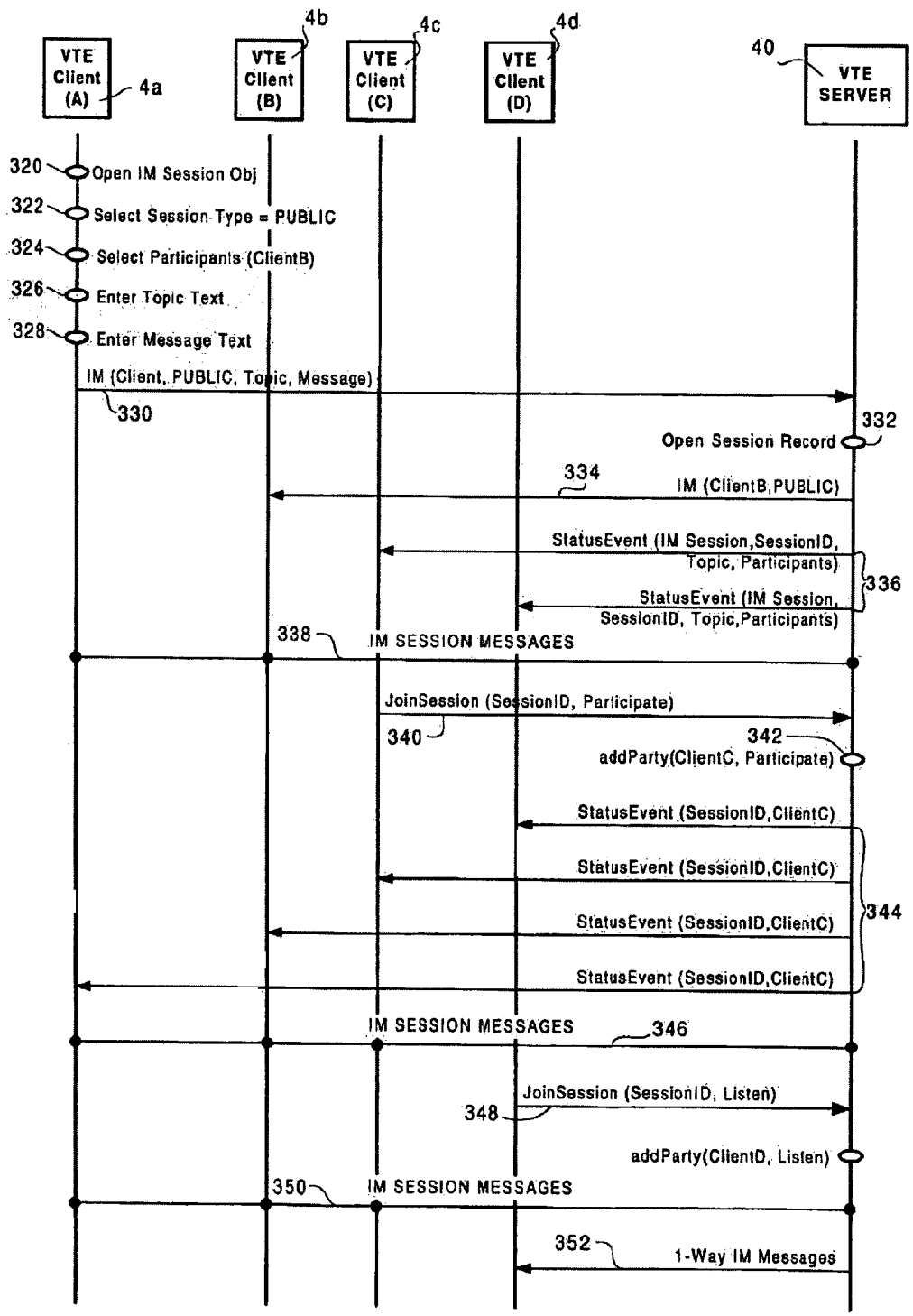

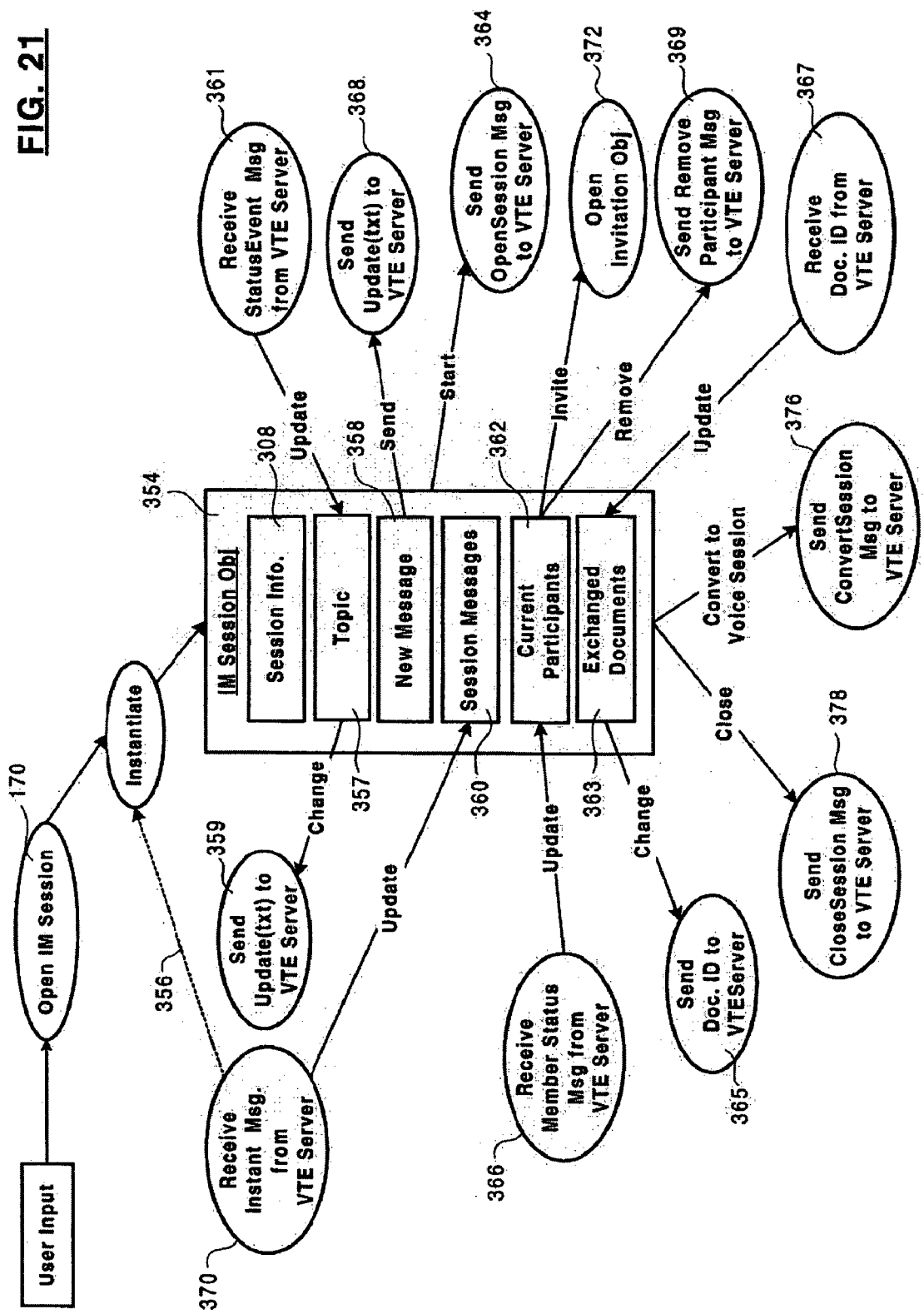

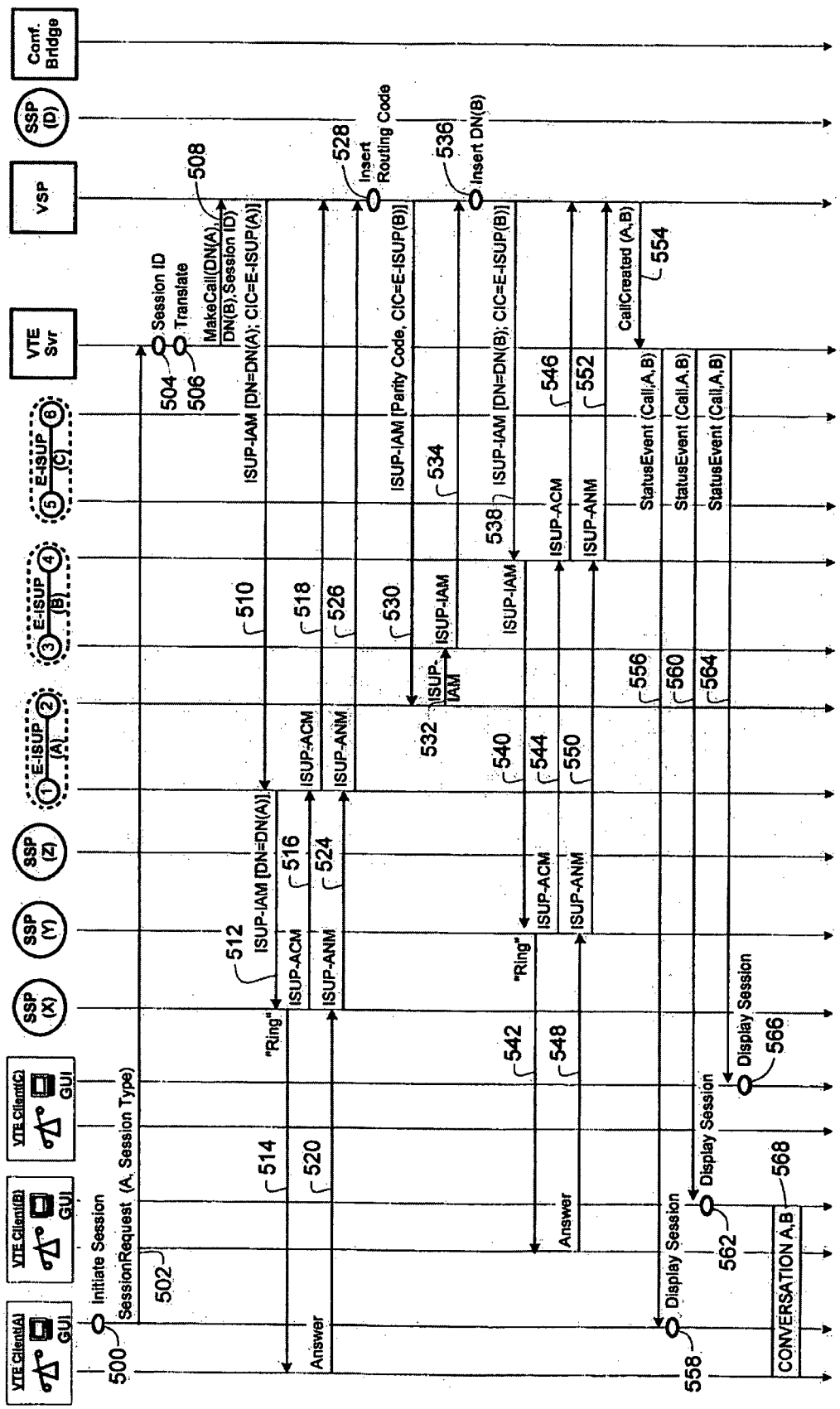
FIG. 26 Set Up 2-Way Voice Communications Session

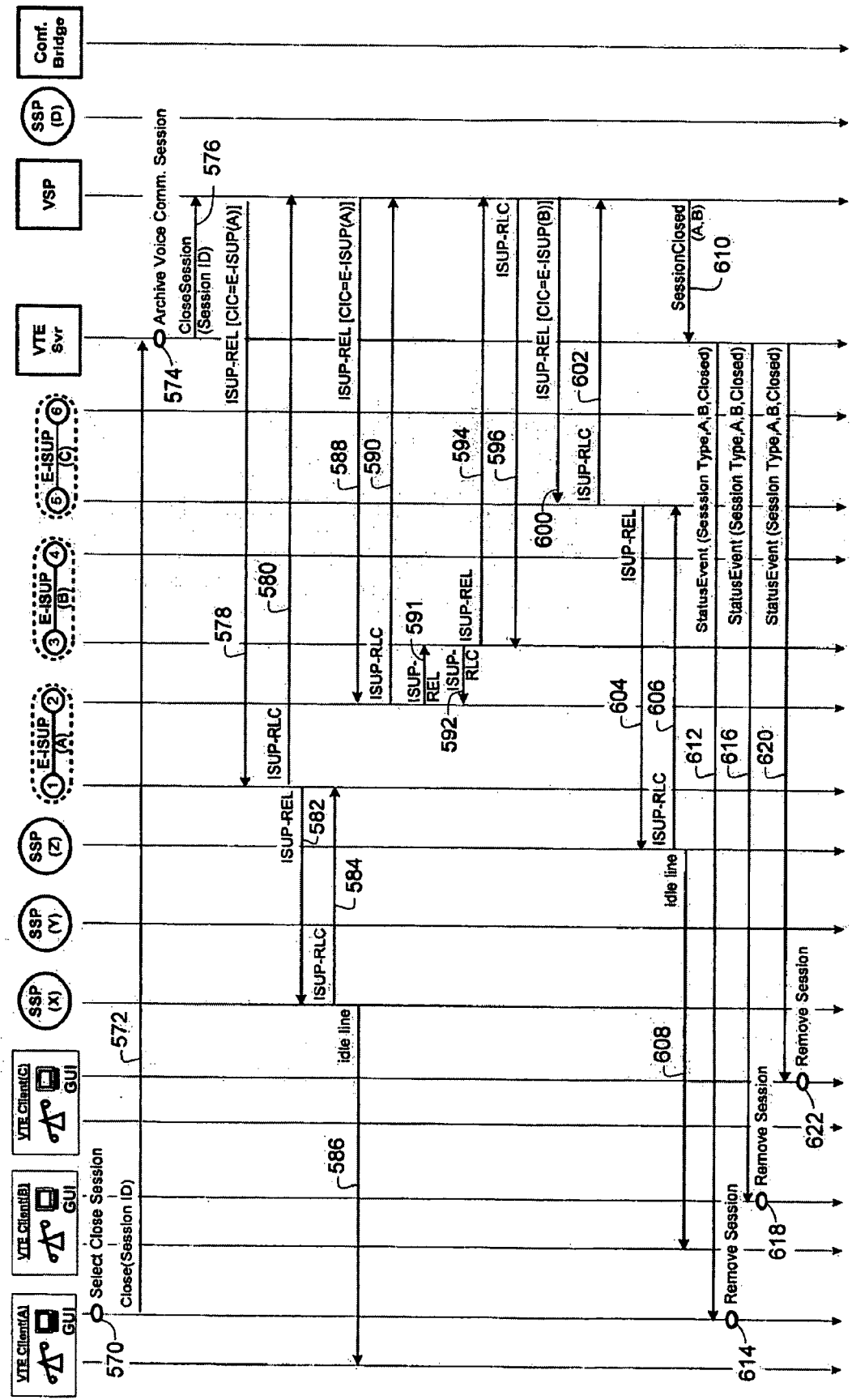

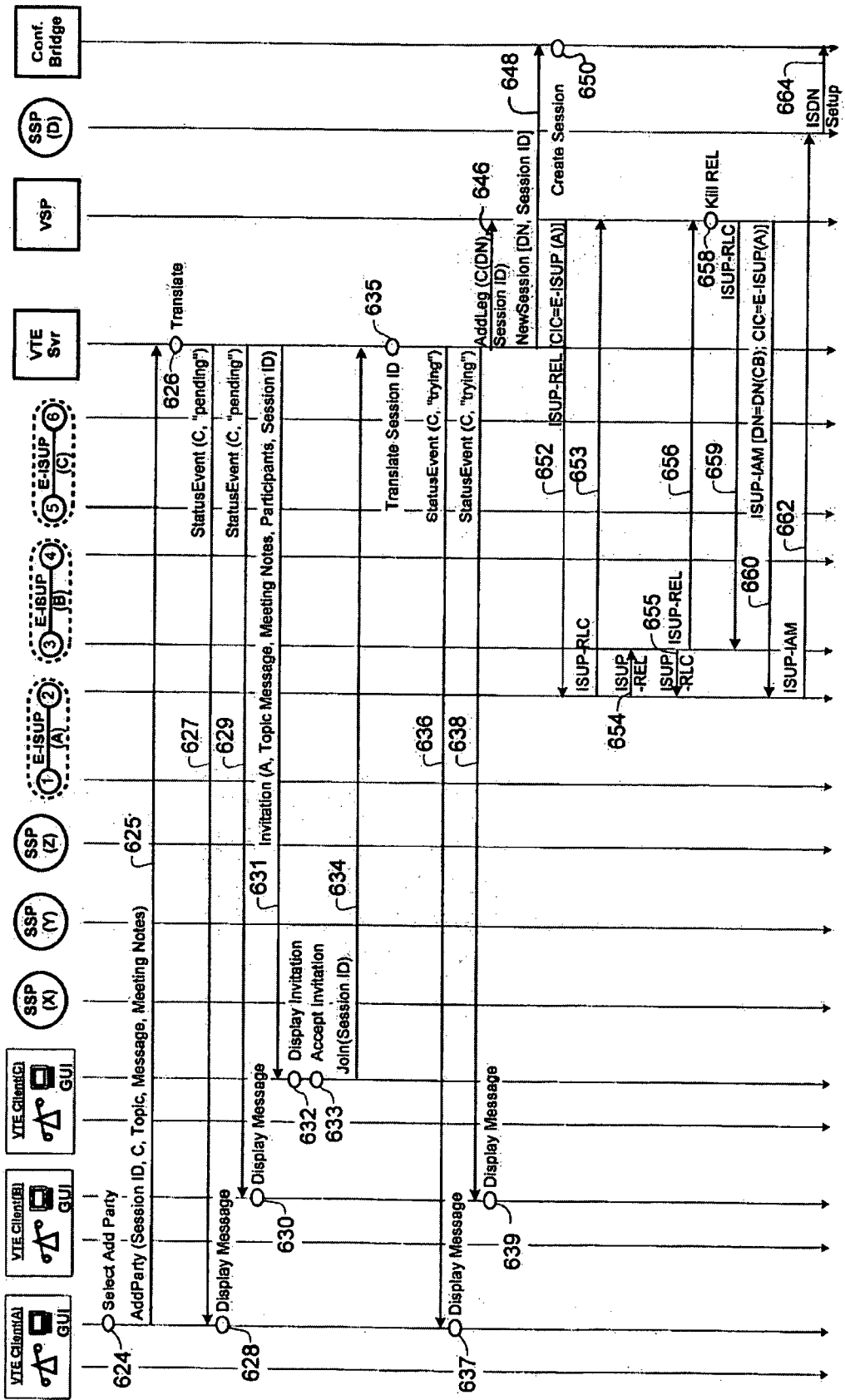
FIG. 28 Add 3rd Party to 2-Way Voice Communications Session - PSTN

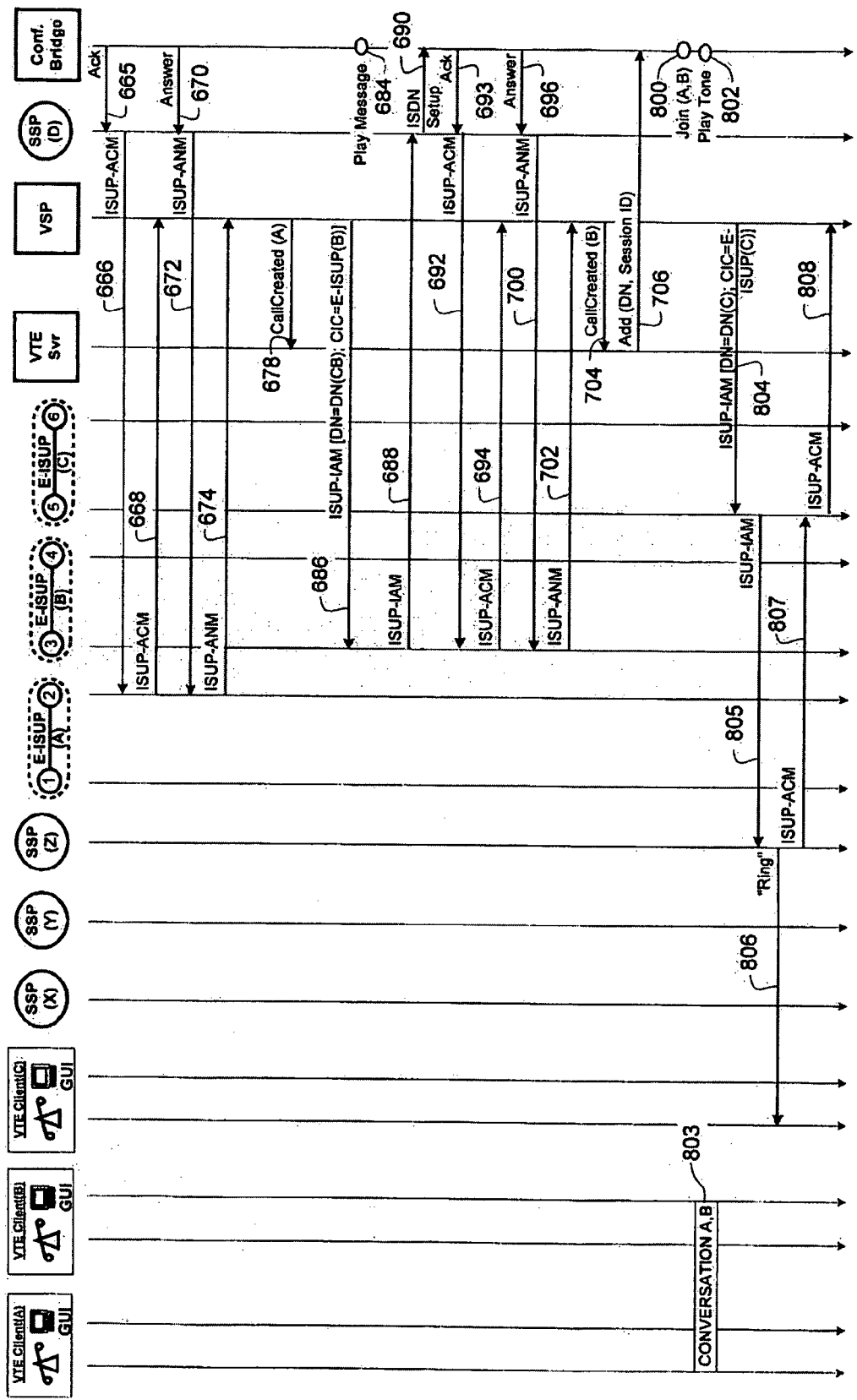

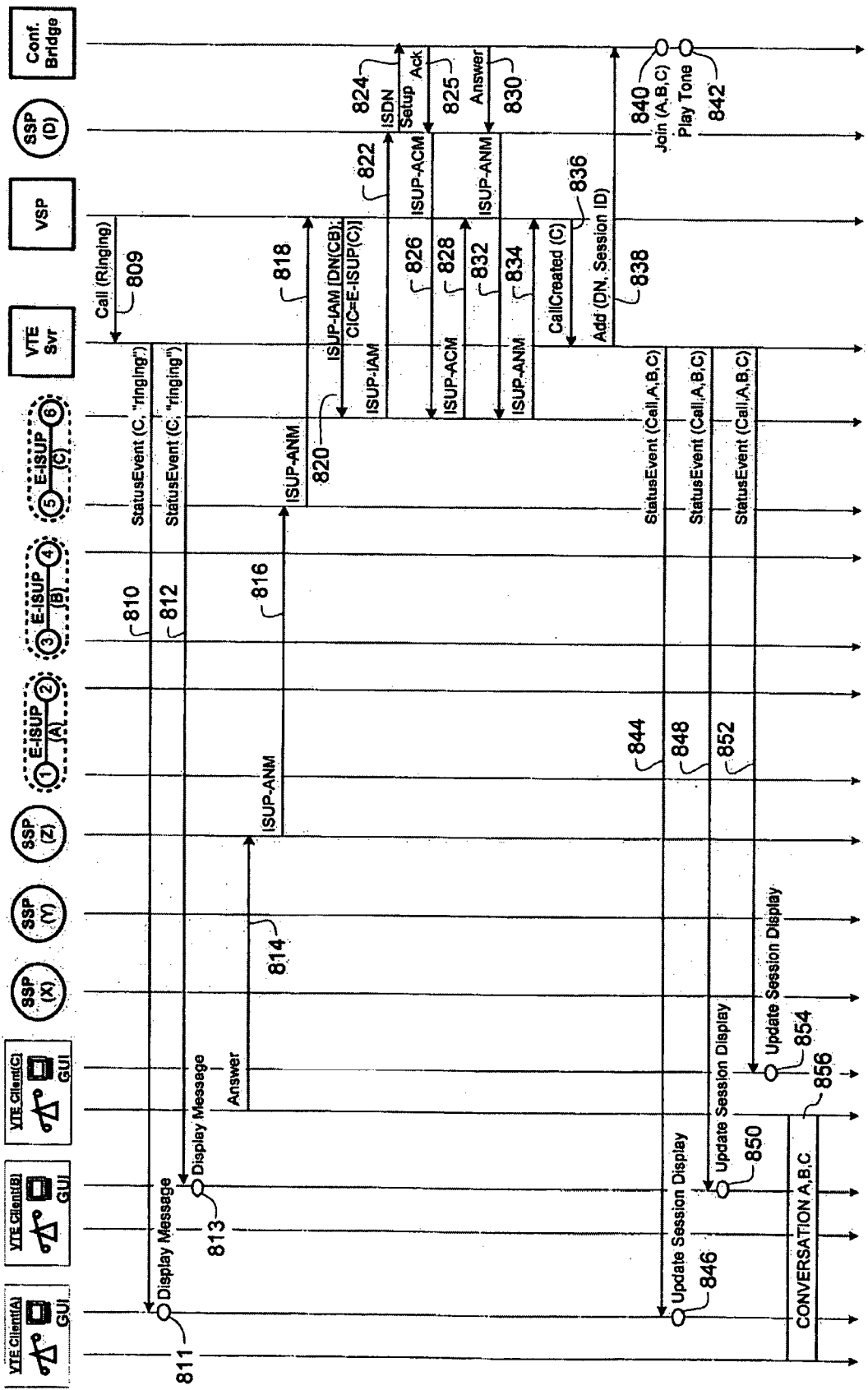
FIG. 28b Add 3rd Party to 2-Way Voice Communications Session - PSTN (Cont.)

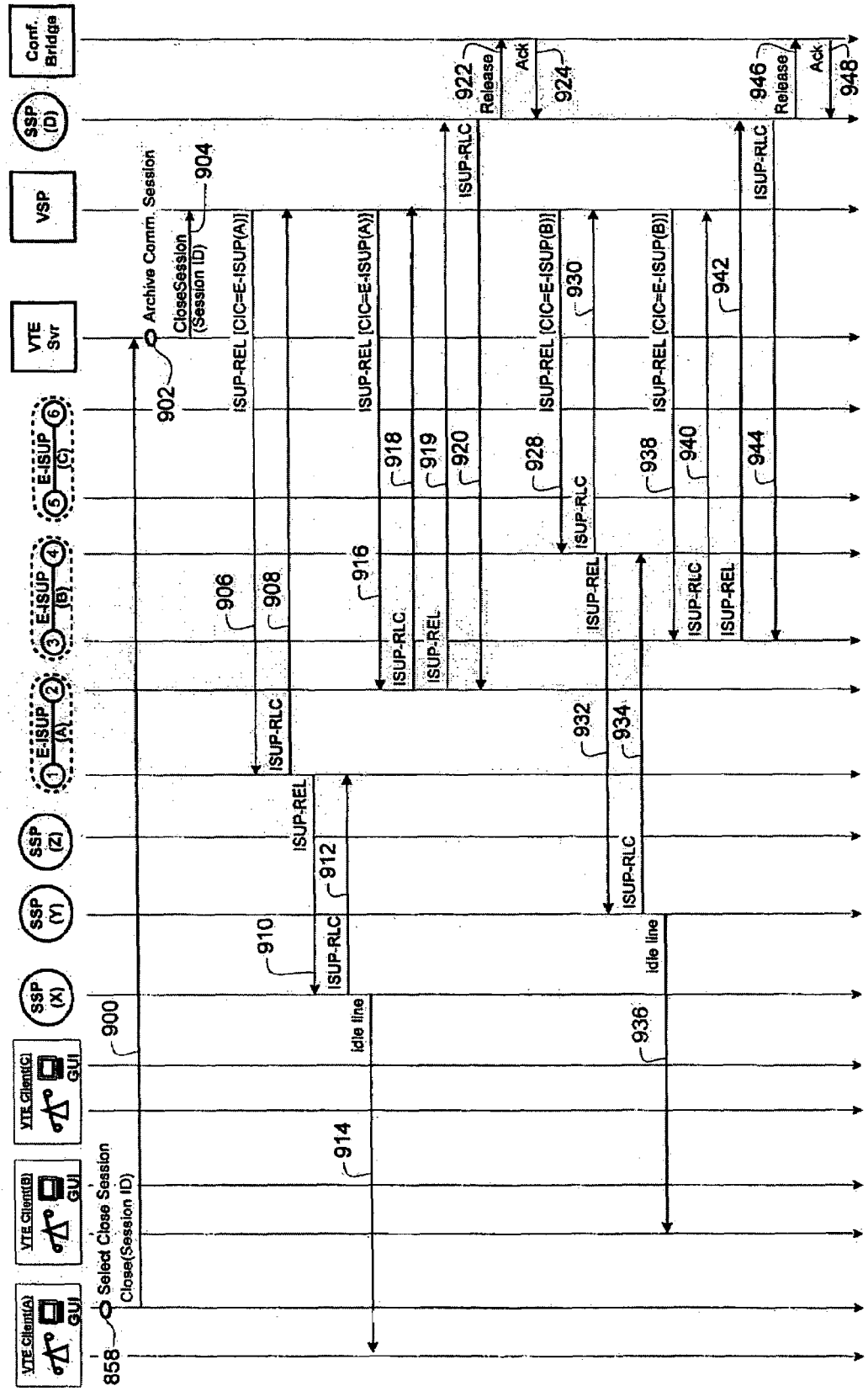
FIG. 29  Close 3-Way Voice Communications Session

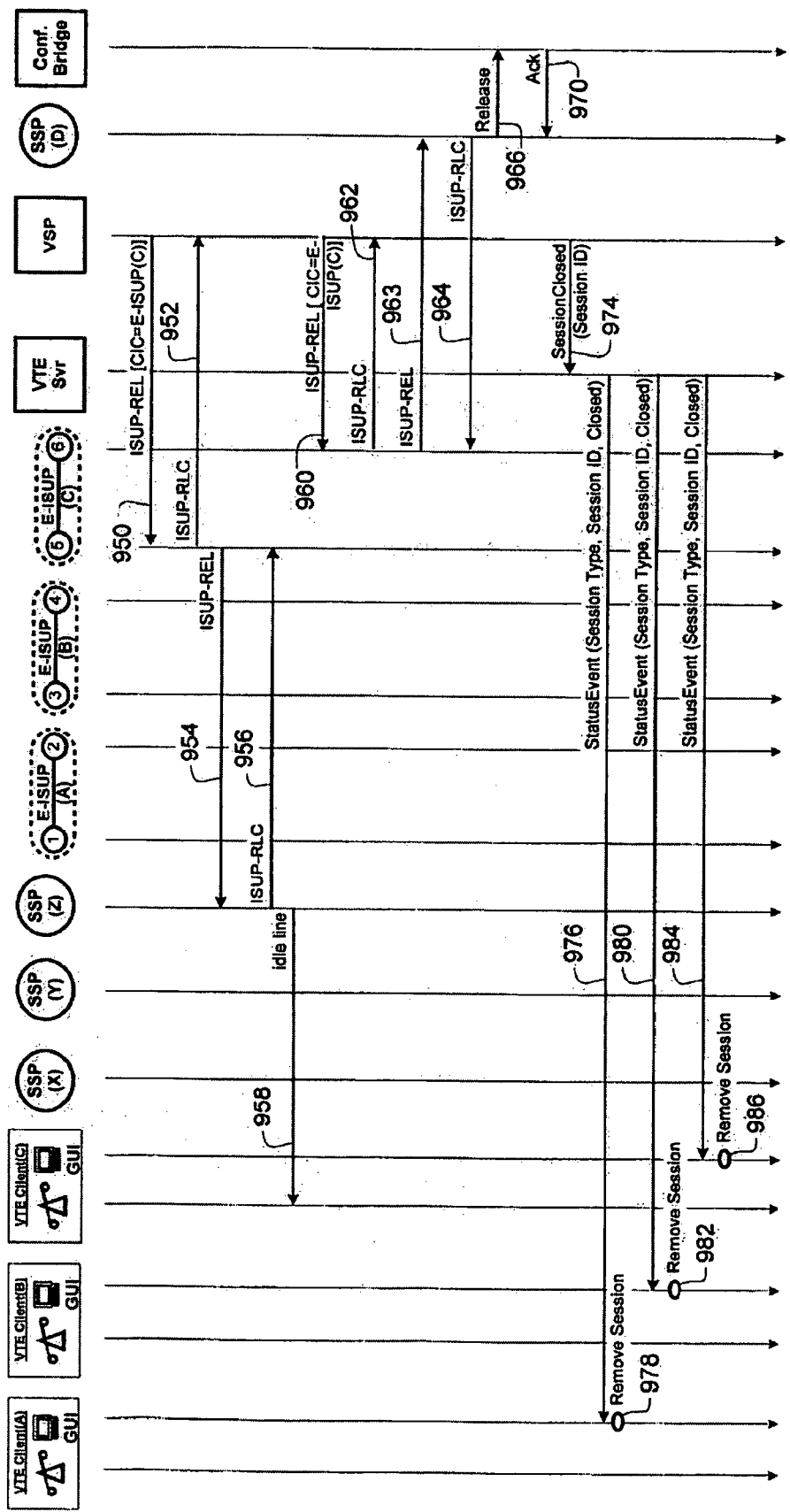
FIG. 29a  Close 3-Way Voice Communications Session (Cont.)

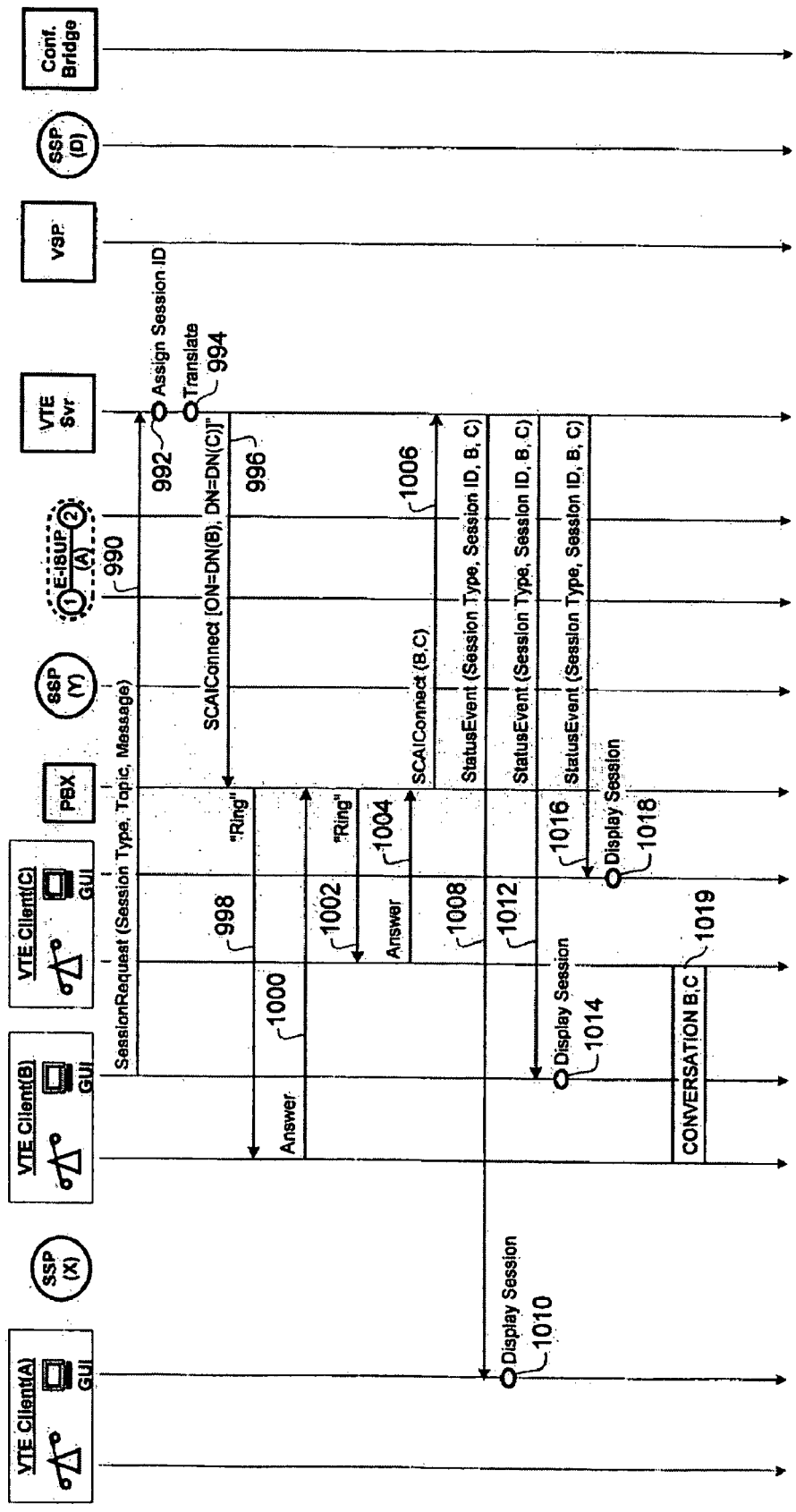
FIG. 30 Set Up 2-Way Voice Communications Session - Enterprise Network

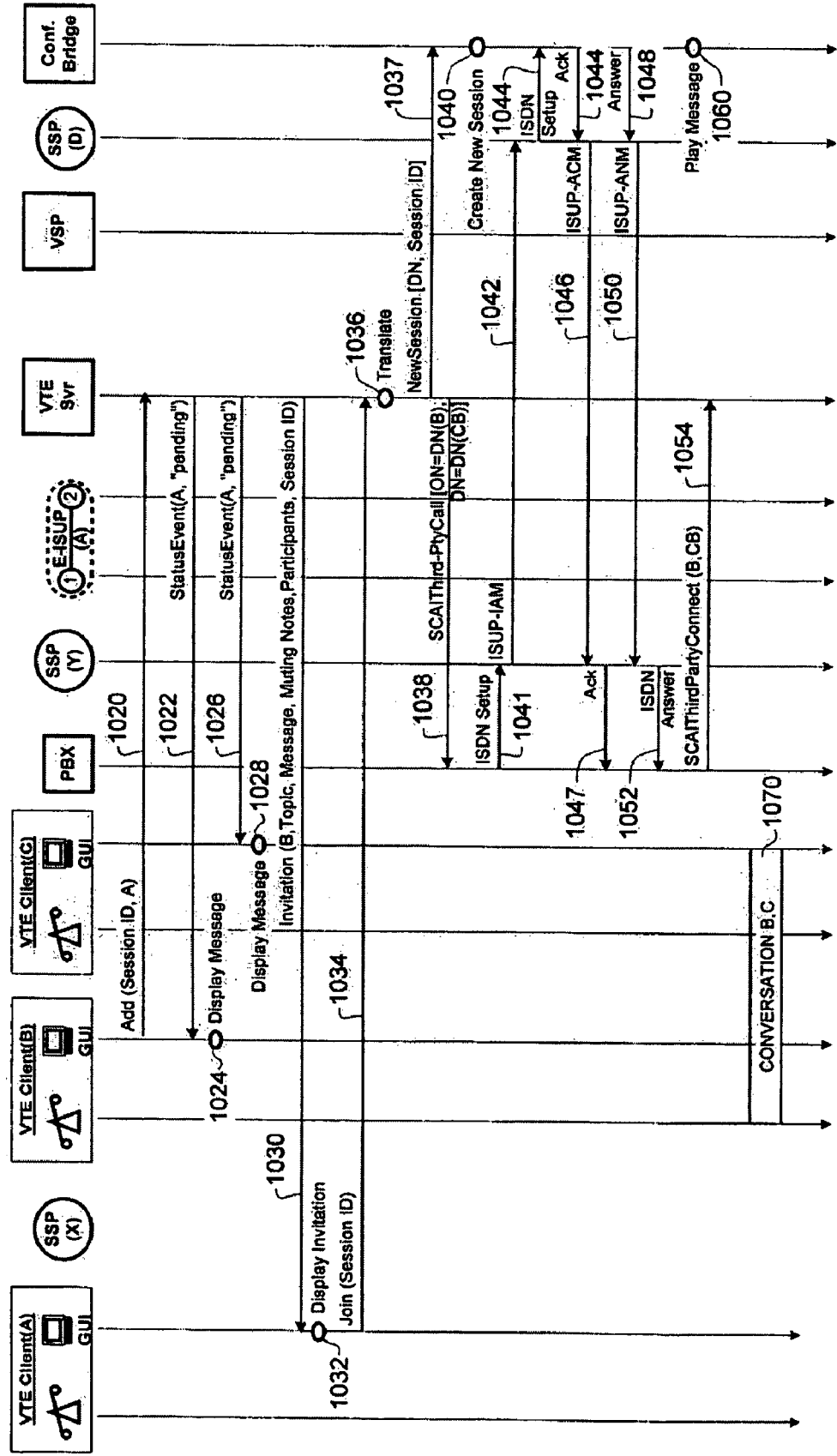

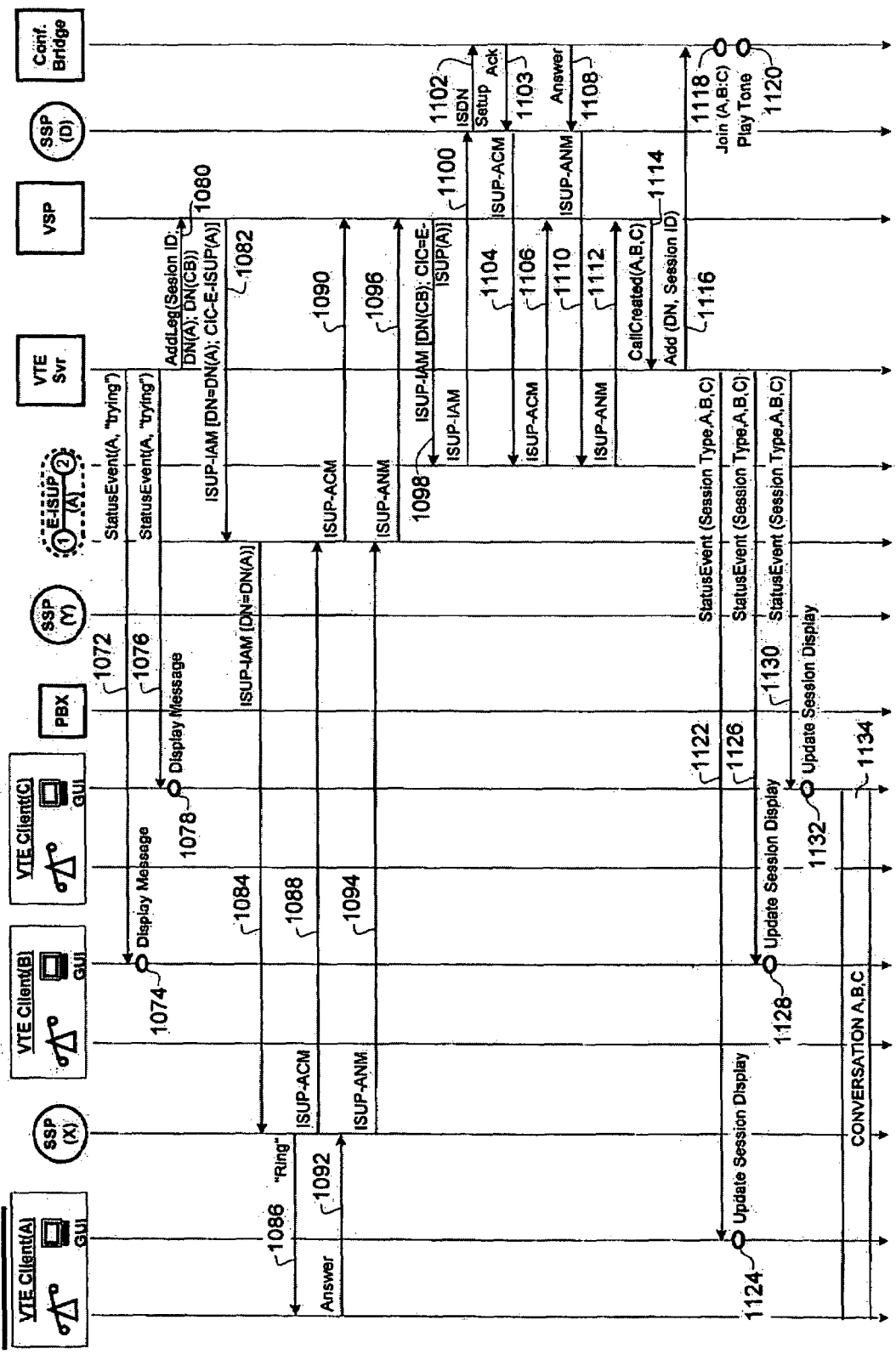
FIG. 31a Add 3rd Party to 2-Way Voice Communications Session – Enterprise Network (Cont.)

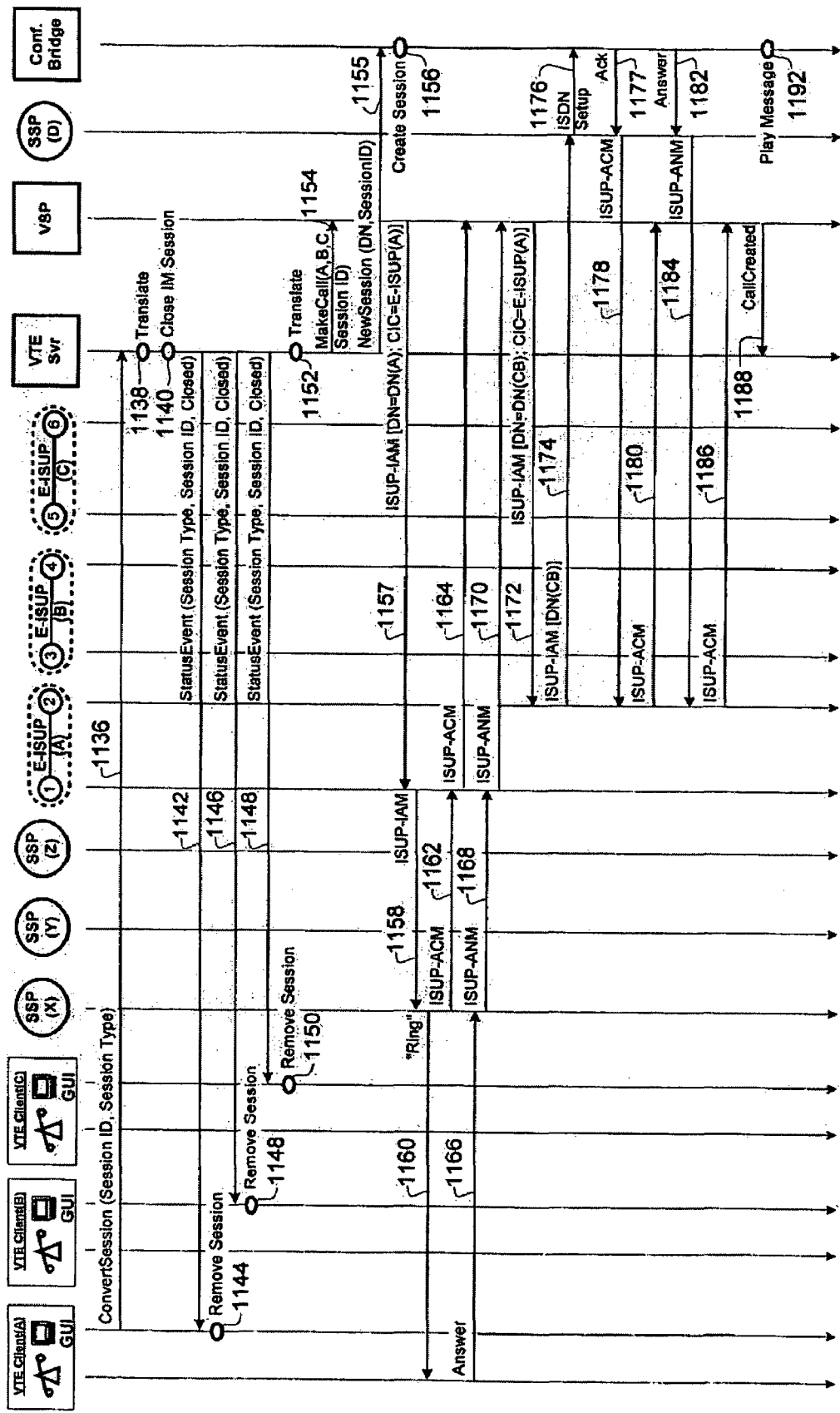
FIG. 32 Convert 3-Way IM Session to 3-Way Voice Communications Session

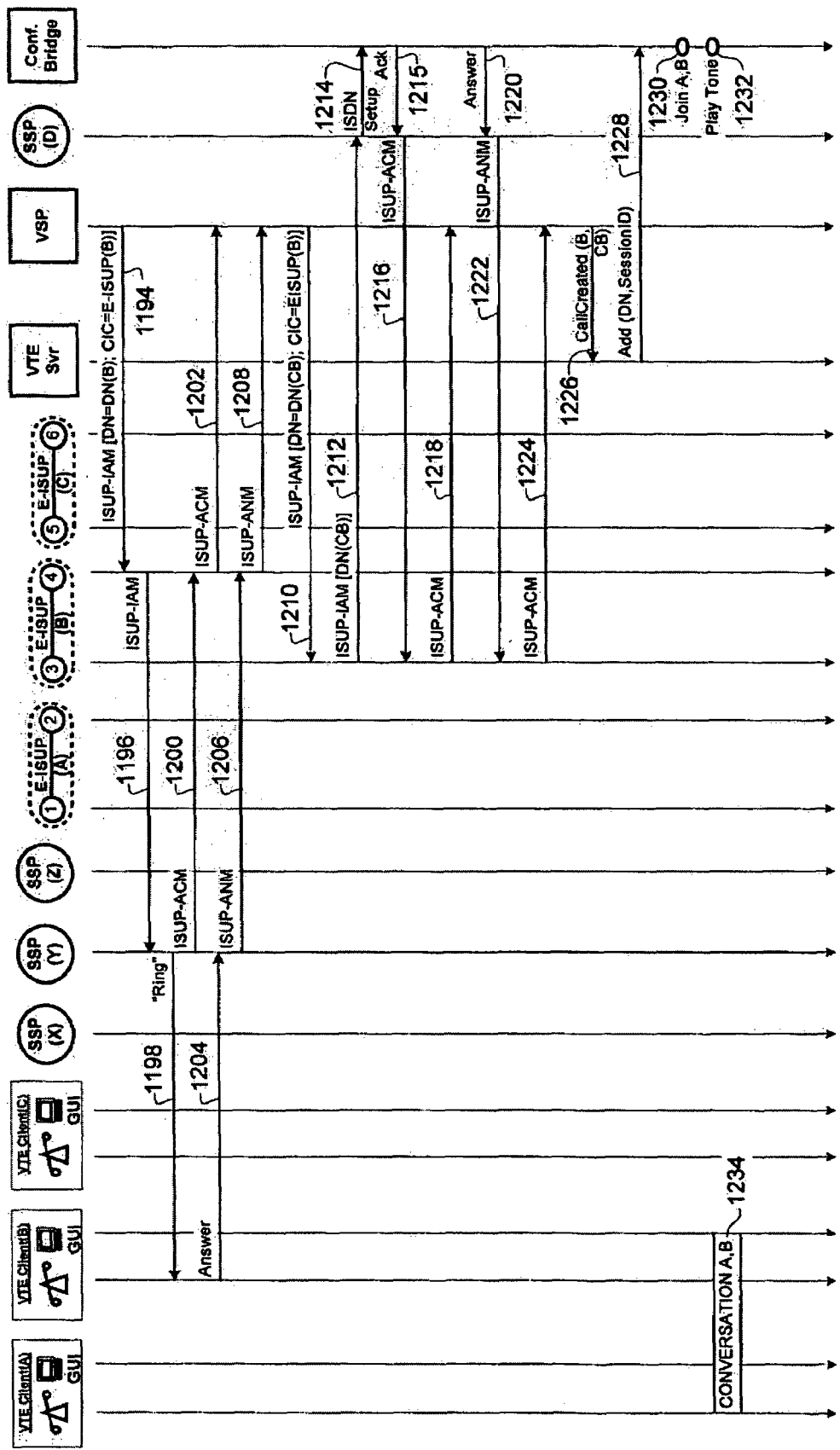
FIG. 32a Convert 3-Way IM Session to 3-Way Voice Communications Session (Cont.)

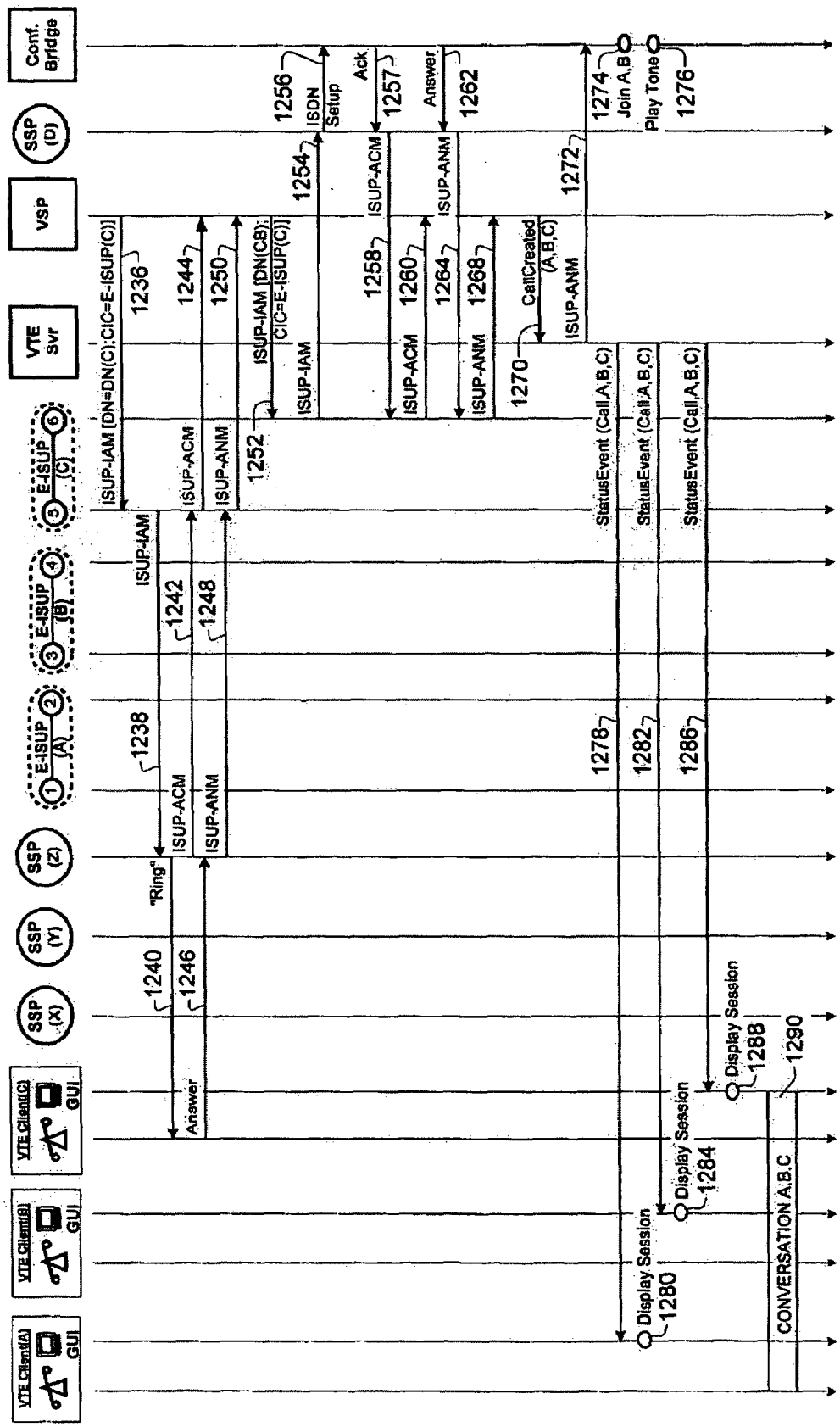
FIG. 32b Convert 3-Way IM Session to 3-Way Voice Communications Session (Cont.)

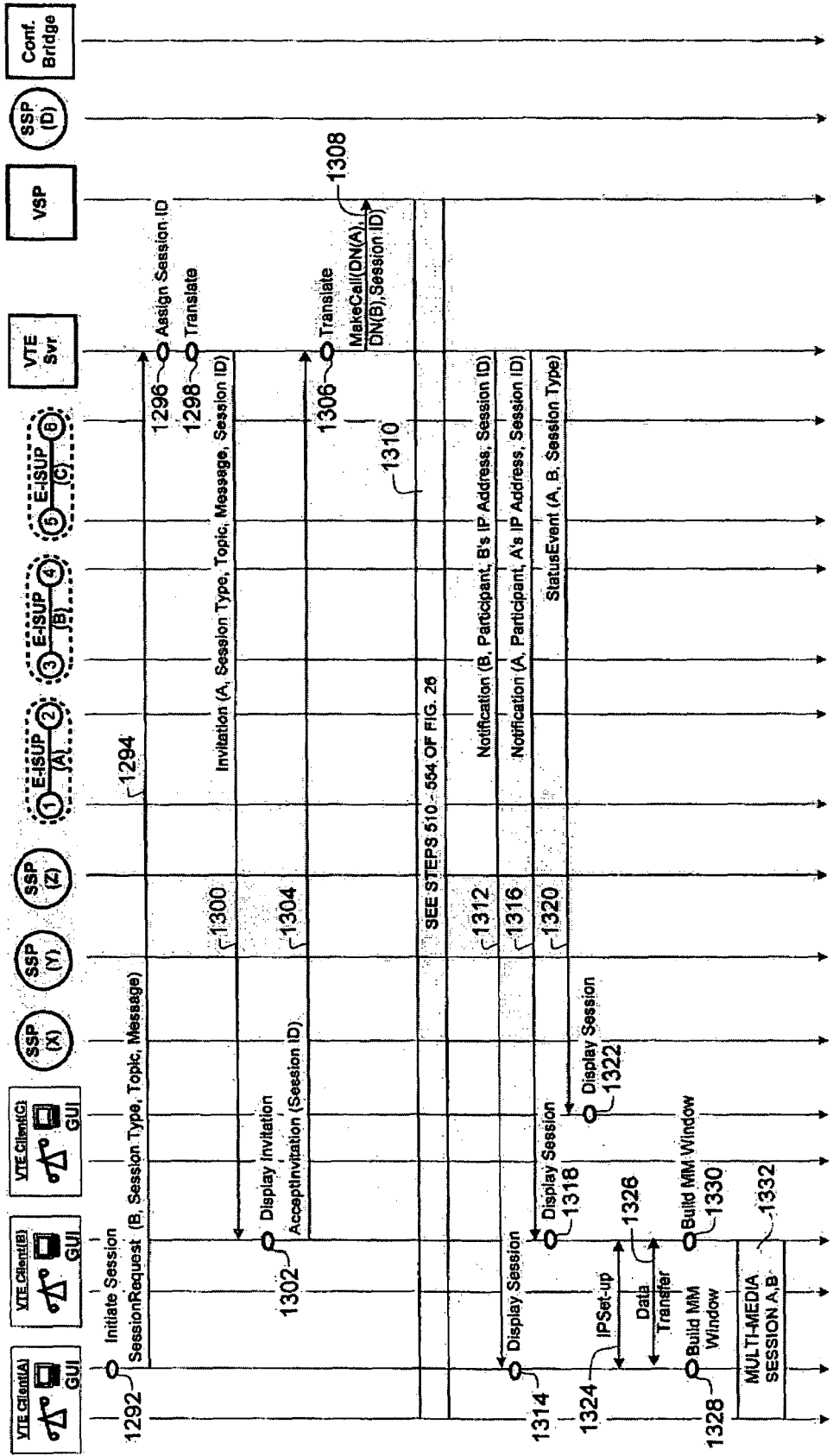

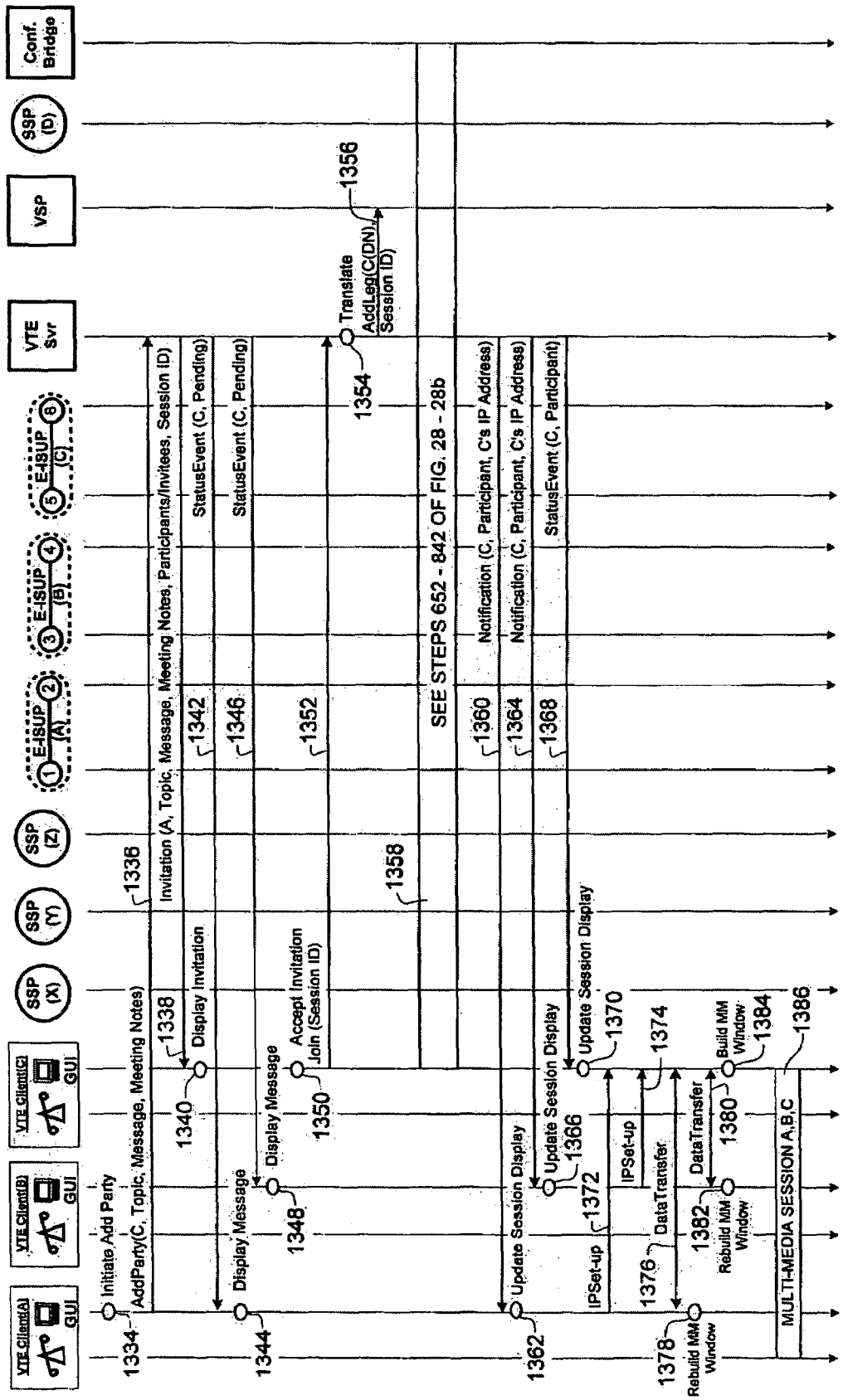
FIG. 34 Add 3rd Party to Multi-media Session

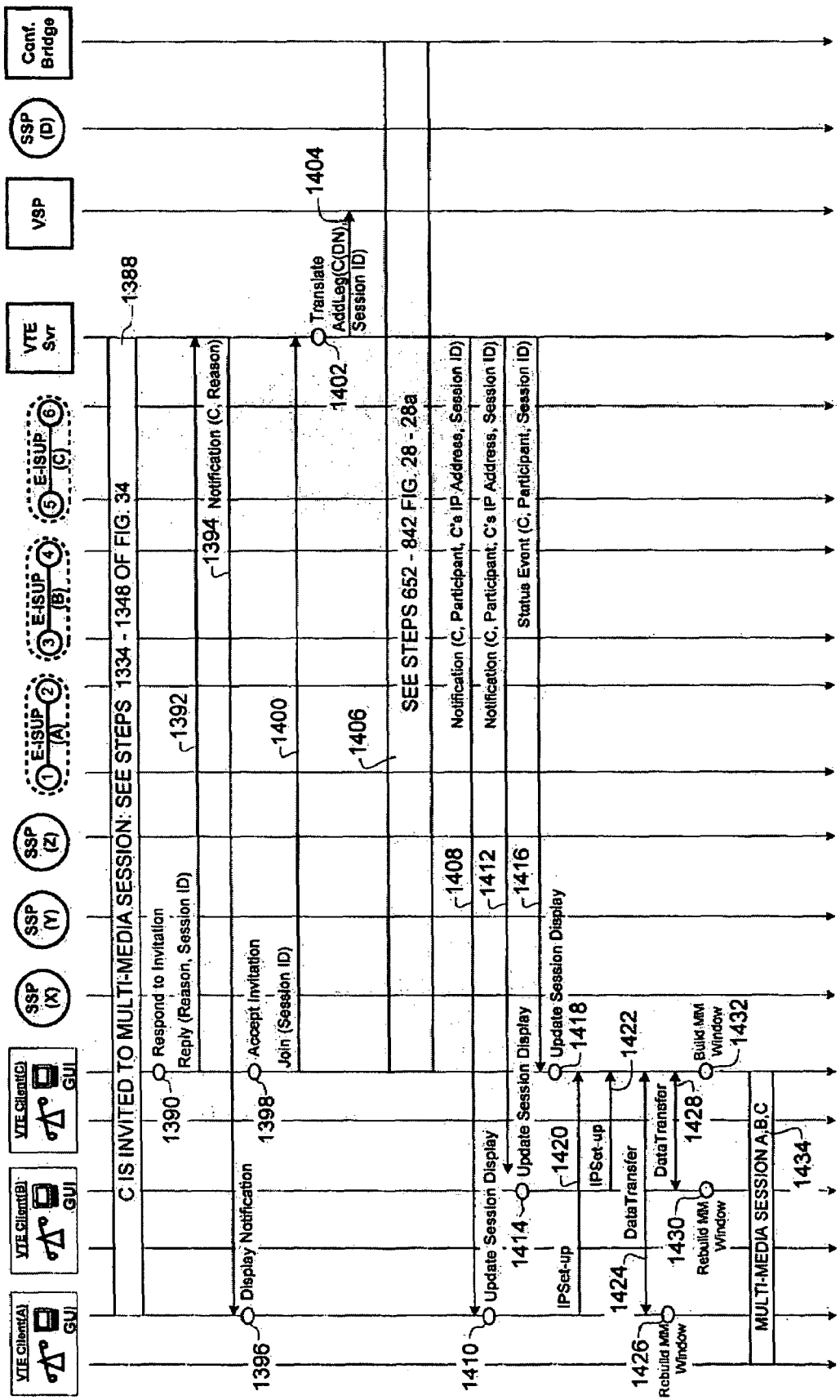
FIG. 35 Add 3rd Party to Multi-media Session (Deferred Acceptance)

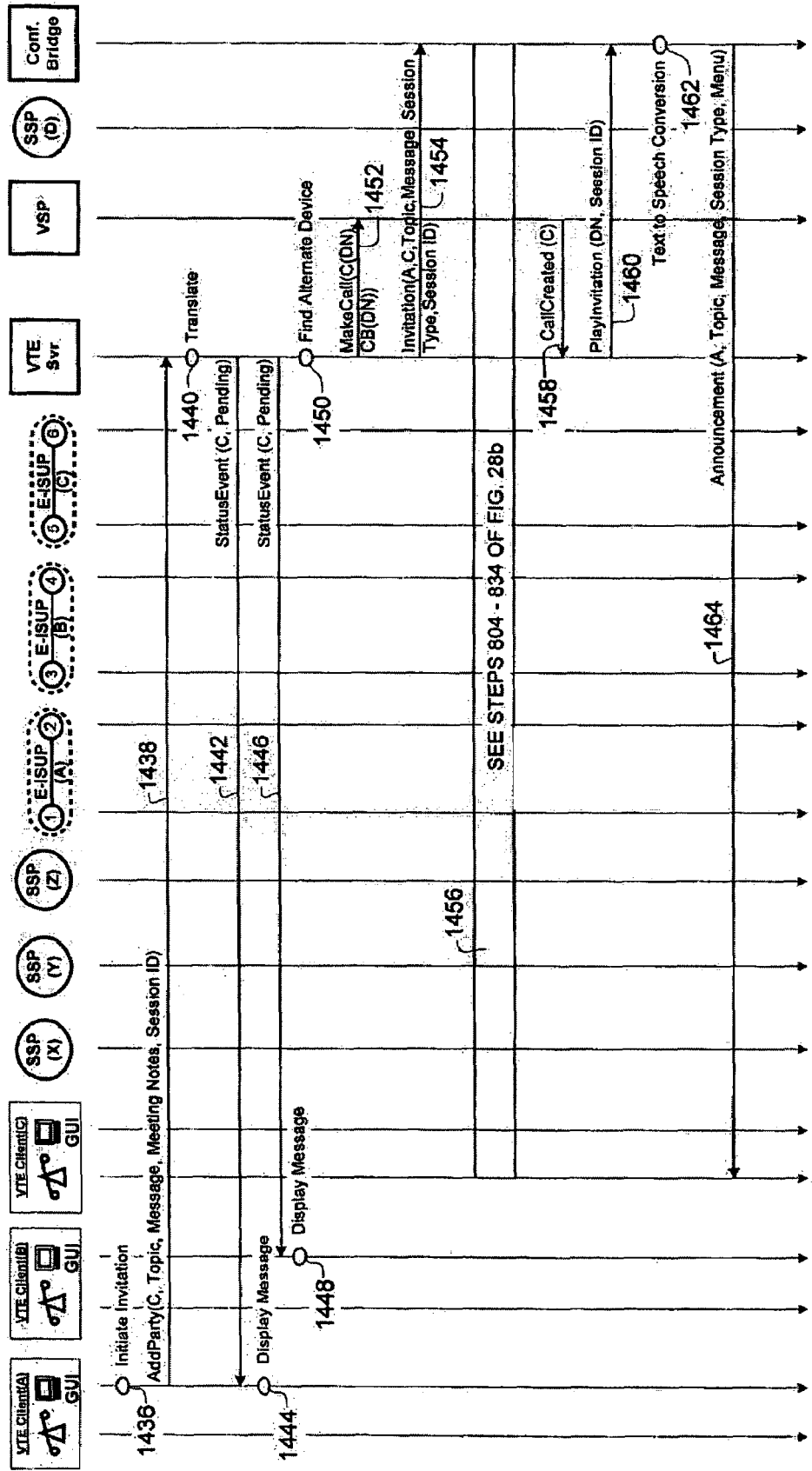
FIG. 36 Add 3rd Party to Multi-media Session (3rd Party Not Logged to VTE)

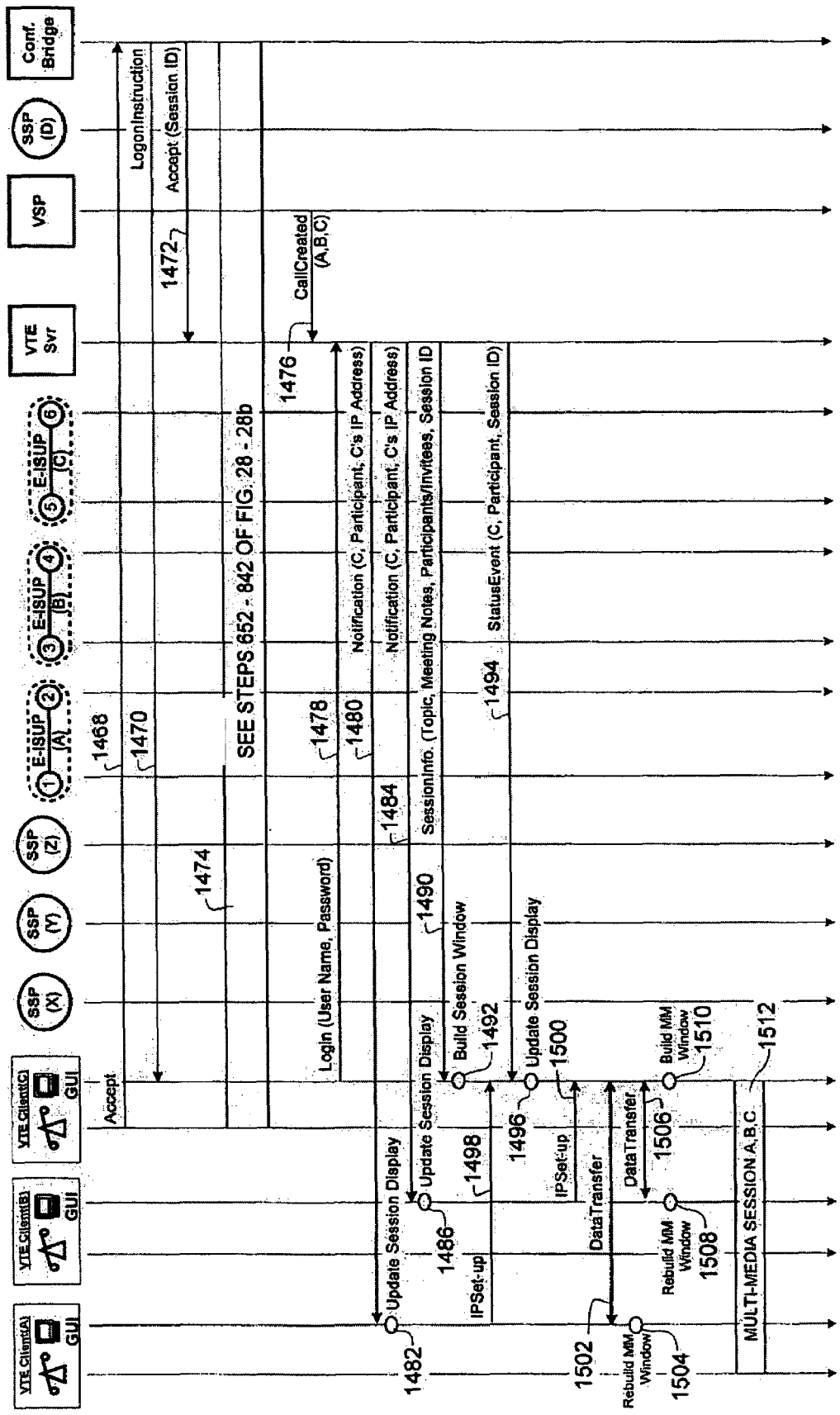

METHOD AND SYSTEM FOR SUPPORTING COMMUNICATIONS WITHIN A VIRTUAL TEAM ENVIRONMENT

CROSS-REFERENCE TO RELATED APPLICATIONS

This is the first application filed for the present invention.

MICROFICHE APPENDIX

Not Applicable.

TECHNICAL FIELD

The invention relates in general to work environments and, in particular, to a virtual team environment that facilitates collaboration among geographically-dispersed team members using a distributed application that provides the virtual team environment.

BACKGROUND OF THE INVENTION

The knowledge economy is fundamentally affecting the modern work environment. As demand for knowledge workers increases, new work paradigms are being developed in which specialized teams are assembled for specific projects. Those specialized teams may need to work together for a matter of days, weeks or months to accomplish a given project. With more regularity, the team is disbanded after the project is completed and team members move on to other projects, often working with a partly or completely different group of people. In addition, people who need to work together are increasingly geographically dispersed due to corporate partnering, acquisitions, globalization, and related factors. While there is motivation for people to work together more closely and more effectively due to competitive pressures, the increasing geographical dispersion of talent in the workforce creates a dilemma which is not easily resolved.

It is generally accepted that people work together best when they are physically collocated. Physical collocation facilitates communications, and therefore collaboration, that is responsive, efficient and spontaneous. Physical collocation in today's business world is not, however, generally practical even when workers are employed by the same company. The stresses associated with travel and commuting often prevent or impair the efficiency of bringing co-workers into physical collocation in order to facilitate job function.

Modern telecommunications services facilitate collaboration among co-workers. Services such as the Public Switched Telephone Network (PSTN), the Internet, and related services such as facsimile, electronic mail, instant messaging, one-way and two-way paging services all contribute to enable and facilitate collaboration. As currently available, however, such services are not optimized to facilitate collaboration between team members.

For example, even though modern facilities, such as described in co-applicants' U.S. Pat. No. 6,097,804 which issued Aug. 1, 2000 and is entitled METHOD AND SYSTEM FOR COMPLETING A VOICE CONNECTION BETWEEN FIRST AND SECOND VOICE TERMINALS IN A SWITCHED TELEPHONE NETWORK, facilitate call setup and control by permitting calls to be initiated from a worldwide web interface or the like, problems are still inherent. It is still impossible to determine the availability of a called party before a call is placed. Even when a call attempt is unsuccessful, the caller is generally not provided with any feedback to indicate why the call attempt failed. For example, the called party may be on another call, or may be away from their desk or office. It is estimated that at least as many as 84% (6 out of 7) of business calls fail to connect directly to the called party.

Electronic mail provides a convenient and inexpensive mode of communication. Electronic mail tends, however, to be a relatively slow method of communication. Recently, instant messaging has become increasingly accepted and services such as Yahoo® Messenger are experiencing explosive growth with millions of subscribers. Instant messaging services provide a means of exchanging messages between two or more participants in a messaging session in near real time. With Yahoo® Messenger a user can define a group of "friends" by selecting other registered users who accept being listed among the user's group of friends. After the group of friends is established, the user who established the group receives dynamic status information respecting the presence of the group of friends at their computer workstation. Consequently, the instant messaging user has a prior knowledge of whether other members in the group of friends are logged on to the Yahoo® Messenger and, if so, whether they have used their workstation within the past few minutes.

Yahoo® Messenger also permits Net2Phone® conversations to be initiated between a user and another party using a graphical user interface that provides a dial pad and an address book to initiate calls that are set up as a first leg through the Internet and a second leg through the PSTN, in accordance with a service provided by Net2Phone®. However, no availability information is provided respecting the called party or the disposition of their telephone. Therefore, it is impossible for a Yahoo® Messenger subscriber to know the status of a "friend's" telephone before a call is placed. Furthermore, each user of the Yahoo® Messenger service must define their own group of friends. There is no central facility for defining a group or a team, and there is no method of controlling congruence between two groups defined by individual users. Consequently, although Yahoo® Messenger facilitates message exchange, it is not adapted to provide a cohesive collaboration environment for geographically-dispersed teams working at a professional level.

Other applications also exist to facilitate collaboration among geographically-dispersed parties. For example, Microsoft Corporation provides NetMeeting® which is adapted to enable collaboration between two or more people using text chat, streaming video, and/or voice over Internet Protocol (VoIP) conversation. NetMeeting® also supports document and application sharing, as well as an exchange of cursor control. While NetMeeting® is a powerful collaboration tool, it only functions well in two-way communications sessions, and fails to provide functionality for defining or tracking of a team. Furthermore, knowledge of respective Internet Protocol (IP) addresses of each participant is required in order to establish a direct inter-party session. Two-party and multi-partly sessions can be established using a Microsoft NetMeeting® server without knowledge of respective IP addresses, however, session efficiency and performance are compromised.

As a further example, Teamcast.com provides a collaboration tool that permits the definition of a team and enables project and event tracking. The Teamcast.com tool also enables communications by electronic mail and instant messaging. The collaborative tool fails, however, to instantiate a virtual team environment that provides knowledge of the availability of other team members to facilitate communications attempts. It also fails to facilitate voice or multimedia communications among team members.

There therefore exists a need for a tool that facilitates collaboration among geographically-dispersed members of a team by creating a virtual team environment that provides dynamic preference and presence information to permit communications sessions among team members to be transparently established.

SUMMARY OF THE INVENTION

An object of the present invention is to provide a method and system for supporting communications among geographically dispersed team members.

Accordingly, an aspect of the present invention provides distributed application for facilitating collaboration between geographically-dispersed members of a team. The distributed application includes a collaboration services suite and a team member interface. The collaboration services suite is adapted to establish a communications session between two or more members of the team, using one of a plurality of communications media, in response to a request from any one of the team members using dynamic presence and preference information respecting each team member. The team member interface is adapted display the dynamic presence and preference information to each member of the team, and to permit a team member to request initiation by the collaboration services suite of a communications session with at least one other team member.

In some embodiments, the collaboration services suite may maintain detailed information respecting team members and communications devices associated with team members, the detailed information being used to initiate communications sessions on receipt of the request from any team member.

In some embodiments, the team member interface may display only graphical information respecting other team member's communications devices. In such cases, team members may initiate communications without requiring knowledge of a device type, device location or device address of a communications device associated with another team member with which a communications session is established by the collaboration services suite. The graphical information displayed by the team member interface may be derived in part from an active profile for each team member. The graphical information displayed by the team member interface may be derived in part from the dynamic presence information obtained by determining the presence and state of communications devices specified in the active profile.

The team member may initiate the communications by selecting a communications icon associated with a personal identifier that represents the at least one other team member. Alternatively, the team member initiates the communications session by opening a communications session initiation window, and dragging a personal identifier that represents the at least one other team member into a predetermined area of the window. as a further alternative, the team member may open a communications session initiation window by performing an activation operation using a pointing device, after selecting the communications icon. The communications session initiation window preferably permits the team member to optionally enter a topic to be discussed during the communications session. The communications session initiation window may further permit the team member to optionally enter a an invitation message related to the communications session. The communications session initiation window further may permit the team member to attach meeting notes input during the communications session.

In some embodiments of the invention, a start communications session message is sent to the collaboration services suite when the team member performs a selection to begin the communications session. The message sent to the collaboration services suite may be received by a connection manager that is adapted to initiate the communications session in response to the message received from the team member. The message may include at least one of: information indicative of a type of communications session to be initiated; and a personal identifier associated with the at least one other team member invited to join the communications session.

In some embodiments, selection of a communications device associated with the other team member is accomplished by selecting one of a plurality of communications icons using one or more of: information indicative of one of a voice, text or multi-media type of communications session; and preference information provided by the other team member and indicative of one or more preferred communications devices to be used for communications sessions.

Preferably, the collaboration services suite maintains a session record including session information related to respective communications sessions. The session information may include at least one of: a participant record identifying each team member participating in the communications session; and a topic of the communications session. The respective session record may be archived following completion of the communications session.

The team member interface may be adapted to enable a team member to interact with the collaboration services suite to mark the communications session as either one of a public and a private communications session. The team member interface may be adapted to display at least a portion of the session information respecting each public communications session to every member of the team. A session window of the team member interface may display, for each public communications session, at least one of: a team identifier; a discussion topic; and a personal identifier associated with each party to the communications session. The team member interface may also adapted to display at least a portion of the session information respecting a private communications session to only those members of the team who are participants in the private communications session.

In embodiments of the invention, the collaboration services suite is adapted to facilitate exchange of text messages between team members participating in a communications session.

An archive record may be stored each time a communications session is terminated. The archive record may include at least one of: a communications session type; a team identifier; a discussion topic; a personal identifier associated with each party to the communications session; a session start and stop time; a session identification number; and any text messages exchanged between the parties during the communications session. The personal identifier may be a team member identifier if the party is a team member.

In some embodiments of the invention, the collaboration services suite is adapted to track each communications session, and to store an address of a preferred text communications device associated with each team member that is a participant in the communications session, so that text messages associated with the communications session are forwarded to the preferred text communications device of each participant. The selected text communications device may be selected using preference information provided by the respective team member to the collaboration services suite. In such cases, the collaboration services suite may be adapted to: receive a text message from a party in a communications session; and forward the text message to the respective text communications device associated with each party to the communications session. The party information may further include a class identification designating respective parties as one of a participant and a monitor of the communications session. The collaboration services suite may forward, to each party to the communication session, any text message related to the communications session that is received from a participant in the communications session, and to discard any text message related to the communications session that is received from a monitor of the communications session.

The collaboration services suite may be further adapted to enable a new party to join the communications session. When the new party is a member of the team, the collaboration services suite may enable the new party to join the communications session as either a monitor or a participant. When the communications session is a public communications session, the team member interface is adapted to enable a team member to join the public communications session as the new party, independently of an invitation from any existing party to the public communications session. When the team member joins the public communications session as a participant, the collaboration services suite is adapted to forward a an announcement to each of the parties to the public communications session to advertise of the presence of the new party.

The collaboration services suite may be adapted to receive an add-message from an existing party to the communications session, the add message containing at least information identifying the new party, and to forward an invitation message to the identified new party inviting the new party to join the communications session. The invitation message preferably includes at least at one of: an identifier of the team member who sent the invitation; a topic of the communications session; a message related to the discussion; a list of participants in the communications session; and a list of invitees to the communications session. The team member interface is preferably adapted to enable the new party to send a response message to the collaboration services suite in response to the invitation. The response message may include any one of: a decline message indicating that the new party wishes to decline the invitation; a join message indicating that the new party wishes to join the communications session; and a deferral message indicating that the new party wishes to join the communications session at a later time. When the response message is a decline message, the collaboration services suite forwards an invitation declined message to the existing party from which the add-message was received. When the response message is a join message, the collaboration services suite adds the new party to the communications session, and notifies each party to the communications session that the new party has joined the communications session. When the response message is a deferral message, the collaboration services suite advises the existing parties to the communications session of the deferral.

Communications session information displayed by the team member interface may include at least one of: an identifier associated with the team; a personal identifier associated with each party participating in the communications session; text information describing a session topic; a record of one or more meeting notes entered by each party to the communications session; and a record of documents shared by the parties to the communications session. The the session topic is defined by a team member at a time of initiation of the communications session.

In some embodiments, the collaboration services suite facilitates voice communications sessions between parties to the communications session. Thus, the collaboration services suite may establish a voice communications session between the parties to the communications session. The voice communications session may include a two-party voice communications session between first and a second voice communications devices respectively associated with first and second parties to the communications session.

In some embodiments of the invention, each of first and second voice communications devices have respective unique addresses, and the collaboration services suite includes a virtual switching point adapted to: establish a call connection between a first service switching point (SSP) in a switched telephone network (STN) and the first voice communications device; establish a call connection between the first SSP and a second SSP in the STN; and establish a call connection between the second SSP in the STN and the second voice communications device to enable voice communications between the first and second voice communications devices. The call connection between the first and second voice communications devices may be completed in part over first and second Enhanced Integrated Services Digital Network User Part (E-ISUP) trunks in the STN.

In some embodiments of the invention, each of first and second voice communications devices have respective unique extension numbers on an enterprise network connected to the switched telephone network (STN) via a private branch exchange (PBX), and the collaboration services suite sends a connection request message to the PBX to establish a two-party call connection between the first and second voice communications devices within the enterprise network.

In some embodiments, the voice communications session includes a multi-party voice communications session between three or more voice communications devices respectively associated with three or more parties to the communications session. In cases where ach of the voice communications devices have respective unique dial numbers (DNs) in the STN, the collaboration services suite includes a virtual switching point (VSP) adapted to establish a call connection between a respective Enhanced Integrated Services Digital Network User Part (E-ISUP) trunk of the STN and each one of the voice communications devices, and to establish a call connection between each E-ISUP trunk and a conference bridge to enable voice communications between each of the voice communications devices via their respective E-ISUP trunks and the conference bridge. In cases where at least two of the communications devices have respective unique extension numbers on an enterprise network connected to the PSTN via a private branch exchange (PBX), the collaboration services suite is adapted to: send a connection request message to the PBX to establish a two-party call connection between a first and second voice communications devices on the enterprise network; send a connection request message to the PBX to establish a third-party call connection between the first voice communications device on the enterprise network and a conference bridge; send a connection request message to a virtual switching point in the public switched telephone network (PSTN) to establish a call connection between an E-ISUP trunk of the PSTN and a third voice communications device associated with a respective third party to the communications session; and establish a call connection between the E-ISUP trunk and the conference bridge to enable voice communications between each of the first voice communications devices via the conference bridge.

The collaboration services suite preferably enables a new party to join the communications session. When the communications session is a public communications session, the team member interface preferably enables a team member to join the public communications session as the new party, independently of an invitation from any existing party to the public communications session. In any event, the collaboration services suite may receive an add-message from an existing party to the communications session, the add message containing at least information identifying the new party; and forward an invitation message to the identified new party.

When the response message is a join message, the collaboration services suite may be adapted to: add party information identifying the new party to the session display; and notify each team member involved in the communications session that the new party has joined the communications session. When the response message is a deferral message, the collaboration services suite may forward the deferral message to the existing party from which the add-message was received.

If the communications session comprises an existing two-party voice communications session between first and a second voice communications devices respectively associated with first and second parties to the voice communications session, the collaboration services suite may convert the two-party voice communications session into a multi-party voice communications session. When each of the first and second voice communications devices have respective DN's on the PSTN, and the existing two-party voice communications session comprises a voice connection between the first and second voice communications devices via respective first and second E-ISUP trunk, the collaboration services suite includes a virtual switching point adapted to: release a call connection between the first E-ISUP trunk and the second E-ISUP trunk; establish a call connection between the first E-ISUP trunk and a conference bridge; establish a call connection between the second E-ISUP trunk and the conference bridge; establish a call connection between a third E-ISUP trunk and a respective third voice communications device associated with the new party; and establish a call connection between the third E-ISUP trunk and the conference bridge.

If the existing two-party voice communications session is a two-party voice connection between first and second voice communications devices having respective unique extension numbers on an enterprise network connected to the PSTN via a private branch exchange (PBX), the collaboration services suite may be adapted to: send a connection request message to the PBX to establish a third-party call connection between the first voice communications device on the enterprise network and a conference bridge; send a connection request message to a virtual switching point in the PSTN to establish a call connection between an E-ISUP trunk in the PSTN and a third voice communications device associated with the new party; and establish a call connection between the E-ISUP trunk and the conference bridge to enable voice communications between each of the voice communications devices via the conference bridge.

If the communications session comprises an existing multi-party communications session using a conference bridge to connect at least three voice communications devices respectively associated with existing parties to the communications session, the collaboration services suite is preferably adapted to join the new party to the existing multi-party communications session. In such cases, the collaboration services suite includes a virtual switching point adapted to: establish a call connection between a respective E-ISUP trunk of the PSTN and the voice communications device associated with the new party; and establish a call connection between the E-ISUP trunk and the conference bridge to enable voice communications between the each of the voice communications devices via their respective E-ISUP trunk and the conference bridge.

A further aspect of the present invention provides a distributed application for facilitating collaboration between geographically-dispersed members of a team. A collaboration services suite is adapted to establish a multi-media communications session between two or more members of the team in response to a request from any one of the team members. The multi-media communications session may be established using a data network to enable an exchange of video content between data terminals of team members involved in the multi-media communications session, and a switched telephone network to enable exchange of voice content between voice communications devices of the team members involved in the multi-media communications session. The distributed application may be further adapted to supply each data terminal with a data address of each other data terminal involved in the multi-media communications session to enable automatic setup the exchange of the video data. The distributed application may further enable an exchange of at least one of documents and applications during the multi-media session.

The invention therefore provides a user-friendly, intuitive mechanism that facilitates seamless two-party and multi-party communications among members of a geographically dispersed team. The distributed application provides an intuitive mechanism by which a user may initiate communications and/or add new parties to existing communications sessions, without the user requiring a priori knowledge of network addresses or communication set-up procedures.

BRIEF DESCRIPTION OF THE DRAWINGS

Further features and advantages of the present invention will become apparent from the following detailed description, taken in combination with the appended drawings, in which:

FIG. 8 is a message flow diagram illustrating exemplary messages exchanged between the VTE client application and elements of the collaboration services suite during a team member log-in procedure;

FIG. 9 is a message flow diagram illustrating exemplary messages exchanged between the VT client application and elements of the collaboration services suite during a team member log-out procedure;

FIG. 18 is a block diagram schematically illustrating exemplary elements of the team bulletins frame of the team space display of FIG. 10;

FIG. 19 is a block diagram schematically illustrating the active communications frame of the team space display of FIG. 10;

FIG. 20 is a message flow diagram illustrating exemplary messages exchanged between VTE client applications and the VTE server during a public communications session;

FIG. 21 is a block diagram schematically illustrating exemplary functionality associated with an Instant Messaging Session Object instantiated by a VTE Client application in respect of an Instant Messaging communications session;

FIG. 26 is a message flow diagram illustrating the setup of a two-way voice communications session using the VTE Client application and the collaboration services suite in accordance with the invention;

FIG. 27 is a schematic diagram illustrating the closing of the two-way voice communications session setup shown in FIG. 26;

FIGS. 28, 28a and 28b are message flow diagrams showing the voice communications session setup as shown in FIG. 26;

FIGS. 29 and 29a show the closing of the three-way voice communications session setup as shown in FIGS. 28-28b;

FIG. 30 is a message flow diagram showing the setup of a two-way voice communications session in an enterprise network;

FIG. 31 is a message flow diagram showing the addition of a third party to a two-way voice communications session setup in an enterprise network as shown in FIG. 30;

FIGS. 32, 32a and 32b are message flow diagrams illustrating the conversion of a three-way instant messaging session to a three-way voice communications session using the VTE client application and the collaboration services suite in accordance with an embodiment of the invention;

FIG. 33 shows the setup of a two-way multi-media session;

FIG. 34 shows the additional of a third party to the multi-media session setup as shown in FIG. 33;

FIG. 35 shows the addition of a third party to a multi-media session setup as shown in FIG. 33 when the third party defers acceptance; and FIGS. 36 and 36a show the addition of a third party to a multi-medial session setup when the invited party is not logged into the collaboration services suite as a virtual team environment client.

It will be noted that throughout the appended drawings, like features are identified by like reference numerals.

DETAILED DESCRIPTION OF THE PREFERRED EMBODIMENT

The present invention provides a collaboration services suite 2 which is designed to instantiate a virtual team environment (VTE) 3 for integrating, in a synergistic manner, a plurality of traditional, emerging, and new communications-related capabilities to facilitate collaboration among geographically dispersed members of a team. As used in this document, the word "team" means any group of interested parties that have a desire to collaborate for business, academic, political or social reasons. Although the description that follows refers specifically to "work teams", it should be understood that the virtual team environment may be used for many other purposes. For example, the methods and apparatus in accordance with the invention may be used by families, groups of friends, academic institutions, political organizations or any other closely or loosely associated group interested in seamless communications services. The methods and apparatus in accordance with the invention also have a plurality of business applications too large to exhaustively enumerate. For example, the invention may be used for customer relationship management, institutional information exchange, distributed health care administration, hot-line and help-line services, etc. In some applications, preference and presence information, described below in some detail, may only be available to selected parties, and not to all parties as described in the detailed description of the preferred embodiments that follows.

Figure 1:
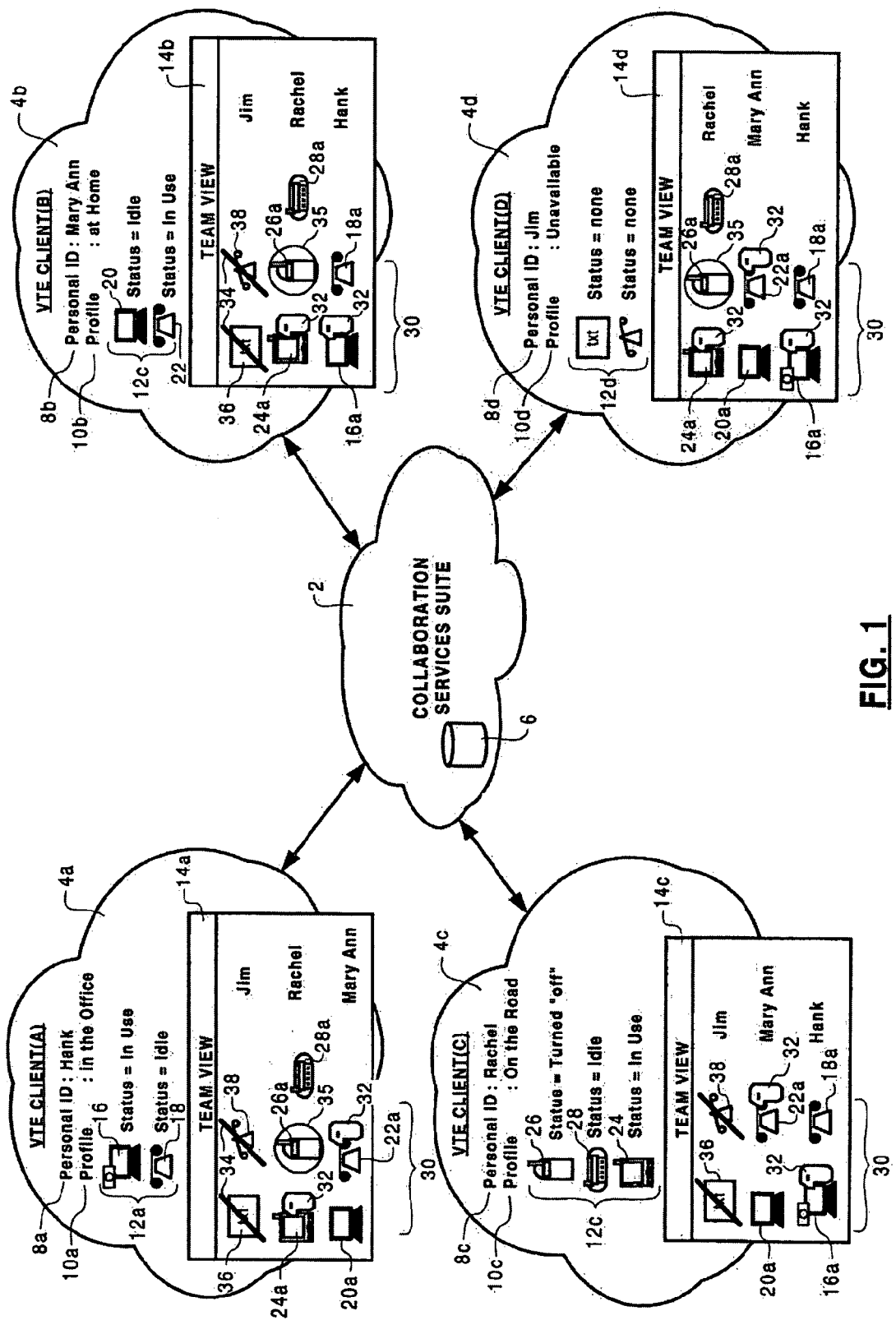
FIG. 1 is a block diagram schematically illustrating exemplary interactions between a collaboration services suite and members of a team in accordance with an embodiment of the present invention.

FIG. 1 is a block diagram schematically illustrating exemplary interactions between the collaboration services suite 2 and each of the members of a team. In the embodiment illustrated in FIG. 1, the team comprises four team members, each of whom is represented by a respective VTE client 4. As shown in FIG. 1, the collaboration services suite 2 includes a database 6 in which information concerning each team member is stored. This information includes a respective personal identifier 8 of each team member, a respective personal profile 10 relating to a role and/or environment of the team member, and communications information 12 indicative of the availability of the respective team member for participating in various types of communications. As will be described in greater detail below, information concerning a team member's respective personal identifier 8, and profile 10, as well as communications preferences (e.g. communications information 12 defining preferred communications devices and addresses) are provided by each team member, and stored by the collaboration services suite 2 in the database 6. Information concerning an availability of each team member to participate in various types of communications can be provided by the respective team member and/or detected automatically by the collaboration services suite 2. The information concerning each team member is compiled within the collaboration services suite 2 and then supplied to each VTE client 4, in the form of team member presence and preference information, in order to provide each team member with a consistent team view 14 that is representative of the status of each of the members of the team. Thus, for example, Hank (represented by VTE client (A) 4*a*) has specified a personal profile 10*a* indicating that he is currently working in his office. As part of this personal profile, Hank has provided communications information 12*a* identifying his office personal computer (PC) 16 (which includes two-way video conferencing capability) and his office telephone 18 as communications devices through which he prefers to receive communications. By interaction with the VTE client (A) 4*a* and the PSTN, the collaboration services suite 2 has detected that Hank's PC 16 is currently in use, and his office telephone 18 is idle. Similarly, Mary Ann (represented by VTE client (B) 4*b*) has selected a personal profile 10*b* indicating that she is working at her home. She has also specified communications information 12*b* defining a pair of communications devices (in this case her home PC 20 and wireline telephone 22) through which she prefers to receive communications. By means of interaction with the VTE client (B) 4*b*, and the PSTN, the collaboration services suite 2 has detected that Mary Ann's home PC 20 is idle, and that her wireline telephone 22 is currently in use. Rachel (represented by VTE client (C) 4*c*) has specified a personal profile 10*c* indicating that she is mobile. She has also specified communications information 12*c* identifying three communications devices (in this case a wireless PDA 24, a wireless telephone 26 and a 2-way pager device 28) through which she prefers to receive communications. By means of interaction with the VTE client (C) 4*c* and the PSTN, the collaboration services suite 2 has detected that Rachel's wireless PDA 24 is in use, her wireless telephone 26 is currently turned off (or is otherwise inaccessible), and that her 2-way pager 28 is currently idle. Finally, Jim (represented by VTE client (D) 4*d*) has selected a profile indicating that he is unavailable. As part of this profile Jim has specified no communications devices through which he prefers to receive communications.

The above-described communication preferences and status information, concerning each of the members of the team, is combined by the collaboration services suite 2 and distributed to each of the team members for display using a team view 14 providing a consistent view of the team. In each case, the team view 14 includes the personal identifier 8 of each of the other members of the team, along with respective preference and presence information 30 (in the illustrated embodiment represented by icons) indicative of the capability of each team member to participate in various types of communications. Thus, for example, the preference and presence information of Hank (VTE client (A) 4*a*) is indicated by respective device icons 16*a* and 18*a* representative of the office PC 16 and wireline telephone 18 identified in Hank's "in the office" profile 10*a*. The In-Use status of Hank's office PC 16 is indicated by a presence icon 32 partially superimposed over the office PC icon 16*a*, while the Idle status of Hank's office telephone 18 is indicated by the lack of any other presence icon elements associated with the wireline telephone icon 18*a*. The status and availability information for Rachel comprises icons 24*a*, 26*a*, 28*a*, respectively representative of each of the wireless PDA 24, wireless telephone 26 and the 2-way pager device 28 that Rachel has identified in her profile 10*c*. The In-Use status of Rachel's PDA 24 is indicated by a presence icon 32 (in this case a graphical representation of a human head) partially superimposed over the PDA icon 24*a*. The Inaccessible status of her wireless telephone 26 is indicated by an "inaccesible" icon 35 (in this case a circle) superimposed over the wireless telephone icon 26*a*. The Idle status of her 2-way pager 28 is indicated by the lack of any other icon elements associated with the two-way pager icon 28*a*. The preference and presence information for Mary Ann includes a pair of device icons 20*a* and 22*a* respectively representative of the home PC 20 and the wireline telephone 22 that Mary Ann has identified in her "at home" profile 10*b*. The Idle status of Mary Ann's PC 20 is represented by the absence of any other presence or status icon elements associated with the PC icon element 20*a*, whereas the In-Use status of her wireline telephone 22 is indicated by a presence icon element 32 partially superimposed over the wireline telephone device icon 22*a*. Finally, the preference and presence information of Jim is indicated by generic device icons 36 and 38, respectively representative of the text and voice communications types, each of which includes a not available icon 34 indicating that Jim is not available to receive either of the respective types of communications.

In preferred embodiments of the present invention, the collaboration services suite 2 is "persistent" in that it remains active independently of the Log-In status of any of the members of the team. Thus, for example, Jim's preference and presence information 30 is maintained by the collaboration services suite 2 and displayed consistently in the team views 14 of each of Mary Ann, Rachel and Hank, independently of whether or not Jim is logged into the collaboration services suite 2. Similarly, the "in the office" profile 10 defined by Hank (including the communications information and the operational status of each of the identified communications devices) will be maintained by the collaboration services suite 2 independently of whether or not Hank is logged into the collaboration services suite 2. Accordingly, the other members of the team (e.g. each of Jim, Rachel and Mary Ann) will be able to view the preference and presence information for Hank, and may use this information to establish communications with Hank, even if Hank is not currently logged into the collaboration services suite 2.

Figure 2:
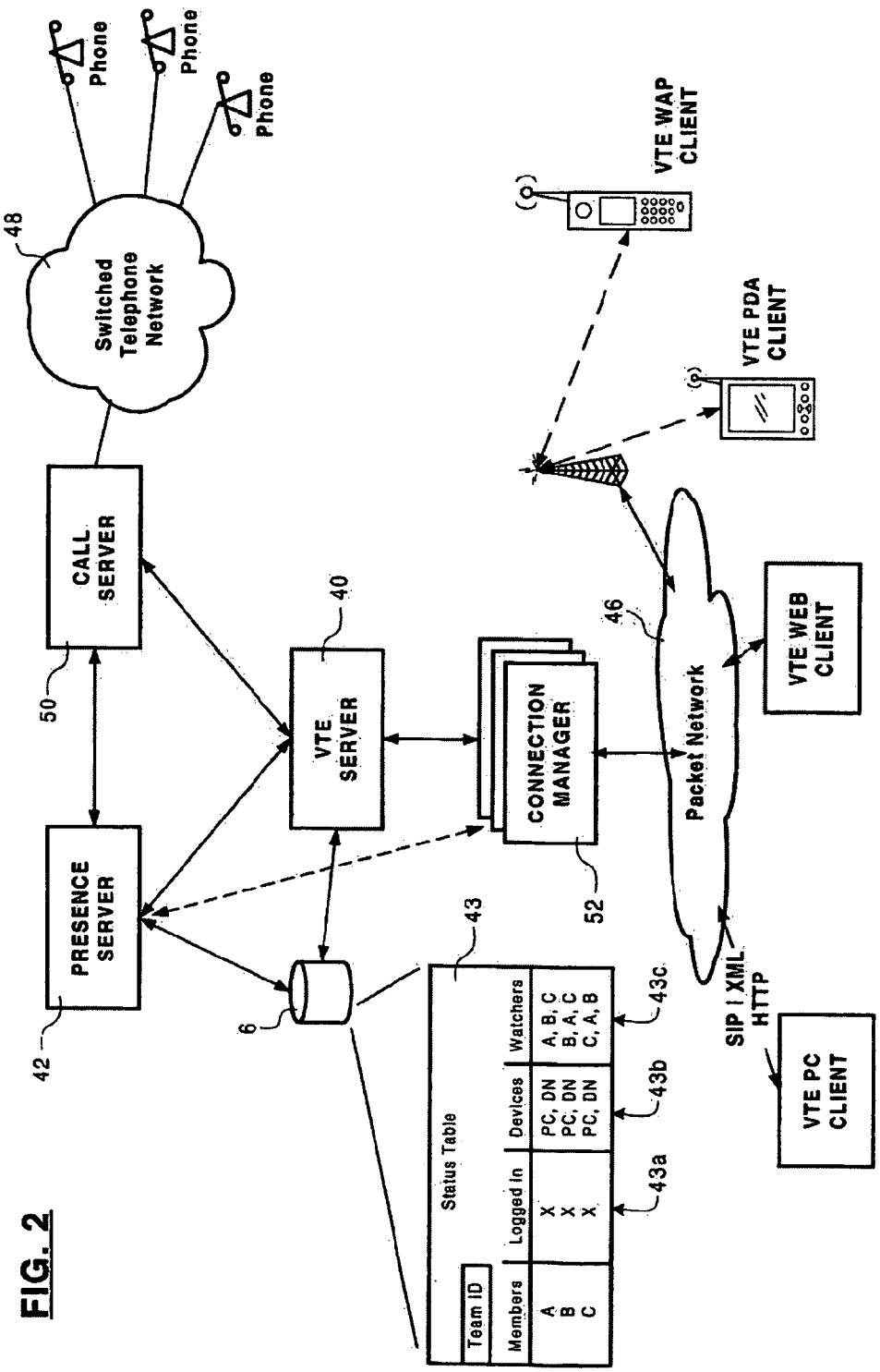
FIG. 2 is a block diagram schematically illustrating principle elements in a system for implementing the collaboration services suite of FIG. 1.

FIG. 2 is a block diagram schematically illustrating principle elements in a system for implementing the collaboration services suite 2. In general, the collaboration services suite 2 is instantiated by a collaboration services suite comprising a VTE server 40, a Presence Server 42, and the database 6. Each VTE client 4 encompasses one or more communications devices, such as wireline and wireless telephones connected to the public switched telephone network (PSTN), and packet-based communications devices such as personal computers (PCs), personal digital assistants (PDAs), and other one and two-way messaging devices. Many packet-based communications devices incorporate a graphical user interface capable of supporting a VTE client application 44 (see FIG. 6) providing a team member with the team view 14 and functionality for interacting with the collaboration services suite 2 to define and edit their respective personal profiles 10, and for initiating and controlling communications with other persons. In general, interaction between the collaboration services suite 2 and the communications devices associated with each team member (i.e. encompassed by each VTE client 4) is controlled by the VTE server 40. Accordingly, the VTE server 40 incorporates functionality related to the negotiation of team member log-in to the collaboration services suite 2, the forwarding of team member preference and presence information 30 to each VTE client 4, and the forwarding of status updates concerning active communications sessions to each VTE client 4. The VTE server 40 also provides functionality related to the initiation and control of communications involving one or more team members, as will be described in greater detail below.

The Presence Server 42 incorporates functionality adapted to detect the current operational status of each of the communications devices identified in the current profile 10, and store the detection result within the database 6 as communications information for each respective VTE client 4. For this purpose, the Presence Server 42 is preferably adapted to detect team member presence information using the techniques described in Applicant's co-pending U.S. patent applications Ser. Nos. 09/460,780; 09/461,119; and 09/461,492 (all filed Dec. 14, 1999), the contents of which are hereby incorporated by reference. Thus the Presence Server 42 interacts with packet-based communications devices (e.g. PCs, web-enabled communications devices, and WAP-enabled communications devices) through a packet network 46 to receive StatusUpdate messages, and determine associated presence information based on the reception and contents of such StatusUpdate messages, as will be described in greater detail below. In addition, the Presence Server 42 includes functionality adapted to formulate at least the functional contents of a common channel signalling (CCS) Query messages for determining the current status of wireline and wireless telephones through the PSTN 48, again, as will be described in greater detail below.

Additionally, the Presence Server 42 maintains a status table 43 for controlling the detection and propagation of team member status and availability information. In general, the status table 43 contains, for each member of the team, a logged-in frame 43a; a devices frame 43b, and a watcher's frame 43c. The logged-in frame 43a stores a flag (e.g. a binary "0" or "1") indicating whether or not the respective team member is currently logged-in to the collaboration services suite 2. The devices frame 43b contains device identifiers and associated address information (e.g. PSTN destination number, IP address, e-mail address) for each communications device identified by the respective team member in their current personal profile. Finally, the watcher's frame 43c contains the personal identifiers of each of the other members of the team who are currently also logged-in to the collaboration services suite 2, and who should therefore be receiving preference and presence information respecting the team member.

In order to facilitate interaction between each of the VTE server 40 and the Presence Server 42, and the PSTN 48, a call server 50 may be provided. Similarly, a connection manager 52 can be provided to facilitate protocol-independent messaging between the VTE server 40 and packet-based communications devices associated with each of the VTE clients 4. In the illustrated embodiment, interaction between each VTE client 4 and the collaboration services suite 2 is implemented by packet-based messaging between respective communications devices associated with each VTE client 4 and the VTE server 40, via the packet network 46 and the connection manager 52. However, it will be appreciated that, in some cases, it will be advantageous to enable direct messaging between the presence server 42 and communications devices associated with each VTE client 4, without the involvement of the VTE server 40, as shown in FIG. 2. It will also be appreciated that, in some embodiments, a connection manager 52 may not be required, or that its functionality may be incorporated into the VTE server 40 and/or the presence server 42.

The VTE server 40, Presence Server 42, and database 6 may be co-resident within a single server machine, or alternatively may be deployed across two or more machines suitably interconnected (e.g. through the packet network 46, or through high-speed ethernet links) in order to facilitate messaging and data exchange. Similarly, each of the call server 50 and the connection manager 52 may be co-resident with the VTE server 40, or may be remotely located and accessible by the VTE server 40 (and the Presence Server 42) via suitable data links.

As described above with respect to FIGS. 1 and 2, each VTE client 4 encompasses communications devices usable by a respective team member for engaging in communications with other persons (who may or may not be members of the same team). In general, any of a variety of different types of communications devices may be utilized in conjunction with the present invention, including PCs, PDAs, wireless and wireline telephones, and wireless one and two-way messaging devices. Similarly, the collaboration services suite 2 may be utilized to facilitate any of a variety of different types of communications, including two-way instant messaging, e-mail, multi-media (including video conferencing) and voice communications. In the present network space, communications between any two parties may, depending on the type of communications devices involved, be facilitated through the legacy PSTN 48 or a packet network 46 (e.g. one or more federated ethernet, ATM, or IP networks). Thus, it is possible to categorize the various communications devices in accordance with whether they are designed to effect communications through the PSTN 48 or a packet network 46. Within each of these categories, it is largely irrelevant (for the purposes of establishing communications) whether a particular communications device relies on a wireline or a wireless connection to access the network, as this does not generally have a significant effect on the messaging required to complete a call connection to the involved communications device. This separation of communications devices into packet-based and PSTN based communications devices is illustrated in FIGS. 3 and 4.

Figure 3:
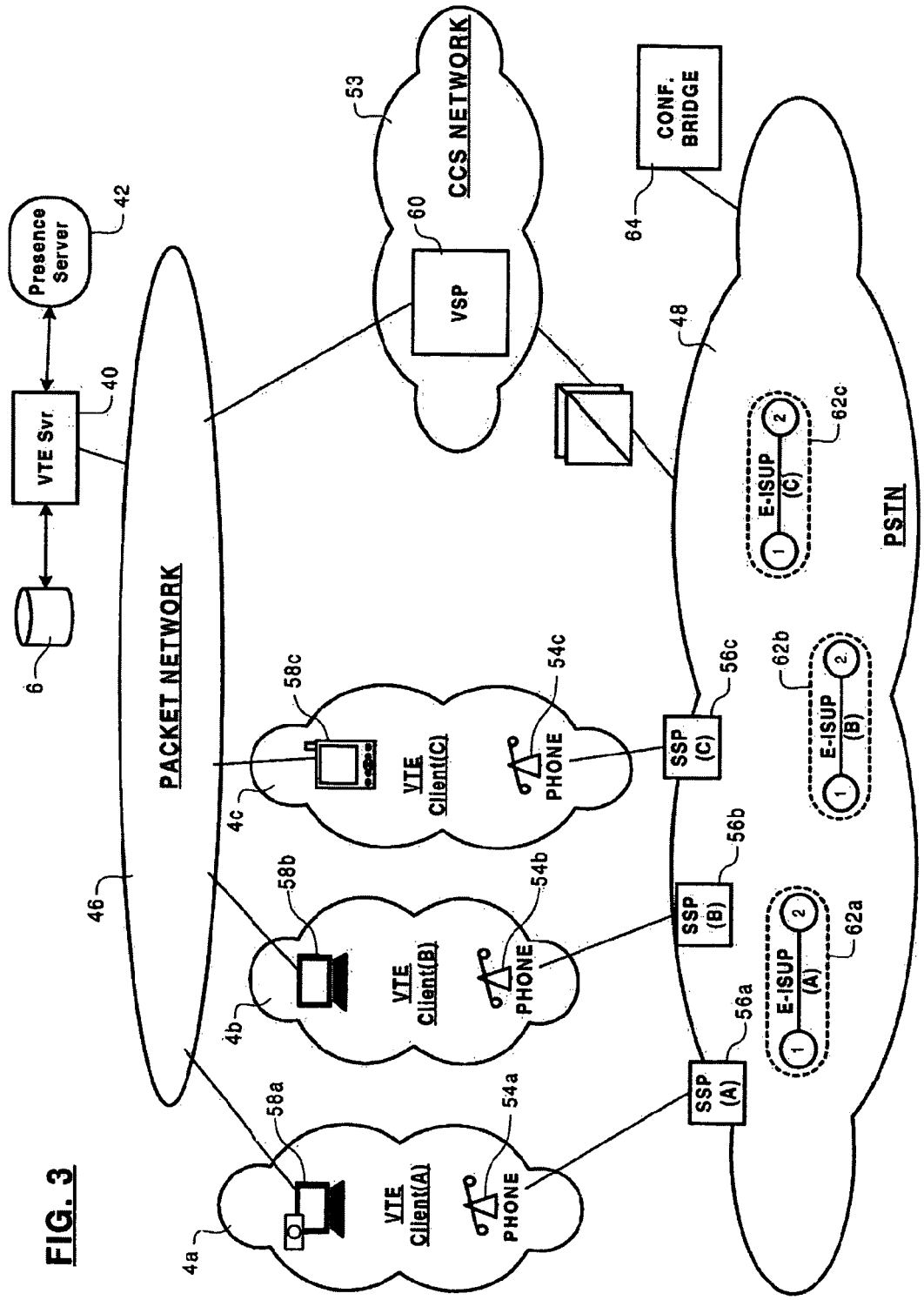
FIG. 3 is a block diagram schematically illustrating exemplary relationships between communications devices encompassed by each VTE client and communications network elements involved in enabling the functionality of the collaboration services suite of FIG. 1, in accordance with a first embodiment of the invention.

FIG. 3 is a block diagram schematically illustrating relationships between packet-based and PSTN based communications devices encompassed by each of VTE clients (A), (B) and (C) 4a, 4b, 4c (see FIG. 1) and elements of the packet network 46, PSTN 48 and CCS network 53 involved in enabling the functionality of the collaboration services suite 2 in accordance with the present invention. In the scenario illustrated in FIG. 3, each of the PSTN-based devices 54 (whether wireline or wireless telephone sets) are hosted by a respective service switch point (SSP) 56 of the PSTN. Conversely, the respective packet-based communications devices 58 are connected to the packet network 46 either directly or via an access server (not shown) provided by a network access provider. In order to enable the collaboration services suite 2 to detect an operational status of the PSTN-based communications devices 54, and to initiate and control communications involving the PSTN-based communications devices 54, a virtual switching point (VSP) 60 of the CCS network 53 is adapted to interact with the VTE server 40 via, for example, a suitable connection to the packet network 46. As is known in the art, the VSP 60 is adapted to interact with one or more Integrated Services Digital Network User Port (ISUP) trunk groups referred to a enhanced ISUP (E-ISUP) trunks 62 to control the set up of call connections through the PSTN 48. This functionality is utilized by the collaboration services suite 2 to enable the establishment of multi-way communications sessions through a conventional conference bridge 64, as will be described in greater detail below.

Figure 4:
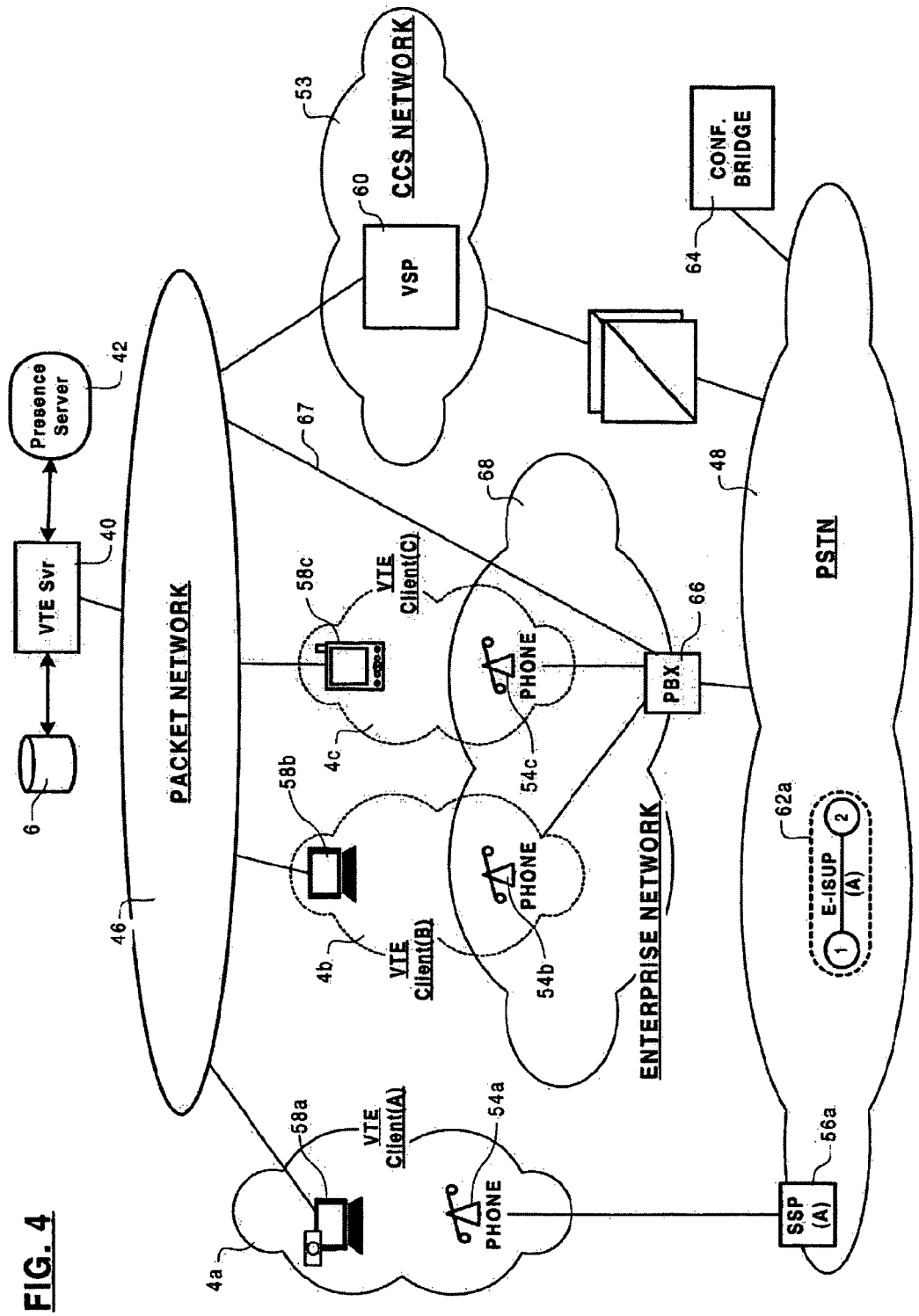
FIG. 4 is a block diagram schematically illustrating exemplary relationships between communications devices encompassed by each VTE client and communications network elements involved in enabling the functionality of the collaboration services suite of FIG. 1, in accordance with a second embodiment of the invention.

FIG. 4 is similar to FIG. 3 in that it illustrates relationships between packet-based and PSTN-based communications devices 58, 54 and respective elements of the packet network 46, CCS network 53 and PSTN 48 involved in the set up and control of communications involving one or more team members. The scenario of FIG. 4 differs from that of FIG. 3 in that the PSTN-based communications devices of VTE clients (B) and (C) 4b, 4c are connected to the PSTN 48 via a private branch exchange (PBX) 66 which provides various communications services within an enterprise network 68, and is logically connected to the presence server 42 (e.g. via the packet network 46) through a data link 67.

Figure 5:
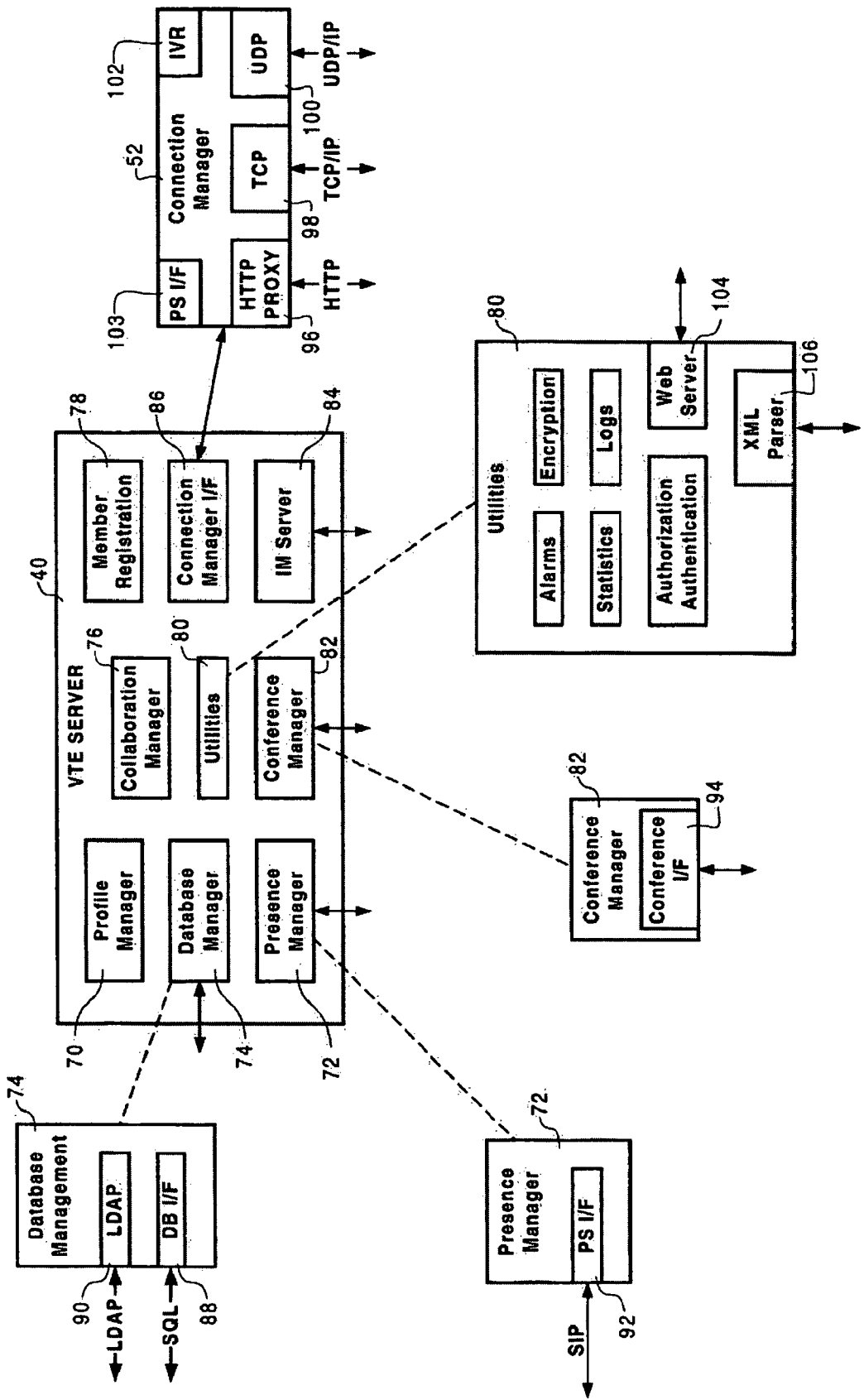
FIG. 5 is a block diagram schematically illustrating exemplary functionality of the VTE server of FIG. 2 in accordance with an embodiment of the present invention.

FIG. 5 is a block diagram schematically illustrating exemplary functionality of the VTE server 40 in accordance with an embodiment of the present invention. In the illustrated embodiment, the VTE server 40 comprises: a profile manager 70 providing functionality related to the creation and editing of personal profiles 10; a presence manager 72 enabling interaction between the VTE server 40 and the Presence Server 42 to maintain up-to-date presence information concerning each team member; a database manager 74 enabling interaction between the VTE server 40 and one or more databases 6 of the collaboration services suite 2; and a collaboration manager 76 providing functionality relating to the initiation and control of communications involving one or more team members. In addition, the VTE server 40 includes member registration services 78, providing functionality related to member authentication and authorization during user log-in; and utilities services 80 providing functionality related to team administration, including tracking and resolution of alarms, accumulation of various statistics and logs, encryption services and authentication routines. Finally, the VTE server 40 includes a conference manager 82 which interacts with the collaboration manager 76 to provide signaling and messaging functionality required for the initiation and control of communications; an instant messaging server 84 which interacts with the collaboration manager 76 to provide specialized services with respect to the management and control of instant messaging sessions; and a connection manager interface 86 which facilitates interaction between the VTE server 40 and the connection manager 52, and so facilitates messaging between each VTE client 4 and the VTE server 40.

Thus constructed, the VTE server 40 embodies a modular architecture in which collaboration services, such as those associated with the set up and control of multi-party communications sessions, can be developed and implemented independently of the messaging protocols used for interaction between the VTE server 40, the VTE clients 4, the database 6, the Presence Server 42, or any of the communications devices 54, 58 and networks with which the collaboration services suite must operate in order to instantiate the collaboration services suite 2. For example, in the embodiment illustrated in FIG. 5, the database manager 74 includes one or more structured query language (SQL) and lightweight directory access protocol (LDAP) interfaces 88, 90 respectively enabling interaction between the VTE server 40 and one or more LDAP and SQL databases. Other database types may be accessed by the VTE server 40 through the database manager 74 by providing a suitable interface (e.g. a java database connectivity (JDBC) interface) within the database manager 74. Similarly, the presence manager 72 instantiates a Presence Server interface 92 facilitating interaction between the VTE server 40 and the Presence Server 42 using a suitable messaging protocol, such as, for example, session initiation protocol (SIP).

During initialization of communications involving one or more team members, the collaboration manager 76 may conveniently operate to generate a session record including session specific information such as a session ID, a start time, information identifying session participants, a session type, and other information useful for administration and archiving of the communications session. Once the communications record has been generated, it may conveniently be passed to the conference manager 82, which interacts with elements of the packet network 48 and/or the PSTN 48 to set up the requested communications session between the involved parties. Thereafter, the conference manager 82 may be used to update the session record as new session information is accumulated, and the status of the communications session changes. In order to enable interaction between the conference manager 82, the PSTN 48, and the packet network 46, the conference manager 82 may instantiate one or more conference interfaces 94 which may, for example, enable interaction with both the packet network 46 and the call server 50 using session initiation protocol.

The connection manager interface 86 provides functionality enabling interaction between the VTE server 40 and the connection manager in order to facilitate protocol independent messaging between the VTE Server 40 and each VTE client 4. The connection manager 52 may instantiate one or more of an HTTP proxy interface 96, a transport control protocol/internet protocol (TCP/IP) interface 98, and user datagram protocol/internet protocol (UDP/IP) interface 100 for interacting with client applications instantiated on suitable packet-based communications devices 58 (e.g. PCs, PDAs, and WAP-enabled communications devices). Additionally, the connection manager 52 may implement an Interactive Voice Response (IVR) interface 102 enabling a team member to interact with the VTE server 40 by means of a voice communications device connected, for example, to the PSTN 48. In those embodiments in which direct messaging between the presence server 42 and VTE clients 4 is desired, a Presence server interface 103 may be instantiated to facilitate messaging between the connection manager 52 and the presence server 42.

In order to facilitate web-based access to the functionality of the VTE server 40, the utility services 80 may include a web server 104 and/or an extensible mark-up language (XML) parser 106 to enable a team member to access the VTE server 40 using a browser application in a manner known in the art.

In order to enable interaction between a team member and the collaboration services suite 2, a VTE client application 44 is instantiated in respect of each communications device encompassed by the team member's respective VTE client 4. The functionality of the VTE client application 44 will necessarily vary in accordance with the capabilities of the respective communications device. The most extensive range of functionality of the VTE client application 44 can be implemented in respect of PCs, PDAs and other web enabled communications devices. Conversely, a VTE client application 44 instantiated in respect of a plain old telephone service (POTS) telephone handset may have minimal functionality, as interaction between the team member and the VTE server 40 must necessarily be mediated entirely by means of the IVR interface 102 instantiated by the VTE client manager 86.

Figure 6:
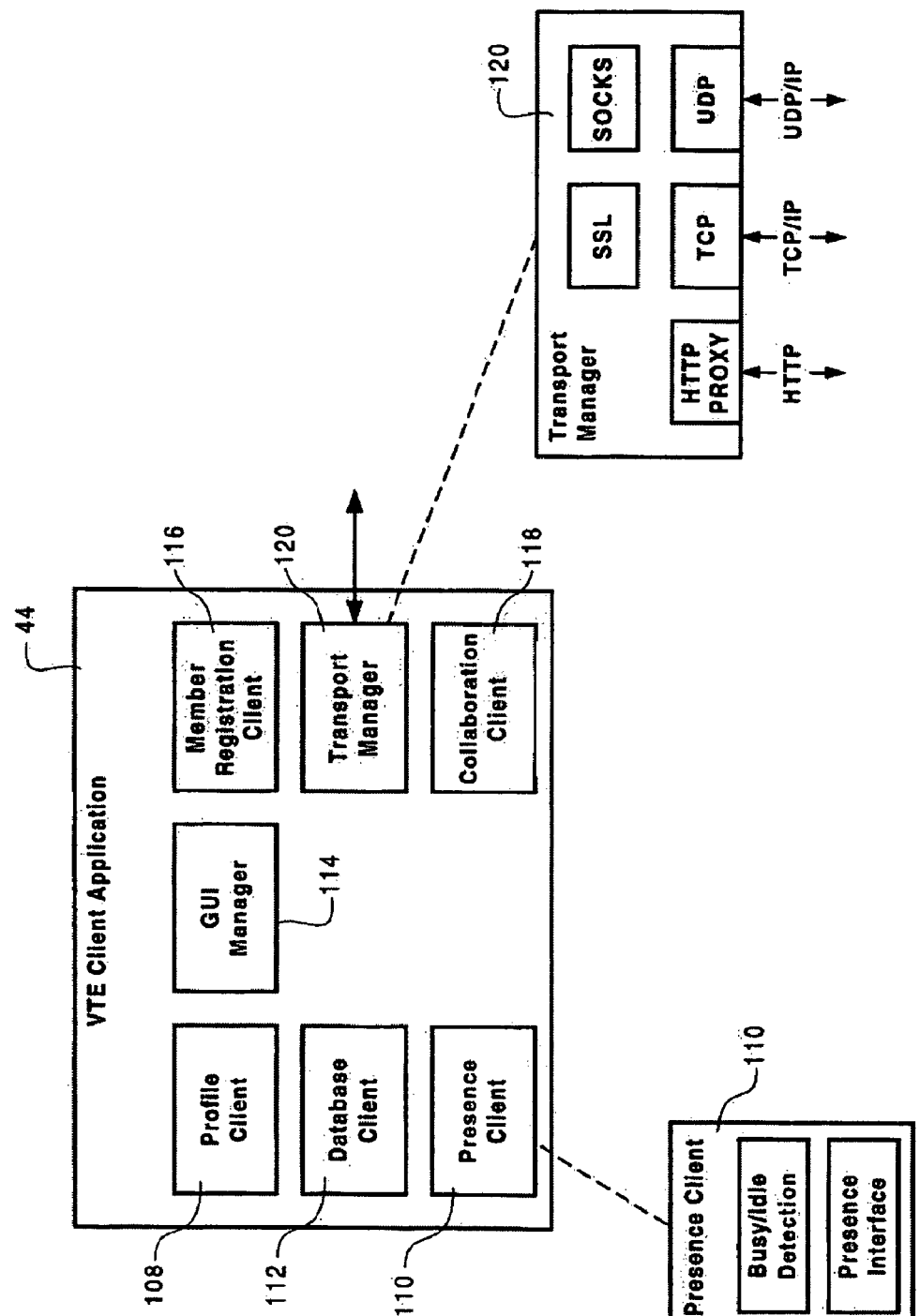
FIG. 6 is a block diagram schematically illustrating principal functional elements of a VTE client application in accordance with an embodiment of the present invention.

FIG. 6 is a block diagram schematically illustrating principal functional elements of an exemplary VTE client application 44. As shown in FIG. 6, the VTE client application 44 comprises a modular architecture which generally mirrors that of the VTE server 40 (see FIG. 5), which facilitates scaling of the functionality of the VTE client application 44 in accordance with the capabilities of each communications device in respect of which the VTE client application 44 is instantiated. In particular, the VTE client application 44 illustrated in FIG. 6 contains functionality appropriate to a PC or a PDA having sufficient data processing and display capabilities to support a graphical user interface and bi-directional messaging with the VTE server 40, using one or more packet-based protocols. In this case, the VTE client application 44 comprises: a profile client 108 for accessing the profile manager 70 to enable the creation and editing of personal profiles 10: a presence client 110 providing functionality related to the detection and forwarding of status messages to the VTE server 40: a database client 112 enabling team member access to one or more databases 6 of the collaboration services suite 2; and a Graphical User Interface (GUI) manager 114 adapted to interact with a GUI of a communications device (e.g. a PC or a PDA) to instantiate a team space display enabling interaction and collaboration between members of the team. In addition, the VTE client application 44 includes a member registration client 116 for interacting with the member registration services 78 of the VTE server 40 during user log-in, in order to negotiate team member authentication and authorization procedures; and a collaboration client 118 for interacting with the collaboration manager 76 of the VTE server 40 to enable initiation and control of communications involving one or more team members. Finally, the VTE client application 44 includes a transport manager 120 enabling bi-directional messaging between the VTE client application 44 and the VTE server 40 using one or more messaging protocols.

As mentioned previously, the VTE client application 44 illustrated in FIG. 6 operates to instantiate a virtual team space providing a wide range of functionality associated with communications and collaboration between team members. The modular architecture of the VTE client application 44 enables this functionality to scale with the processing, display and signaling capabilities of each communications device. For example, a VTE client application 44 instantiated in respect of a communications device having a microprocessor and IP messaging capabilities, but lacking a graphical user interface, may include a text display manager (not shown) in place of the GUI manager 114 shown in FIG. 6, in order to enable interaction between the team member and the VTE server 40 using a text based display. Depending on the capabilities of the microprocessor contained in the communications device, the remaining functional elements of the VTE client application 44 may be retained, reduced in capability, or possibly eliminated entirely in order to provide maximum functionality within the constraints imposed by the design of the communications device. In the case of a POTS telephone handset, the VTE client application 44 may be instantiated via the IVR interface 102 of the connection manager 52, and in such cases would omit the GUI manager 114, transport manager 120, collaboration client 118, and database client 112, shown in FIG. 6. At the same time, the member registration client 116 would be limited in functionality to prompting the team member to enter one or more access codes using the POTS handset keypad (not shown). Similarly, the profile client 108 would be limited in functionality to announcing an identification of a current profile of the team member, and prompting the team member to select one of a set of existing personal profiles 10 as their current profile. Thus, it will be appreciated that the exemplary VTE client application 44 illustrated in FIG. 6 can be varied as required in order to exploit the processing, display, and signaling capabilities of each communications device to facilitate collaboration and communications involving members of the team.

As mentioned above, the exemplary VTE client application 44 illustrated in FIG. 6 operates to instantiate a virtual team space display 122 on suitable communications devices. Exemplary functionality of the VTE client application 44, in this respect, is described below with reference to FIGS. 7 through 25.

Figure 7:
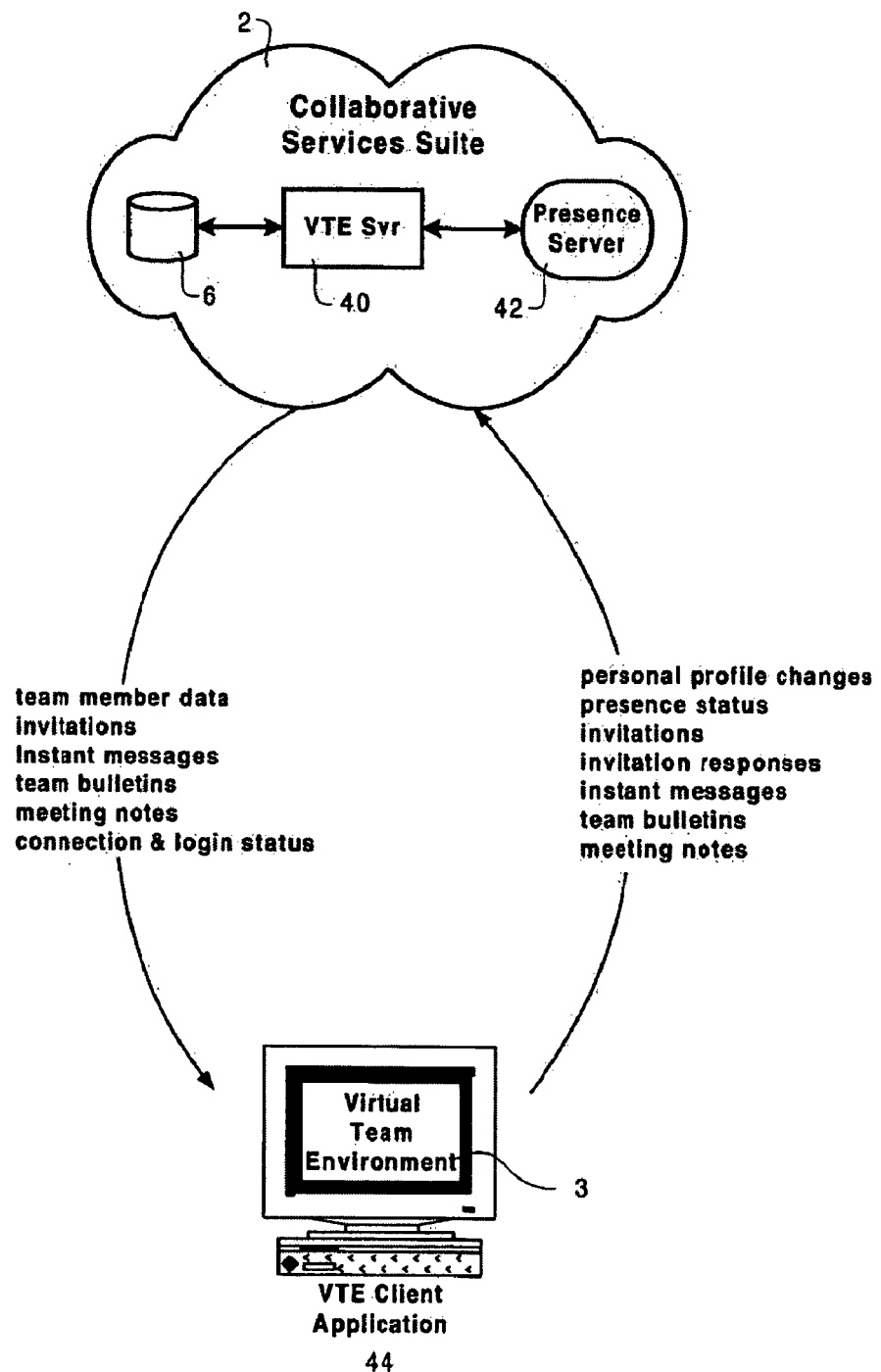
FIG. 7 is a message flow diagram illustrating exemplary messages exchanged between the collaboration services suite and the VTE client application.

In general, the virtual team space 122 instantiated by the VTE client application 44 operates to enable a respective team member to interact with the collaboration services suite 2 in order to obtain preference and presence information respecting each of the members of the team, as well as to initiate communications and join active communications sessions involving one or more other persons (who may or may not be members of the team). FIG. 7 schematically illustrates exemplary messages exchanged between the collaboration services suite 2 and the virtual team space 122 instantiated by the VTE client application 44 on a team member's PC. As shown in FIG. 7, the collaboration services suite 2 sends messages to the VTE client application 44 providing, for example, team member data (including preference and presence information); invitations for inviting the team member to join a team and/or a communications session; instant messages; team bulletins; meeting notes; as well as connection and Log-In status of the team member. Corresponding messages returned to the collaboration services suite 2 from the team space display 122 include messages containing, for example, personal profile changes; presence status updates; invitations destined for other persons to join a team and/or a communications session; responses to invitations received from the collaboration services suite; instant messages; as well as team bulletins and meeting notes entered by the team member using the team space display 122.

In order to facilitate the above-described messaging between the team space display 122 and the collaboration services suite 2, the respective team member must negotiate a log-in procedure with the collaboration services suite 2. FIG. 8 is a message flow diagram showing exemplary messages exchanged between the VTE client application 44 and elements of the collaboration services suite 2 during such a log-in procedure. As shown in FIG. 8, a Log-InRequest message 124 containing the personal identifier of the user, and a password, is forwarded by the VTE client application 44a to the VTE server 40. The VTE server 40 then uses the personal identifier and the password to validate the user (at 126), and upon successful validation, queries the client database (at 128) to obtain communications information corresponding to the most recently selected current personal profile of the user. This communications preferences information is then forwarded by the VTE server 40 to the VTE client application 44a as part of a Log-InConfirmation message 130, which allows the VTE client application 44a to update the team space display 122 (described in greater detail below with respect to FIG. 10), with communications preferences information relevant to the user. The VTE server 40 also forwards a SubscriptionRequest message 132 to the Presence Server 42, in order to update the contents of the devices frame 43b of the status table 43 in accordance with the user's current personal profile. A client Log-In message is then sent by the VTE server 40 in order to notify the Presence Server 42 that the user has logged into the collaboration services suite 2. This information is used by the Presence Server 42 to update the status table 43 (FIG. 7) to show the Logged-In status of the user, as well as to flag the user as a watcher of each of the other members of the team. Identification of the Logged-In status of the user, in the status table 43, causes the Presence Server 42 to begin monitoring the status of each of the communications devices identified in the user's current personal profile 10 (as listed in the devices frame 43b of the status table 43), and forward corresponding status updates concerning the user to each of the other members of the team who are identified in the watcher's frame 43c of the status table 43. Similarly, identification of the user as a watcher of each of the other members of the team, means that the Presence Server 43 will forward status updates to the user concerning each of the other members of the team who are also logged in to the collaboration services suite 2. Thus, the VTE server 40 negotiates a subscription and log-in of the user with the Presence Server. Upon successful completion of the subscription and log-in procedure between the VTE server 40 and the Presence Server 42, the VTE server 40 forwards a StatusEvent message 136 confirming the Log-In status of the user to the VTE client application 44a. Corresponding StatusEvent messages 138 are also forwarded by the VTE server 40 to each of the other members of the team, who are identified as watchers of the user.

FIG. 9 is a message flow diagram showing exemplary messages exchanged between the VE client application 44 and elements of the collaboration services suite 2 when the user wishes to log-out from the collaboration services suite 2. Thus, a Log-OutRequest message 140 is forwarded by the VTE client application 44a to the VTE server 40. Upon receipt of the Log-OutRequest message, the VTE server 40 unsubscribes the user from the Presence Server 42 (at 142), which causes the presence engine to remove the user as a watcher of any other members of the team. The VTE server 40 then negotiates a log-out of the user from the Presence Server 42 (at 144), which causes the presence engine to update the status table 43 to indicate that the user is no longer logged-in to the collaboration services suite 2. The Presence Server 42 will continue monitoring the status of the preferred communications devices identified in the user's current personal profile (as identified in the devices frame 43b of the status table 43), and will also continue the forwarding of Status messages concerning the user to the other members of the team. Removal of the user as a watcher of any of the other team members (by unsubscribing the user as described above) causes the Presence Server 42 to cease forwarding Status messages concerning the status of any other logged in members of the team to the user. Following completion of the unsubscription and log-out between the VTE server 40 and the Presence Server 42, StatusEvent messages 146 indicative of the Log-Out status of the user are forwarded to the VTE client application 44a and to each of the remaining logged-in team members.

Figure 10:
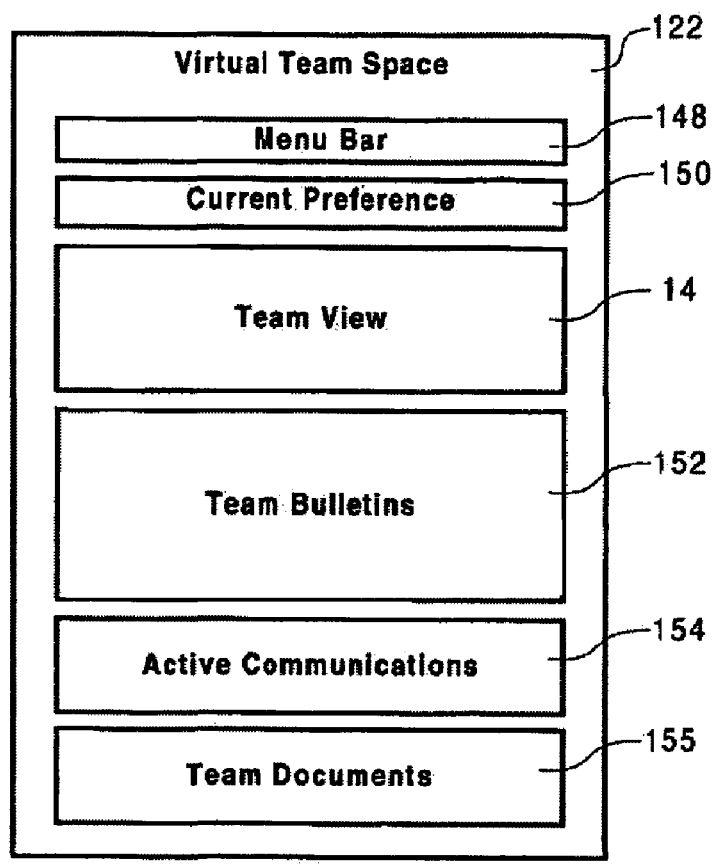
FIG. 10 is a block diagram schematically illustrating exemplary frames of the virtual team space display instantiated by the VTE client application, in accordance with an embodiment of the present invention.

FIG. 10 is a block diagram schematically illustrating exemplary frames of the team space display 122 instantiated by the VTE client application 44, for example on a respective team member's PC. In the embodiment of FIG. 10, the virtual team space 122 comprises a menu frame 148 enabling menu driven access to the functionality of the VTE client application 44; a current availability frame 150 showing the current state of the member's preference and presence information being maintained by the collaboration services suite 2 and displayed to each of the other members of the team; the team view 14 (see FIG. 1) showing the current preference and presence information respecting each of the other members of the team; a team bulletins frame 152 showing bulletins posted by members of the team; an active communications frame 154 showing status information of active public communications sessions involving any one or more of the team members; and a team documents frame 155 showing information respecting documents related to team activities and accessible by any members of the team. Exemplary contents and features of each of these frames are described below with reference to FIGS. 11 through 29.

Figure 11:
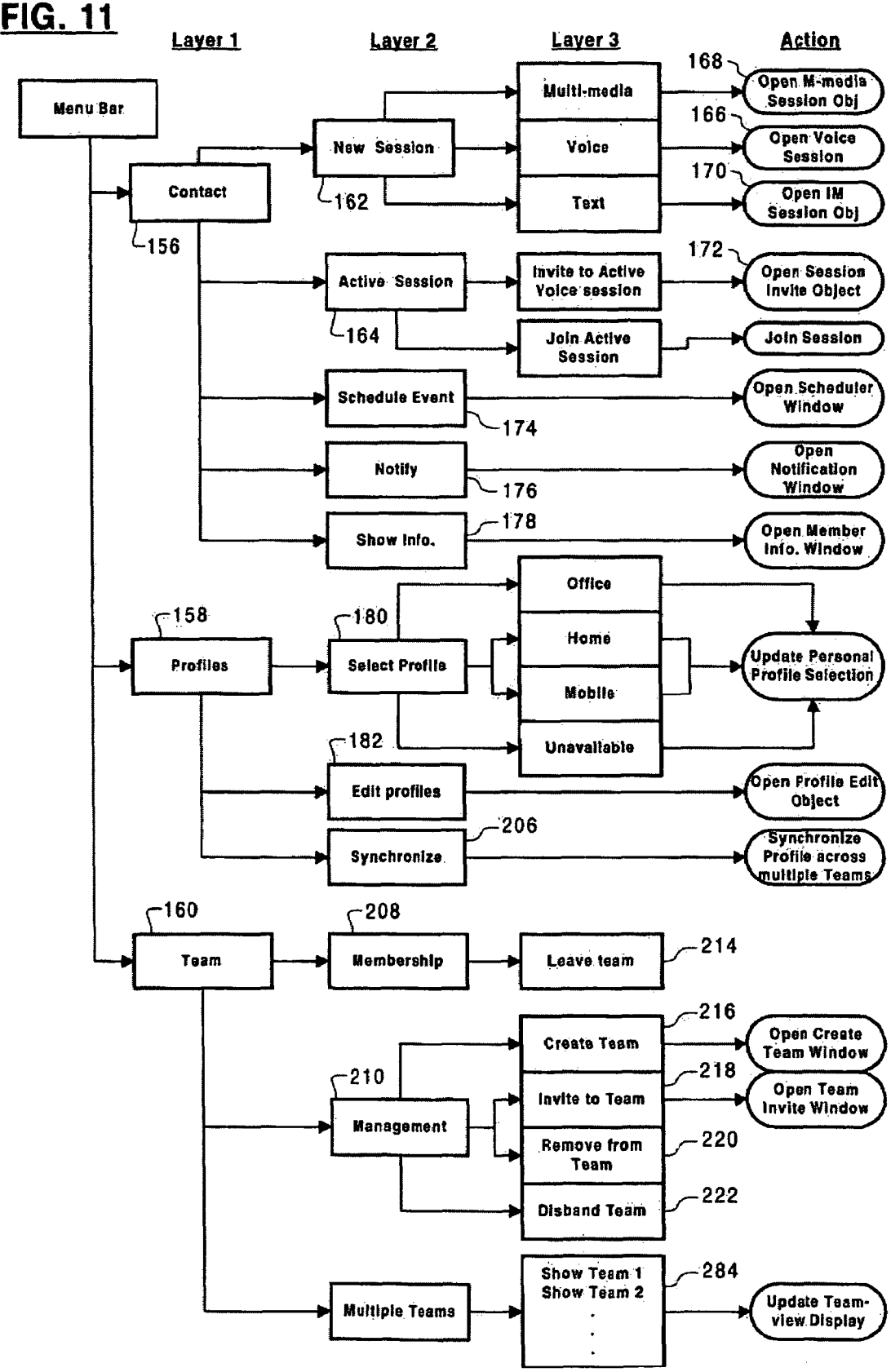
FIG. 11 is a block diagram schematically illustrating exemplary elements of the menu frame of the team space display of FIG. 10.

FIG. 11 illustrates exemplary elements of the menu frame 148 of the team space display 122 illustrated in FIG. 10. As shown in FIG. 11, the menu frame 148 may be implemented as a multi-layer menu-tree enabling menu-driven access by the user to the functionality of the VTE client application 44. In the embodiment illustrated in FIG. 11, layer 1 of the menu-tree enables the user to access three general categories of functionality, namely a "contact" category 156 for accessing functionality related to communications with other persons; a "profiles" category 158 for accessing functionality related to the user's personal profiles; and a "team" category 160 for accessing functionality related to membership and administrative issues concerning the team. Other categories may also be provided in layer 1 of the menu-tree, in a manner known in the art, to access other desired functions of the VTE client application 44 such as, for example, context-sensitive help.

Within each category of functionality, layers 2 and 3 of the menu-tree may be populated as required to enable rapid and intuitive access to the functionality of the VTE client application 44. Thus, as shown in FIG. 11, within the "contact" category 156, the illustrated embodiment presents five options. Two of these options, namely New Session 162 and Active Session 164 are directly related to communications sessions. As its name implies, the New Session option 162 is used to initiate a new voice, multi-media or text communications session (selected in layer 3) by opening respective voice, multi-media or text session objects 166, 168, 170. Similarly, the Active Session option 164 is used to open a session invite object 172 to initiate the formulation and sending of an invitation to another team member to join an ongoing voice, multi-media or text communications session. Other options may be presented in layer 2 to enable the user to access member and communications session related functionality of the VTE Client application 44. Thus in the embodiment of FIG. 11, a Schedule Event option 174 is provided to enable the user to schedule team events (e.g. meetings etc.) for distribution to one or more involved team members. A Notify option 176 can be provided to enable the user to instruct the VTE client application 44 to notify the user of an occurrence of a predetermined event (e.g. a change in the status of a selected team member communications device). Finally, a Show Info option 178 may be used to display information (e.g. name, title, mailing address, etc.) respecting a selected team member.

As mentioned above, the "profiles" category 158 accessed in layer 1 of the menu-tree is used to access functionality of the VTE client application 44 concerning the personal profiles 10 defining communications preferences of the user.

The present invention enables the user to define multiple personal profiles 10, each of which contains respective communications preferences information defining the user's preferences relating to participation in communications with other team members.

Normally, each profile will relate to a respective role of the team member, such as "working", "not working", etc. Within each role, the team member may define respective profiles relating to an environment or context of the team member. For example, within the "working" role, the team member may have multiple work environments, such as "in the office", "mobile", "working at home", etc. In the illustrated embodiment, four profiles are defined, namely "office", "home", "mobile" and "unavailable", each of which relates to a respective different environment within the "working" role of the user. It will be appreciated that fewer, or more profiles may be defined, as desired, by the team member. The "profiles" category 158 of the menu frame 148 provides a Select Profile option 180 enabling the team member to select a previously defined personal profile as their current profile, and an Edit-Profiles option 182 enabling the user to create and edit each of their personal profiles.

The Edit Profiles option 182 of the menu frame 148 enables the team member to create, edit and/or delete the communications preferences information of each personal profile in order to define respective communications preferences of the user. Normally, the communications preferences information will include information detailing any types of communications in which the team member prefers to participate, along with a device identifier and/or a device address (such as a PSTN Destination Number (DN), an IP address or an e-mail address) of a communications device that the team member can use to participate in communications. Thus, for example, the user may define an "office" personal profile in which the communications preferences information defines that the user prefers to participate in multi-media communications sessions using their office PC; voice communications sessions using their office telephone hand-set (e.g. e-mail and instant messaging) communications, again using their office PC. The IP and e-mail addresses of the office PC, and the telephone number of the office telephone hand-set, are included in the communications preferences information, to enable the set up of communications using each of the involved devices.

Similarly, a "working at home" personal profile can be defined for situations in which the team member is working from a home office. In this case, the communications preferences information of the "working at home" personal profile may indicate that the team member prefers to participate in voice communications sessions using their home telephone hand-set and communications such as e-mail and instant messaging using their home PC, but is not able to participate in multi-media sessions. Again, the telephone number of the team member's home telephone hand-set and the IP and e-mail addresses of the team member's home PC are included in the communications preferences information to enable establishment of text and voice communications sessions.

A "mobile" personal profile can be defined by the team member for situations in which the team member is travelling, and therefore is restricted to the use of wireless communications devices for participating in communications. Thus, for example, the communications preferences information of the "mobile" personal profile may indicate that the team member is available for one-way numeric messaging using a wireless paging device, and voice communications using a wireless telephone (such as a cell phone or digital PCS). In this case, the telephone numbers of the user's pager device and wireless telephone are also included in the "mobile" personal profile to enable forwarding of numeric messages to the pager and the set up of telephone calls to the wireless telephone.

Finally, an "unavailable" personal profile may be defined for those situations in which the team member does not wish to participate in communications with other members of the team, such as, for example, during a meeting with clients. In this case, the communications preferences information would define that the user is unavailable for participating in any communications, and thus would not include any device identification or address information respecting communications devices usable by the team member.

Figure 12:
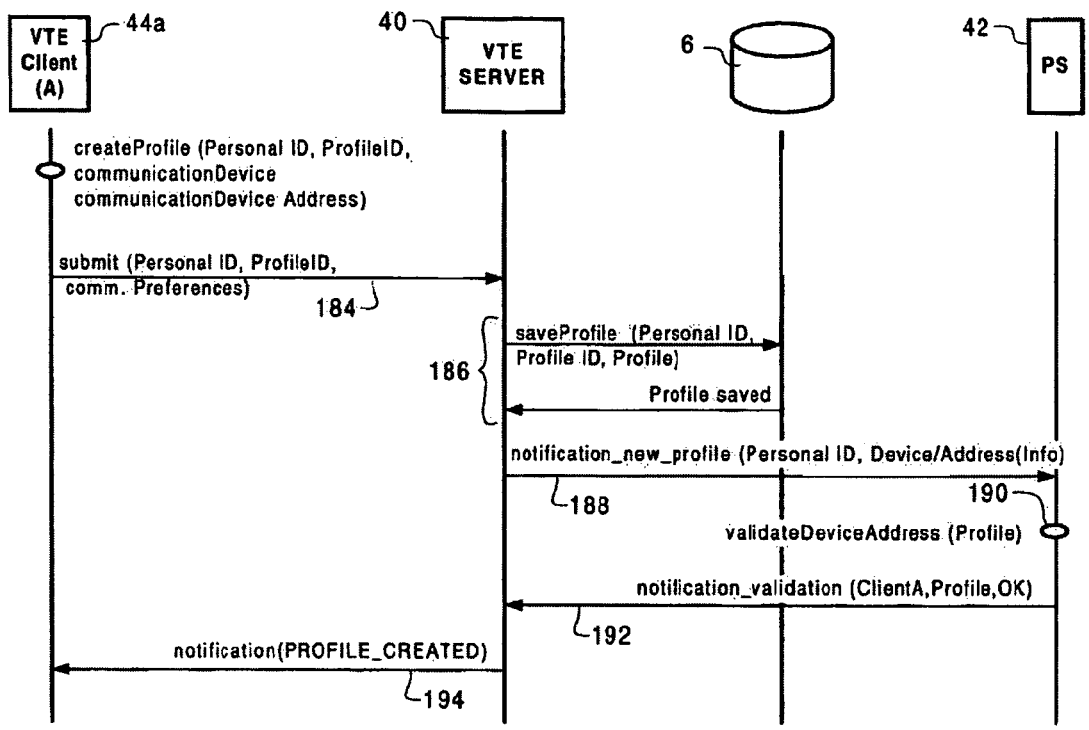
FIG. 12 is a message flow diagram schematically illustrating exemplary messages exchanged between the VTE client application and elements of the collaboration services suite during creation and/or editing of a personal profile.

FIG. 12 is a message flow diagram schematically illustrating exemplary messages exchanged between the VTE Client application 44 and elements of the collaboration services suite 2 in respect of the creation and/or editing of a personal profile. As shown in FIG. 12, a personal profile may be created or edited using a suitable profile editing object (not shown), which enables the team member to select and/or edit device identification and address information concerning one or more communications devices that are usable by the team member for participating in one or more types of communications. The profile editing object also preferably enables the team member to identify those types of communications that the user wishes to receive using each device. The team member can then submit the new (or amended) communications preferences information to the VTE server 40 (at 184) by clicking an appropriate icon or button provided in the profile editing object. Upon receipt of the Submission message, the VTE server 40 extracts and stores the new profile information in the database 6 (at 186) for future retrieval and use. Additionally, the VTE server 40 may forward at least the device identification and address information contained in the new profile information to the Presence Server 42 (at 188). The Presence Server 42 can then use the device identification and address information to validate the team member's selected communications information (at 190). For example, the Presence Server 42 may launch a query to a network management system (not shown) in order to determine whether each device address provided by the team member is a valid address. Upon successful validation of the device identification and address information, the Presence Server 42 forwards a Validation message 192 to the VTE server 40, which then forwards a Notification message 194 to the VTE client application 44a indicating that the personal profile has been successfully created or amended.

Figure 13:
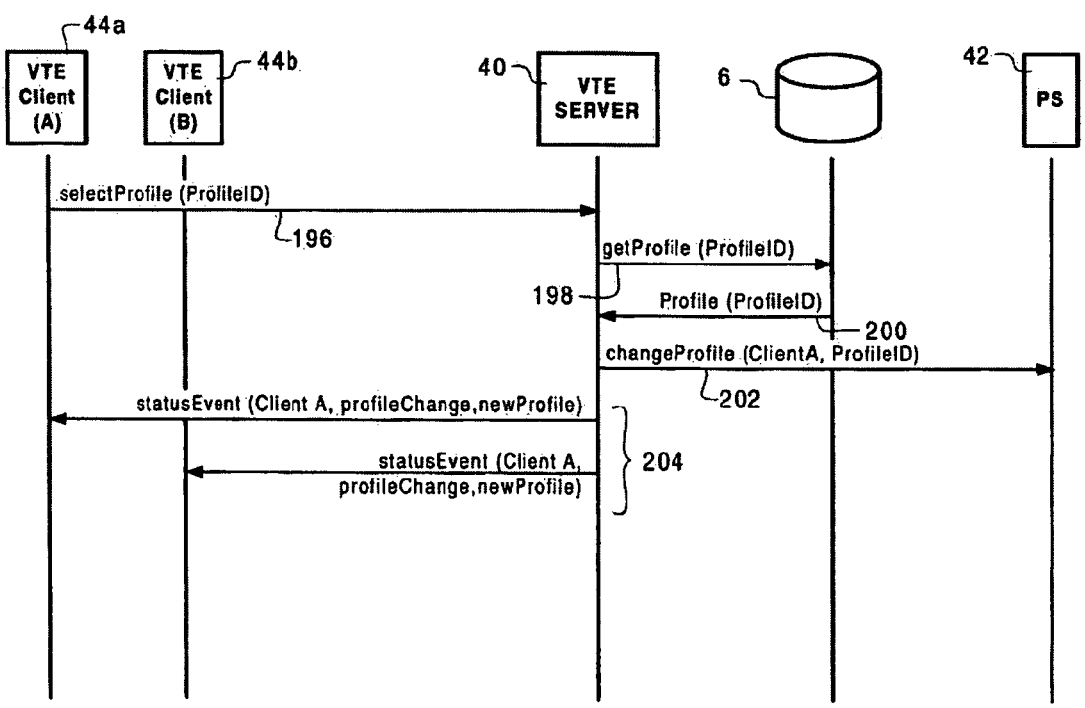
FIG. 13 is a message flow diagram schematically illustrating exemplary messages exchanged between the VTE client application and elements of the collaboration services suite during team member selection of an active profile.

The SelectProfile option 180 of the menu frame 148 can be used by the team member to select one of the personal profiles as a current profile which is then advertised by the VTE client application 44 to the collaboration services suite 2, and thereafter propagated to each of the other members of the team. FIG. 13 is a message flow diagram schematically illustrating principle messages exchanged between the VTE client application 44 and elements of the collaboration services suite 2 in response to the team member accessing the SelectProfile option 180 of the menu frame 148 in order to select one of the personal profiles as their current profile. As shown in FIG. 13, the VTE client application 44a responds to selection of a personal profile by forwarding a SelectProfile message 196 containing a respective profile identifier to the VTE server 40. The VTE server 40 extracts the profile identifier from the SelectProfile message 196, and uses the profile identifier to send a GetProfile query 198 to the database 6 (e.g. using an LDAP query). The database 6 returns a message 200 to the VTE server containing the personal profile identified by the profile identifier. The communications preferences information (in particular, information identifying preferred communications devices and their respective addresses) is then forwarded by the VTE server 40 to the Presence Server 42 in a ChangeProfile message 202. Upon receipt of the ChangeProfile message 202, the Presence Server 42 updates the status table 43 to reflect the identity and address of each one of the preferred communications devices identified in the profile. The VTE server 40 then forwards a StatusEvent message 204 to the VTE client application 44 of each team member in order to update the team view 14 with preference and presence information of the team member reflecting the new current profile.

Referring back to FIG. 11, it is expected that a team member may be a member of multiple teams. It is also expected that the user may wish to select a different personal profile as their current personal profile for each one of the different teams. For example, if the team member wishes to participate in an important teleconference with members of one particular team, then the team member may select their "office" personal profile as their current profile for that team, and select their "unavailable" personal profile as their current profile in respect of each of the other teams. This ensures that the team member will be available to participate in the teleconference, without being interrupted by communications from members of the other teams. However, the team member may also wish to ensure that they have the same personal profile selected as the current profile in respect of each of the teams of which they are a member. Thus in the embodiment of FIG. 11, a Synchronize option 206 is provided in the menu bar to enable the user to easily synchronize the selected current profile across each of the teams in which they are a member.

The "team" category 160 provides access to team membership 208 and management 210 functionality of the VTE client application 44. As shown in FIG. 11, exemplary membership related functionality 208 includes Leaving a team 214 respecting which the team member no longer wishes to be a member.

Exemplary team management functionality 210 includes team creation 216 (which causes instantiation of a new collaboration services suite 2 respecting a new team); inviting a person to join an existing (or newly created) team 18; removing a team member from an existing team 220; and disbanding a team 222, which causes dissolution of the collaboration services suite 2 associated with that team.

Figure 14:
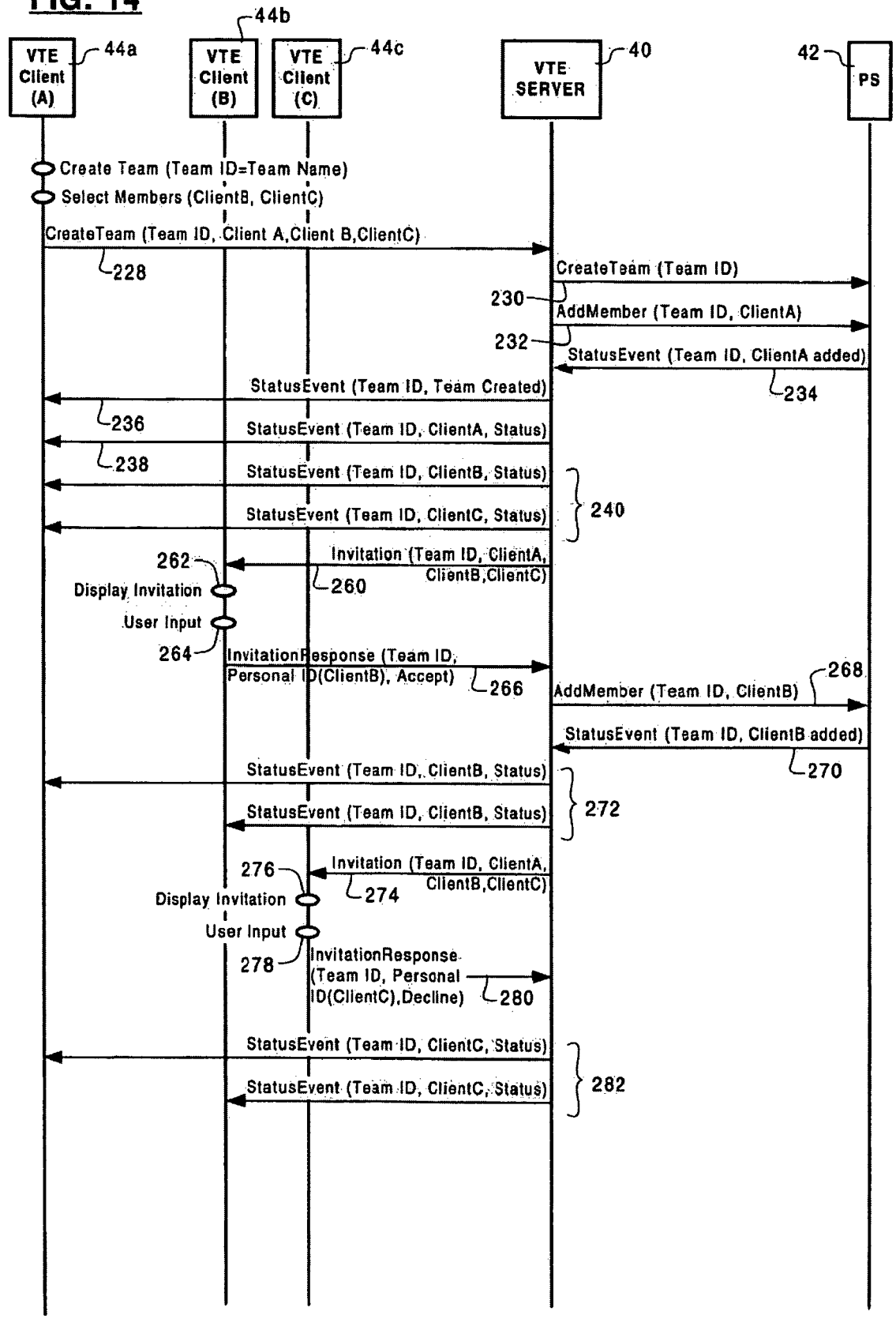
FIG. 14 is a message flow diagram schematically illustrating principle messages exchanged among three VTE clients and elements of the collaboration services suite during creation of a team.

FIG. 14 is a message flow diagram schematically illustrating principle messages exchanged between three VTE clients 4 and elements of the collaboration services suite 2 during the creation of a team. In the scenario of FIG. 14, the creator of the new team is a user of VTE client (A) 4a, and respective users of VTE clients (B) and (C) are invited to join the team. Accordingly, the user of VTE client (A) launches an instance of a VTE client application 44, and utilizes the team management/team creation functionality 210/216 of the menu frame 148 to create a new team. The team creation functionality 216 may prompt the team creator to enter a team name and possibly other team related information (at 224), and identify each person to be invited to join the team (at 226), before forwarding a CreateTeam message 228 to the VTE server 40. Upon receipt of the CreateTeam message 228, the VTE server 40 instantiates a collaboration services suite 2 respecting the new team, and then forwards the CreateTeam message (at 230) to the Presence Server 42. Upon receipt of the CreateTeam message 230, the Presence Server 42 instantiates a status table 43 respecting the new team. The VTE server 40 can then send an AddTeamMember message 232 to the Presence Server 42, which responds to the AddTeamMember message 232 by populating the status table 43 with information (e.g. the personal identifier and communications information) respecting the team creator (i.e. the user of VTE client (A) 4a). Upon successful creation of the status table 43 and registration of the team creator as a team member, the Presence Server 42 returns a StatusEvent message 234 to the VTE server 40, which forwards StatusEvent messages (at 236 and 238) to the VTE client A) 4a in order to notify the team creator of successful creation of the team. Upon receipt of this StatusEvent message, the VTE client application 44a updates the virtual team space display 122 to reflect the identity of the newly created team, as well as the status of the team creator as a member of the team. Additional StatusEvent messages 240 are forwarded by the VTE server 40 to the VTE client (A) 4a in order to update the team view 14 of the team space display 122 to show each of the invitees (i.e. the users of VTE clients (B) and (C) 4b and 4c) as having a Pending status. The VTE server 40 then forwards an Invitation message 260 to a communications device (preferably a PC or a PDA capable of supporting a VTE client application 44) associated with the user of VTE client (B) 4b. If the communications device already has an installed instance of the VTE client application 44, then this instance can be launched in order to display the invitation (at 262) and receive the user's response (at 264). Otherwise, the Invitation message 260 may contain functionality enabling the user to install an instance of a VTE client application 44 in order to handle display and response to the invitation. As a still further alternative, the Invitation message 260 may be provided with a VTE client applet (not shown) enabling display of the invitation and handling of the associated invitation response without having to install a VTE client application 44. In the scenario illustrated in FIG. 14, the user of VTE client (B) chooses to accept the invitation to join the new team. Accordingly, an InvitationResponse message 266, indicating the user's acceptance of the invitation, is forwarded to the VTE server 40. Upon receipt of the InvitationResponse message 266, the VTE server 40 forwards an AddTeamMember message 268 to the Presence Server 42 in order to update the status table 43 with appropriate information (e.g. a personal identifier and communications information, if available) respecting the user of VTE client (B). The Presence Server 42 then returns a StatusEvent message 270, indicating successful registration of the new team member in the status table 43, to the VTE server 40, which propagates associated StatusEvent messages 272 to each of VTE clients (A) and (B) 4a, 4b, in order to update their respective virtual team space displays 122 to show the user of VTE client (B) 4b as a member of the team. If an instance of a VTE client application 44 has not previously been installed on a communications device encompassed by VTE client (B) 4b, then this installation can also be performed upon acceptance of the invitation by the user of VTE client (B) 4b. Additionally, the user of VTE client (B) 4b may elect to use the VTE client application 44 installed on their communications device to define and/or modify one or more personal profiles containing communications information indicative of their availability to participate in communications.

In a manner directly analogous to that described above with respect to VTE client (B) 4b, the VTE server 40 forwards an invitation message 274 to a suitable communications device (preferably a PC or a PDA capable of supporting a VTE client application 44) associated with the user of VTE client (C) 4c. Similarly, the invitation may be displayed on the communications device (at 276) using either a previously installed VTE client application 44, a new VTE client application 44 installed for this purpose, or a VTE client applet included with the invitation message 274. In the scenario illustrated in FIG. 14, the user of VTE client (C) elects to decline the invitation to join the new team at 278. Accordingly, an InvitationResponse message 280 is returned from the VTE client (C) 4c to the VTE server 40, which forwards appropriate StatusEvent messages 282 to each of VTE clients (A) and (B) 4a, 4b in order to notify their respective team members that the user of VTE client (C) 4c has declined to join the team, and to update their respective virtual team space displays 122 to remove references to the user of VTE client (C) 4c as a "pending" member of the team.

As mentioned previously, it is anticipated that a person may be a member of multiple teams. In these situations, it is likely that the person will wish to control the team space display 122 (see FIG. 10) respecting each of the teams in which they are a member. Thus the VTE client application 44 provides various functionality with respect to the display of information concerning multiple teams. In the embodiment of FIG. 11, this functionality includes user-selection 284 of those teams for which information should be displayed. Other functionality not illustrated in the drawings but which may usefully be implemented may include: color coding of team space displays 122 to help the user discriminate information of one team from information of other teams; and control over the type and/or scope of information concerning a team that is to be displayed. For example, the team member may wish to have the team view 14 of each team visible at all times, while information concerning team bulletins and public communications remains hidden (yet accessible using an icon, for example) in order to conserve space on a display monitor.

Figure 15:
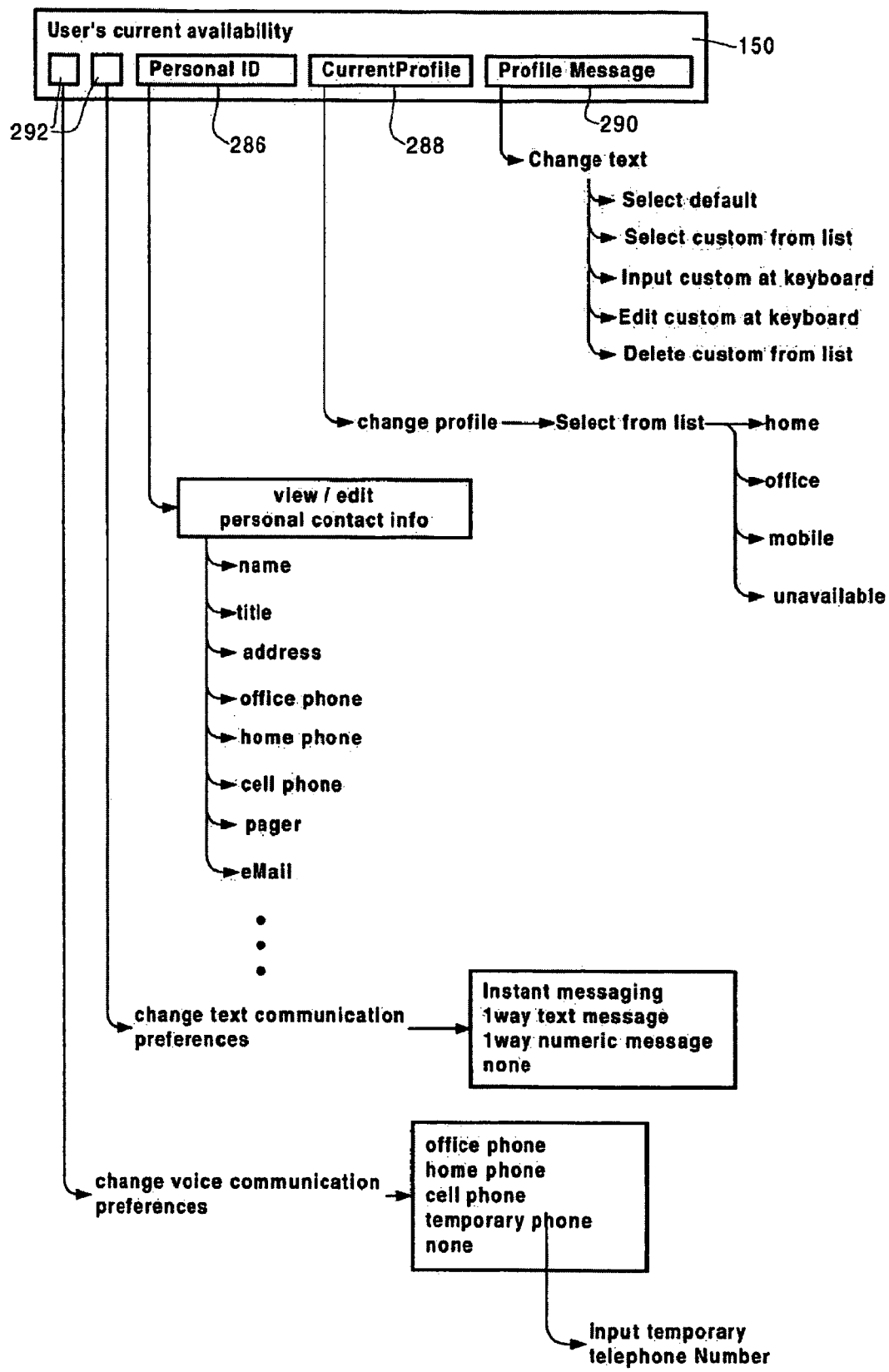
FIG. 15 is a schematic block diagram illustrating exemplary contents and functionality associated with the current availability frame of the team space display of FIG. 10.

As shown in FIG. 10, the virtual team space 122 includes a current availability frame 150 containing the team member's current preference and presence information as seen by other members of the team. FIG. 15 is a schematic block diagram illustrating exemplary contents and functionality associated with the current availability frame 150 of the team space 122. As shown in FIG. 15, the team member's current preference and presence information includes identity information associated with the team member, and communications information including communications preferences of the user for participating in communications with other members of the team. The team member's identity information is represented by the team member's personal identifier 286, which can be selected by the team member to view and/or edit their communications information. The team member's communications preferences are represented by a current profile identifier 288, and a Profile message 290 associated with the current profile. The team member's communications preferences information is indicated by icons generally indicative of the types of communications in which the team member prefers to participate, as identified in the current personal profile. Finally, the team member's presence information is represented by icon elements associated with each of the communications type icons, which indicate the current operational status of the user's preferred communications device for each type of communications session.

In the embodiment of FIG. 15, the team member can select the profile identifier 288 as an alternative means of accessing the "select profile" functionality 180 of the VTE client application 44 discussed above with respect to FIGS. 11 and 13. Thus the team member can select one of their personal profiles as their current profile, on a team-specific basis, as desired. In the illustrated embodiment, each personal profile includes a Profile Message 290 (e.g. a text string such as "in the office") which is distributed for display in the team view 14 of the team space display 122 instantiated for each of the other members of the team. This message 290 may be selected (e.g. from a predefined list of default and/or custom messages), or edited as desired by the user by selecting the Profile Message 290 in the current availability display 150. Any changes made by the team member are automatically forwarded by the VTE client application 44 to the VTE server 40, and propagated to each of the other members of the team.

As mentioned above, the communications preferences information includes information identifying the various types of communications (e.g. one-way and two-way messaging, voice, and multi-media) in which the team member is available to participate. In the illustrated embodiment, the communications preferences information is displayed by means of icons 292 within the current availability frame 150. Selection of these icons 292 enables the team member to access the edit profiles functionality 182 (see FIG. 11) of the VTE client application 44 to change the communications preferences information, for example by changing the type of alpha-numeric communications (e.g. by selecting one of: instant messaging; one-way numeric or alpha-numeric paging; or none) or by changing a preferred voice communications device. These changes are forwarded by the VTE client application 44 to the VTE server 40 and propagated to the other members of the team in order to enable those members to successfully initiate communications with the team member. In the illustrated embodiment, the team member's communications preferences information, personal identifier 286, and at least the Profile message 290, are forwarded to the collaboration services suite 2 and replicated to the VTE client applications 44 of each of the other members of the team. As a result, the team member is aware of the information, respecting themselves, that is being displayed in the team space display 122 of each of the other members of the team. Similarly, the communications preferences information, personal identifier 286, and Profile message 290 of each of the other members of the team are forwarded to the VTE client application 44 of the team member and displayed in the team view 14 of the team member's team space display 122 (see FIG. 10).

Figure 16:
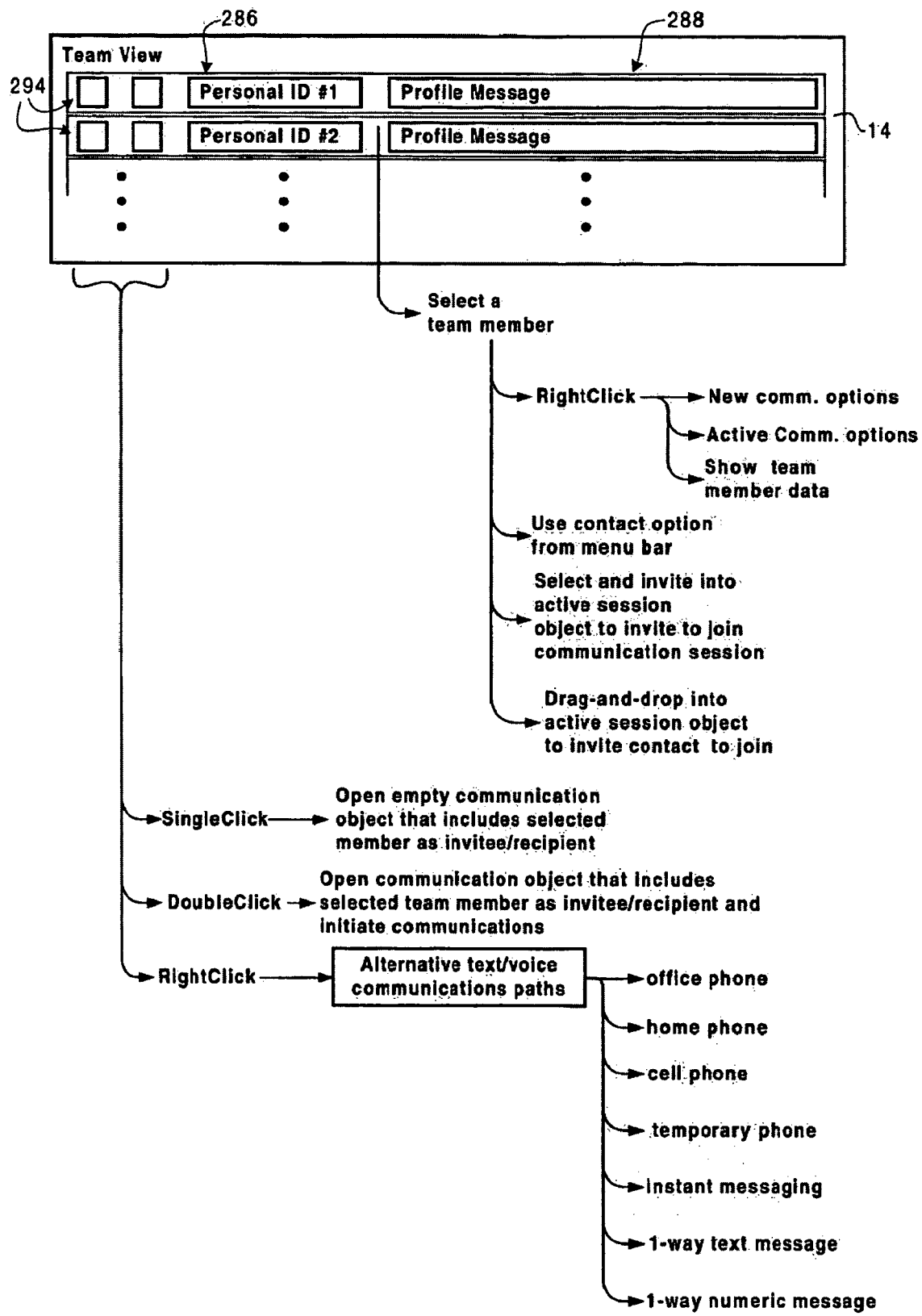
FIG. 16 is a block diagram schematically illustrating exemplary functionality of the VTE client application accessible using team member preference and presence information displayed in the team view of the team space display of FIG. 10.

FIG. 16 is a block diagram schematically illustrating exemplary functionality of the VTE client application 44 accessible using the team member preference and presence information displayed in the team view 14 (see FIG. 10). As mentioned above, the team view 14 is used to display preference and presence information of each of the other members of the team. In the illustrated embodiment, each of the other members of the team, who are currently logged into the collaboration services suite 2, are identified by their respective personal identifiers 286. Associated with each team member's personal identifier 286, there is also displayed the Profile message 288 entered by the respective team member, as well as one or more icons 294 representing the types of communications in which the respective team member prefers to participate. The icons 294 are preferably provided as composite icons made up of a type icon element and a presence icon element. As described above with reference to FIG. 2, the type icon element is preferably provided as a graphical depiction (e.g. depicting a telephone, cell-phone, etc.) representative of a type of communications (e.g. one way alpha-numeric messaging; two-way messaging, wire-line or wireless voice; multi-media, etc.) in which the respective team member is available to participate. This information will normally conform to the communications preferences information defined in the respective team member's current profile, as selected by the respective team member. The presence icon element is used to provide a graphical depiction representative of a status of the communications device which the respective team member has selected as their preferred communications device for each type of communications. Preferably, the presence icon element takes the form of graphical depictions representing respective ones of: an inaccessible status indicating that the associated preferred communications device is currently inaccessible (e.g. a wireless telephone may be turned off or out of range); an in-use status; and an idle status. The form of the type and presence icon elements are arbitrary, and may be selected as desired. In the illustrated embodiment (see FIG. 1), an in-use status of a communications device is represented by a presence icon element in a form of a human head, and an inaccessible status of a communications device is represented by a presence icon element in the form of a circle surrounding the associated preferred communications device. An idle status of a communications device is indicated by the absence of any other presence icon element (i.e. either indicating an in-use or inaccessible status). In general, the presence icon element associated with each device icon element of a particular team member will be automatically selected by the collaboration services suite 2, based on a detected operational status of the associated preferred communications device.

Figure 17:
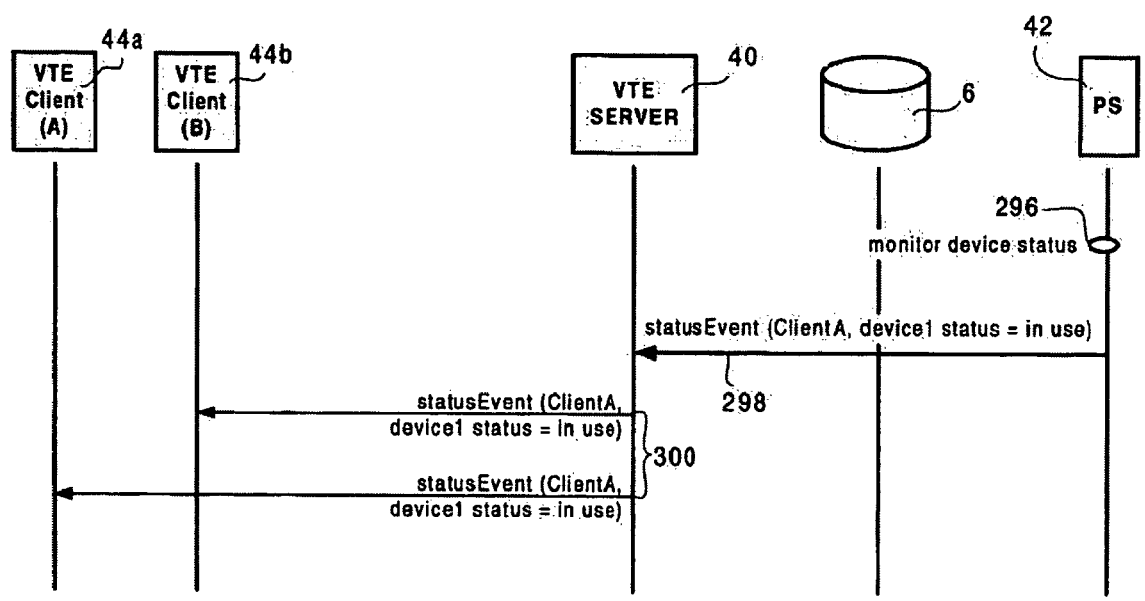
FIG. 17 is a message flow diagram illustrating exemplary functionality and message flows between the VTE client application and elements of the collaboration services suite in respect of detection and propagation of team member presence information to each of the members of a team.

FIG. 17 is a message flow diagram illustrating exemplary functionality and message flows between the VTE client application 44 and elements of the collaboration services suite 2 in respect of the detection of team member presence information and the propagation of this presence information to each of the members of the team. As shown in FIG. 17, the Presence Server 42 monitors the operational status (at 296) of each of the communications devices identified in the status table 43. If a change in the operational status of a communications device is detected, the Presence Server 42 formulates a StatusEvent message 298 identifying the device in respect of which the change in status was detected, the personal identifier 286 of the team member associated with the communications device, and information indicative of the new status of the communications device in question. This StatusEvent message 298 is forwarded to the VTE server 40 which propagates the StatusEvent message to each team member (at 300).

Various means may be employed by the Presence Server 42 to obtain the device status information, depending principally on the nature of the subject communications device. As mentioned above, the Presence Server 42 detects the device status information using the techniques described in Applicant's co-pending U.S. patent applications Ser. Nos. 09/460,780; 09/461,119; and 09/461,492 (all filed Dec. 14, 1999), the contents of which are hereby incorporated by reference. For example, in cases where the communications device is a personal computer (either a desktop PC, a Notebook, or a wireless applications program (WAP) enabled communications device such as a wireless personal digital assistant (PDA)), it is possible to install a VTE client application 44 on the communications device. The presence client 110 of the VTE client application 44 can then operate to detect the status of the respective communications device, and forward applicable Status messages to the Presence Server 42 at regular intervals. Accordingly, the Presence Server 42 can declare an unavailable status in the event that Status messages are not received from the presence client 110 for a predetermined period of time. In the event that Status messages are received, then the Presence Server 42 can declare that the associated communications device is available, and determine a busy or idle status based on the contents of the Status message. In the case of a wireless telephone, it is possible to determine the operational status (including, for example, an idle or busy status, an unavailable status, and in some cases even a geographical location) by querying the Home Location Registry (HLR) of the wireless telephone. An "on-hook" or "off-hook" status of a wire-line telephone connected to the PSTN can be determined by asserting an EAN query, via the call server 50 and/or VSP 60, against the local loop identified by the PSTN destination number (DN) of the telephone, in a manner known in the art. The Response message returned by the service switch point (SSP) hosting the wire-line telephone indicates the status of the telephone, again in a manner known in the art.

FIG. 16 also illustrates exemplary functionality of the VTE Client application 44 that may be accessed through the team view 14. In particular, access to the communications functionality of the VTE Client application 44 (e.g. the "new session" functionality 162 accessible under the "contact" category 156 of the menu frame 148) can usefully be obtained by using the communications icons 294 associated with a particular team member. Thus, in the illustrated embodiment, a single click on a communications icon 294 may be used to open an empty communications object of the relevant communications type (i.e. text, voice or multi-media) that includes the personal identifier 286 associated with the selected icon 294 located in an invitees frame to indicate that the selected team member is an invitee to the new communications session or a recipient of a one-way communication. A double click on an icon 294 may have a similar effect, but in addition also initiates the new communications with the identified team member, by launching a start communications message to the collaboration services suite 2.

A right click on an icon 294 may be used to access a selection of alternative communications paths. For example, a team member may select their "unavailable" profile to indicate that they are not available for communications with other members of the team. Based on the team member's selection of the "unavailable" personal profile as their current profile, the team view 14 of each of the other team members will include generic type and presence icon elements indicating that the team member is not available for text or voice communications sessions (as described above with reference to FIG. 1). However, by right clicking on the generic voice communications icon 38 (see FIG. 1) associated with the unavailable team member, a team member can obtain a listing of alternative communications paths, which may be selected to establish a voice communications session with the unavailable team member, effectively by-passing the "unavailable" profile selected by that team member.

As shown in FIG. 16, additional functionality of the VTE client application 44 may be accessed by selecting a team member, for example by clicking on either the personal identifier 286 or the Profile message 290 associated with the selected team member. For example, a right click may be used to obtain information concerning the selected team member, such as, for example, new or active communications preferences information and options, and identifying information of the team member. Additionally, functionality of the VTE client application 44 may be accessed through the menu frame 148 in respect of the selected team member. Thus, for example, the menu frame 148 may be used to open a new voice communications session object in which the selected team member is identified (e.g. by way of the personal identifier 286) as an invitee. Furthermore, the VTE client application 44 can be designed to support "drag and drop" functionality to enable a team member to "drag" a personal identifier 286 of a selected team member into an already opened communications session object in order to invite the selected team member to join a new or active communications session.

FIG. 18 is a block diagram schematically illustrating exemplary elements of the team bulletins frame 152 of the team space display 122. The team bulletins frame 152 generally comprises a display area 302 in which each of the bulletins posted to the collaboration services suite 2 (by any of the members of the team) are displayed, and an "edit" icon 304 used for accessing an edit bulletins object 306 which may be used by the team member in order to edit existing bulletins and/or create and post new bulletins to the collaboration services suite 2. The detailed implementation of both the team bulletins frame 152 and the edit bulletins object 306 may be selected as desired, and therefore are not described in detail.

FIG. 19 is a block diagram schematically illustrating the active communications frame 154 of the team space display 112 (see FIG. 10). The active communications frame 154 is used within the team space display 122 to display session information 308 concerning active communications sessions involving one or more members of the team. In the embodiment of FIG. 19, session information 308 concerning two active communications sessions is illustrated in the active communications frame 154. It will be appreciated that any number of active communications sessions may be displayed in the active communications frame 154, as desired. The session information 308 displayed within the active communications frame 154 may include any information relevant to the respective communications session. Additionally, the manner in which the session information 308 is represented within the active communications frame 154 (e.g. using icons and/or text) is arbitrary, and may be selected as desired. In the illustrated embodiment, the session information 308 displayed within the active communications frame 154 includes, for each active communications session, an icon 310 graphically representing a type of the communications session (e.g. voice, text, or multi-media), and a set of text frames 312, 314, 316 respectively displaying information concerning the type of the communications session, a session topic, and a listing of team member personal identifiers 286 indicating those team members who are current participants in the communications session.

As mentioned previously, the functionality of the VTE client application 44 enables a user to join an active communications session. This functionality may be accessed by clicking on the icon 310 associated with the desired active communications session in order to launch a Join Session message to the collaboration services suite 2. Alternatively, the team member may join an active session by selecting a desired communications session within the active communications frame 154 of the team space display 122, and then using the menu frame 148 (see FIG. 11) to access the appropriate active session functionality 164 under the "contact" category 156. Upon receipt of the Join Session message, the collaboration services suite 2 operates to join the team member into the selected active communications session in a manner which will be described in greater detail below.

It is anticipated that for some communications sessions, the participants will wish to keep the communications session "private", at least in the sense that they will not wish other members of the team to join the communications session uninvited. In other cases, session participants may wish to keep the communications session "public" and so allow other team members to join the communications session without an invitation. Thus the present invention enables a communications session to be marked as either a public or private communications session, and this marking is preferably reflected in the active communications frame 154 of the team space display 122. A preferred method of accomplishing this is to implement the functionality of the VTE client application 44 and the collaboration services suite 2 such that only session information concerning public communications sessions is displayed in the active communications frame 154 of the team space display 122. As a result, the team member would not be aware of any private communications sessions in which they themselves were not a participant. An alternative approach involves using the graphical representation of the icon 310 to indicate whether or not the user is able to join the associated communications session without having received any invitation from one of the current participants. In this case, the session information 308 concerning a private communications session would be displayed in the active communications session frame 154, and thus a user would be aware that the communications session was taking place. However, the graphical representation of the icon 310 would indicate the private status of the communications session, and thus the user would also be aware of their inability to join the communications session without an invitation.

It is also anticipated that a team member may wish to join a public communications session as either a listener (i.e. in order to monitor the communications session, but without contributing content and/or being visible as a participant), or a full participant. As shown in FIG. 19, this functionality may be accomplished by the VTE client application 44 responding to the team member's clicking on the icon 310 associated with the desired communications session by opening a JoinSession object (not shown) in which the team member has an opportunity to select their participation level (shown at 318). The user's selection in this respect can then be used to formulate an appropriate parameter which is transmitted to the collaboration services suite 2 along with the JoinSession message in order to control the set-up of communications links between the team member and the active communications session.

FIG. 20 is a message flow diagram illustrating exemplary functionality and messages exchanged between VTE client applications 44 and the VTE server 40 in respect of an exemplary public communications session. In the scenario illustrated in FIG. 20, an instant messaging session is initiated (at 320) by the user of VTE client (A) 4*a* by using the functionality of the VTE client application 44*a* to open an IM session object. The user elects to identify the IM session as a public session (at 322), selects (at 324) the user of VTE client (B) as the person with whom they wish to communicate, enters text information respecting the session topic (at 326), and enters an initial text message directed to the user of VTE client (B) 4*b* (at 328). Based on this information, the VTE client (A) 48 formulates and sends an IM session message 330 to the VTE server 40, which extracts the session information entered by the user of VTE client (A) and opens an IM session record (at 332) in respect of the IM session. The VTE server 40 then forwards the IM message to the VTE client (B) (at 334) in order to initialize the two-way instant messaging session between the users of VTE clients (A) and (B). Because the user of VTE client (A) 4*a* indicated the session type of the IM session as "public", StatusEvent messages are forwarded (at 336) to each of VTE clients (C) and (D) in order to update the active communications frame 154 of their respective virtual team space displays 122. Thereafter, two-way IM session traffic flows 338 between VTE clients (A) and (B) via the VTE server 40.

Subsequent to initialization of the above instant messaging session, the user of VTE client (C) 4*c* accesses the functionality of their respective VTE client application 44*c* to send a JoinSession message 340 indicating the user's desire to join the active instant messaging session as a participant. In response to the JoinSession message 340, the VTE server 40 updates the session information contained in the session record (at 342), and forwards StatusEvent messages to each of VTE clients (A), (B), (C) and (D) (at 344) in order to update the respective team space displays 122 to show the status of the user of VTE client (C) 4*c* as a participant in the active IM session. Thereafter, the active IM session continues (at 346), with two-way IM message flows between each of VTE clients (A), (B) and (C), mediated by the VTE server 40.

Subsequently, the user of VTE client (D) 4*d* accesses the functionality of their respective VTE client application 44*d* in order to join the active IM session as a listener. Thus the VTE client (D) 4*d* forwards an appropriate JoinSession message (at 348) to the VTE server 40, which updates the session information contained in the session record to include the user of VTE client (D) 4*d* as a listener of the active IM session. Because the user of VTE client (D) 4*d* has joined the active IM session as a listener (rather than as a participant) the VTE server 40 continues forwarding two-way IM traffic between each of VTE clients (A), (B) and (C) (at 350), without interruption. However, this IM message traffic is copied (at 352) as a stream of one-way IM messages to VTE client (D) 4d, so that the user of VTE client (D) 4d is maintained aware of the content of the active IM session. However, the user of VTE client (D) is unable to forward IM messages (as part of the active IM session) to any of the participants in the active IM session. In the scenario illustrated in FIG. 20, the participants in the active IM session (i.e. the users of VTE clients (A), (B) and (C)) are not notified by the VTE server 40 that the user of VTE client (D) 4d has joined the active session as a listener. However, it will be appreciated that such notification may readily be provided by forwarding appropriate StatusEvent messages as described above with respect to the joining of the user of VTE client (C) 4c to the active communications session.

Figure 22:
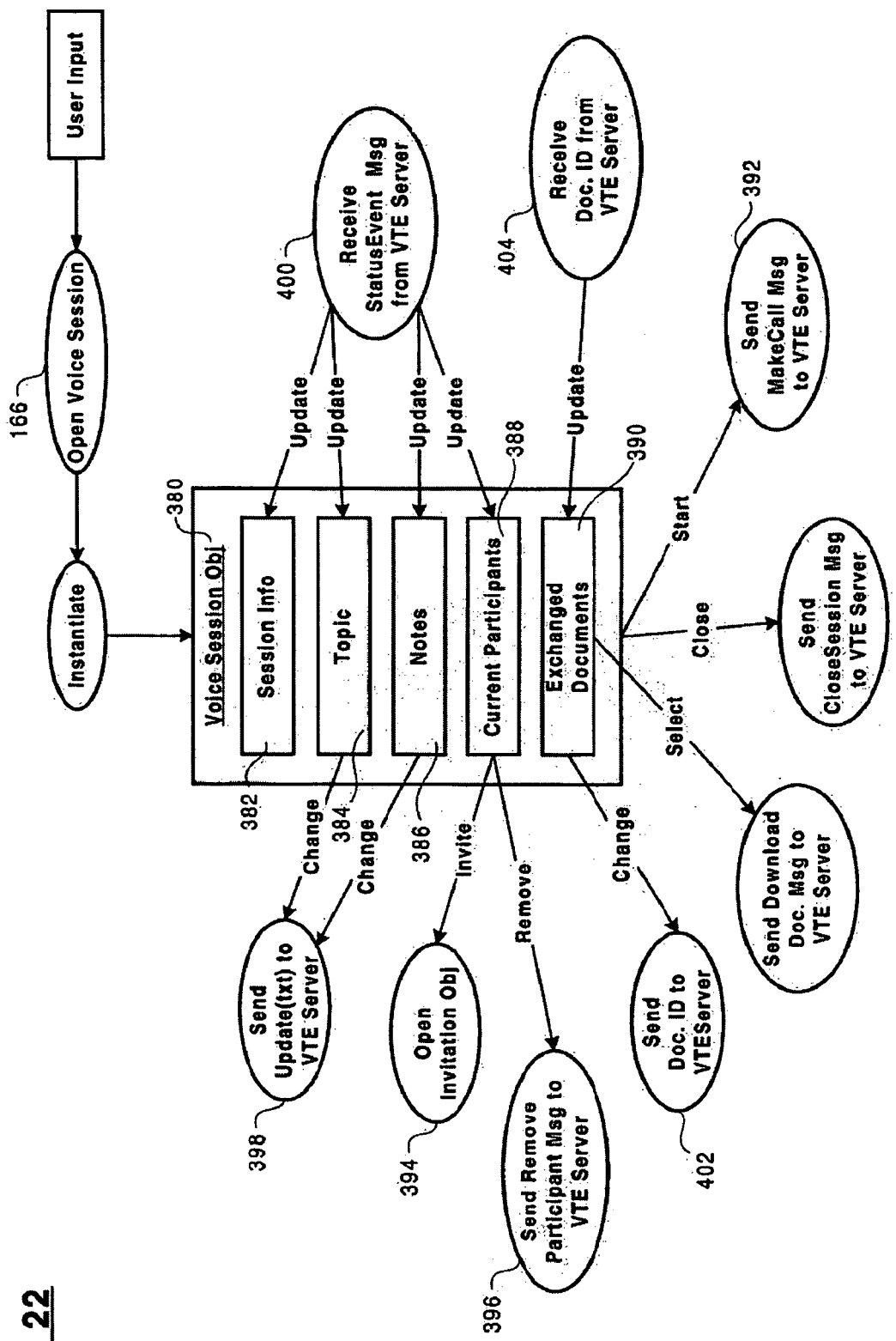
FIG. 22 is a block diagram schematically illustrating exemplary functionality associated with a Voice Session Object instantiated by a VTE Client application in respect of a voice communications session.
Figure 23:
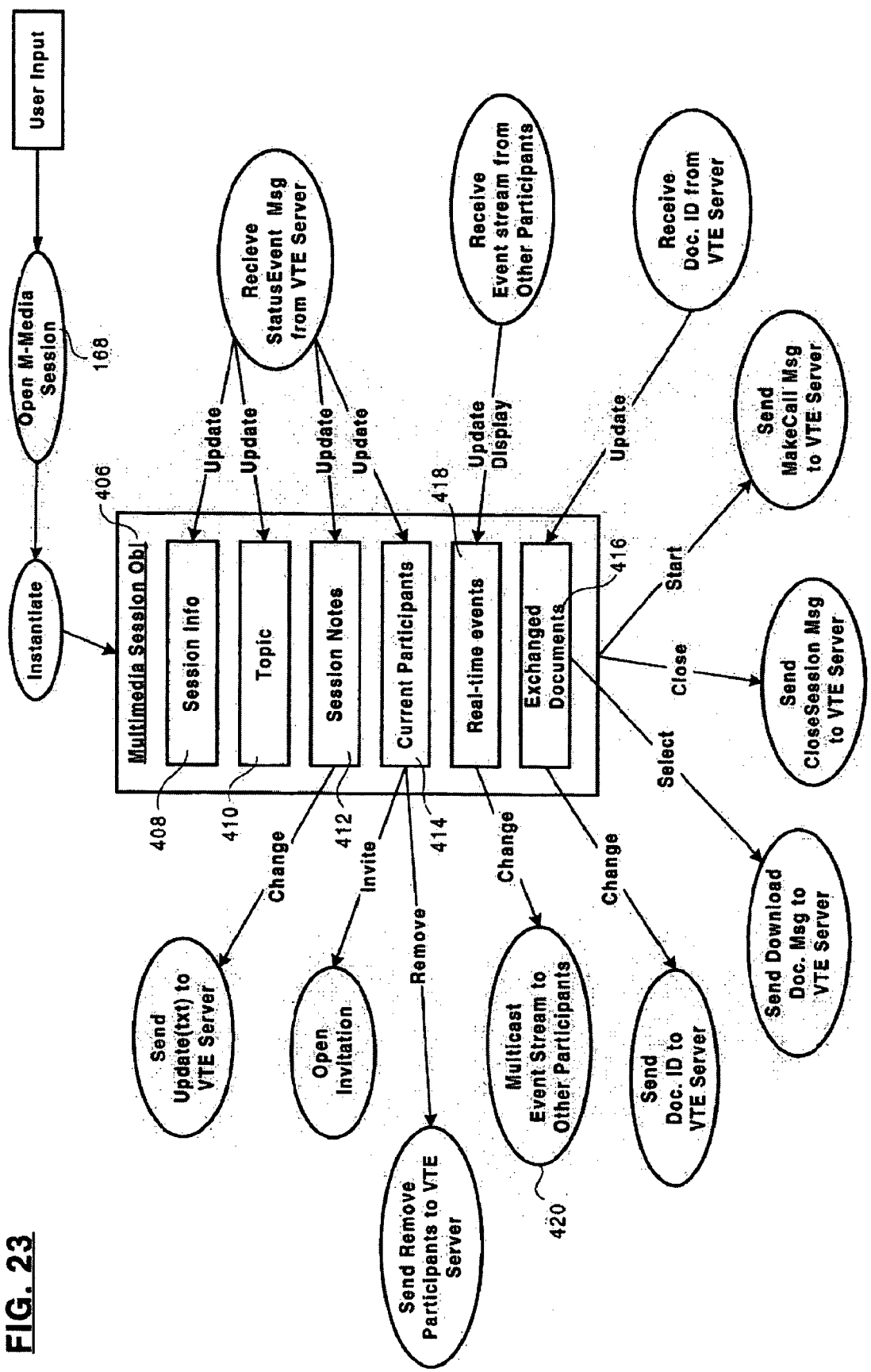
FIG. 23 is a block diagram schematically illustrating exemplary functionality associated with a Multi-media Session Object instantiated by a VTE Client application in respect of a multi-media communications session.
Figure 25:
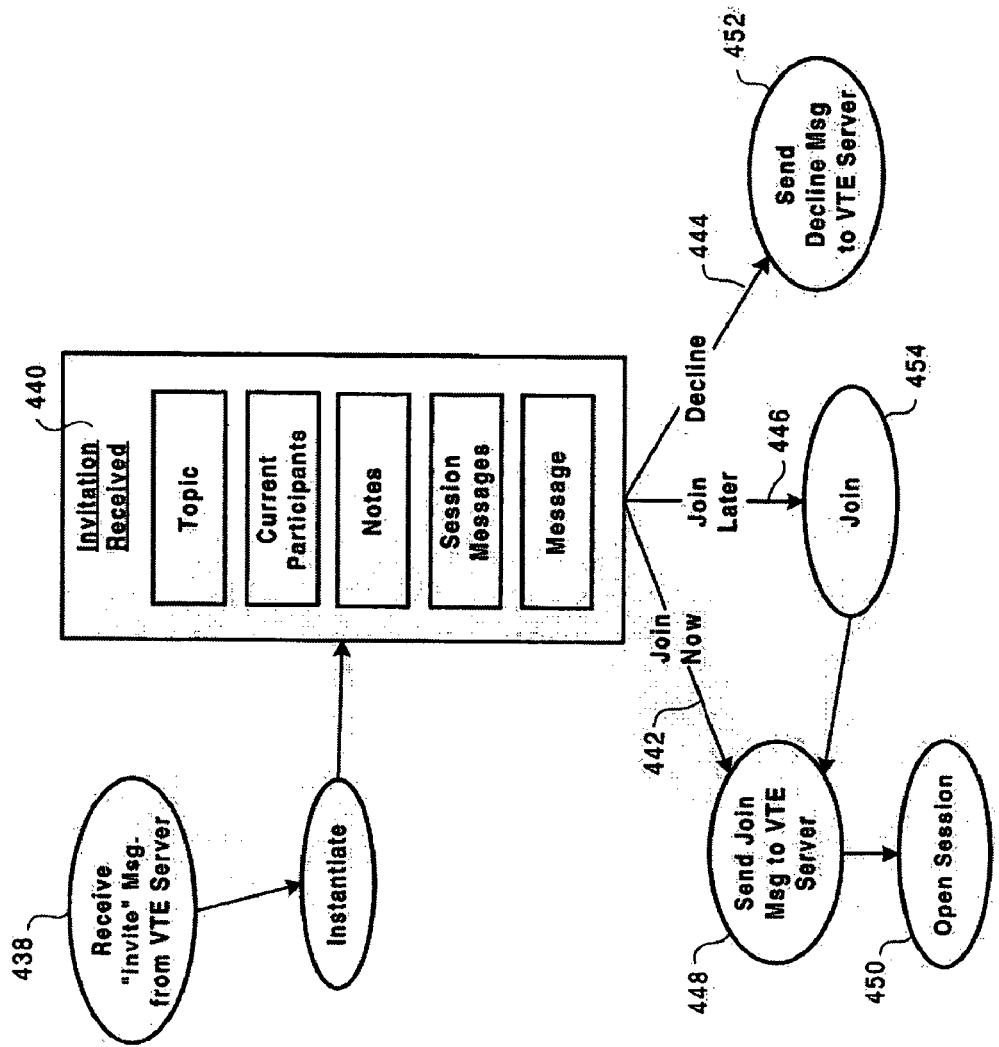
FIG. 25 is a block diagram schematically illustrating exemplary functionality of a VTE client application associated with an Invitation message received from another team member via the collaboration services suite.
Figure 24:
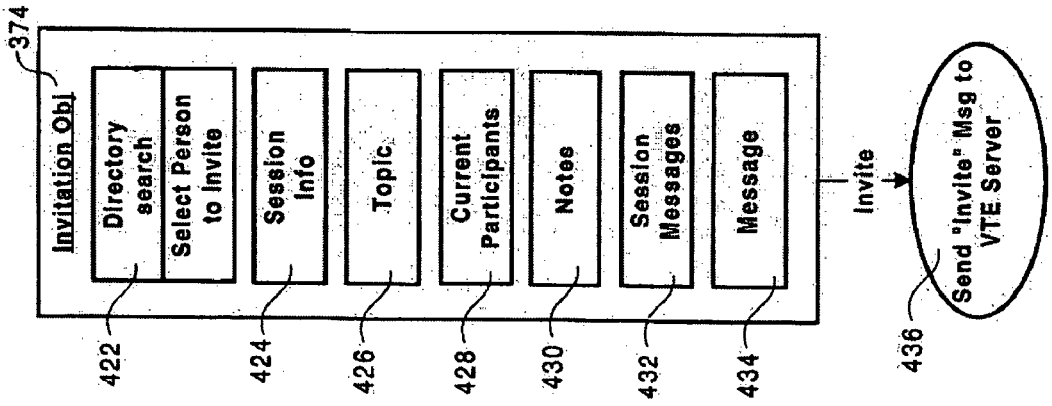
FIG. 24 is a block diagram schematically illustrating exemplary functionality associated with an invitation object instantiated by a VTE client application for inviting a new participant to join an active communications session.

As described above, the VTE client application 44 is adapted to interact with the collaboration services suite 2 to enable a user to initiate or participate in communications sessions with other team members. FIGS. 21 through 23 are block diagrams schematically illustrating exemplary functionality of the VTE client application 4 in respect of instant messaging, voice and multi-media communications sessions respectively. FIGS. 24 and 25 are block diagrams schematically illustrating exemplary functionality of the VTE client application 44 concerning the sending and receiving of invitations to join an existing communications session. FIGS. 26 through 36a present message flow diagrams illustrating exemplary functionality of the collaboration services suite 2 associated with the set up and tear down of communications sessions in response to messages received from the VTE client application 44 illustrated in FIGS. 21 through 23. Similarly, FIGS. 26 through 36a present message flow diagrams illustrating exemplary functionality of the collaboration services suite 2 in respect of the handling of invitations to join active communications sessions in response to messages received from the VTE Client application 44 illustrated in FIGS. 24 and 25.

Referring now to FIG. 21, user participation in an instant messaging session is enabled using an IM session object 354 which can be instantiated by user input, either by accessing the new IM session functionality 170 of the menu frame 148 (see FIG. 11) or by clicking on a text messaging icon 249 associated with a selected team member whose availability information is displayed in the team view 14 of the team space display 122. The IM session object 354 may also be automatically instantiated by the VTE client application 44 if an Instant Message, that is not associated with an active IM session, is received from another team member (as shown at 356). In general, the IM session object 354 serves as a container for information respecting a respective instant messaging session and provides access to functionality of the VTE client application 44 and collaboration services suite 2 for controlling the associated instant messaging session. Exemplary information contained by the IM session object 354 includes: session information 308; a session topic 357; a new message 358 entered by the team member for transmission to the other participants of the IM session; a record of session messages 360 previously exchanged between participants in the IM session; a listing 362 identifying each of the current participants in the IM session; and a listing of documents exchanged 363 between participants in the IM session.

The session information 308 may include any administrative or "tombstone" data that may be desired for archiving and session administration purposes. Exemplary data usable in this respect may include any one or more of: a session identifier providing a unique tag for identification, threading, archiving and/or future retrieval of information concerning the communications session; information concerning a session topic, which may be entered and/or edited by any of the session participants; session start and stop times; information identifying the team member who initiated the IM session; and information identifying the team member who invited the respective team member into the IM session.

As described above, an IM session object 354 respecting a new instant messaging communications session can be instantiated via the menu frame 148 or the team view 14. In either case, the team member may use the functionality of the VTE client application 44 in order to place the personal identifiers 286 of each person, with whom they wish to communicate, into the current participants frame 362 of the IM session object 354. This may be accomplished either by using a "drag and drop" functionality of the VTE client application 44, or by the menu bar 148. Having thus identified each of the persons with whom the team member wishes to communicate, the team member may select an appropriate icon or button (e.g. a Start button) to cause the VTE client application 44 to launch an OpenSession message (shown at 364) containing the personal identifiers of each of the invitees selected by the team member to the collaboration services suite 2 in order to initiate the communications session. Following initialization of the communications session, the collaboration services suite 2 monitors the status of each of these participants in the communications session and forwards member Status messages 366 to the VTE client application 44. These member Status messages are used by the VTE client application 44 to update presence and status information respecting each of the team members identified in the current participants frame 362 of the instant messaging session object 354.

The session topic frame 357 of the IM session object 354 may be used to enable the participants in the IM session to input and/or edit a text description of a session topic. During the course of the communications session, a change in the topic frame entered by the team member can be forwarded to the collaboration services suite 2 by means of an Update message (at 359), and subsequently propagated to each of the session participants by way of a StatusEvent message. Upon receipt of a StatusEvent message containing revised text of the topic frame (at 361), the VTE client application 44 extracts the revised topic text and updates the topic frame 357 of the IM session object 354.

The team member can send a message to the other participants in the communications session by typing the text message into the New message frame 358 of the IM session object 354, and clicking an appropriate icon or button (e.g. a Send button) to send the text message (368) to the collaboration services suite 2, which replicates the message to each of the other participants in the communications session. Text messages originating from each of the other participants in the communications session are propagated to the VTE client 4 (at 370) of the team member via the collaboration services suite 2 in the same manner, and are used by the VTE client application 44 to update the Session messages frame 36 of the instant messaging session object 354. During the course of the IM session, it may be decided to invite another person (who may or may not be a member of the team) to join the IM session. Thus the VTE client application 44 provides an appropriate icon or button (e.g. an Invite button) which enables the team member to open (at 372) an invitation object 374, which will be described in greater detail below with respect to FIG. 24. In addition, an appropriate button (e.g. a Remove button) may be provided to enable the current participants in the IM session to remove a participant IM session, by sending a Remove Participant message to the VTE server 40 (at 369). This functionality may, for example, be used to remove a party who has been invited to the IM session, but who has not responded to the invitation.

It is also possible that the current session participants may wish to terminate the instant messaging session and continue the conversation using an alternative type of communications, such as, for example, voice communications. Consequently, the VTE client application 44 provides an appropriate icon or button (a ConvertSession button) which enables the team member to launch a ConvertSession message (at 376) to the collaboration services suite 2 to facilitate conversion of the communications session to the desired communications type. Finally, the VTE client application 44 provides an appropriate icon or button (e.g. a Close button) which can be selected by the team member to send a CloseSession message (at 378) to the collaboration services suite 2 in order to terminate the instant messaging session.

The exchanged documents frame 363 is considered to be optional, and may or may not form a part of an instance of an IM session object 354. In general, the exchanged documents frame 363 is used to record information identifying any documents exchanged, or otherwise discussed during the course of the communications session. This information may take the form of: a copy of the document itself; a document name; an address or path specification for locating the document on a network; or a hypertext link enabling the user to open the document in a suitable browser or word processor window. Changes in the information contained in the exchanged documents frame 363 are forwarded (at 365) by the VTE client application 44 to the collaboration services suite 2, which propagates the revised information to each of the other participants in the communications session. Updated exchanged document information contained within Update messages received (at 367) from the collaboration services suite 2 is extracted from the message by the VTE client application 44 and used to update the contents of the shared documents frame 363.

FIG. 22 is a block diagram schematically representing functionality of the VTE client application 44 in respect of voice communications sessions involving the team member. As with IM sessions, functionality of the VTE client application 44 in respect of voice communications sessions is enabled by means of a voice session object 380 which is instantiated by the VTE client application 44 for the duration of the team member's participation in the voice communications session. Similarly, the voice session object 380 will normally be instantiated in response to user input. In the case of a new voice communications session, the voice session object 380 can be instantiated either by the team member accessing the new voice session functionality 166 of the VTE client application 44 through the "contacts" category 156 of the menu frame 148 (see FIG. 11), or by selecting a device icon (in the team view 14) representing a voice communications device associated with a team member with whom the user wishes to communicate. The voice session object 380 may also be instantiated by the VTE client application 44 in respect of a active voice communications session, in response to either the team member responding to an invitation (see FIG. 25) or by the user selecting a communications icon 310 of an active communications session identified in the active communications frame 154 of the team space display 122 (see FIG. 19).

In general, the voice session object 380 contains communications information related to the voice communications session. This communications information will typically include: session information 382; a session topic 384; a listing of meeting or session notes 386 entered by the participants of the communications session; and a listing of the personal identifiers corresponding to each of the current participants 388 in the communications session. Additionally, a listing of any documents exchanged 390 by the participants in the communications session may also be included in the voice session object. At least the session information 382 and listing of current participants 388, as well as the functionality of the VTE client application 44 related to this information is closely similar to that described above in relation to instant messaging sessions. Thus, for example, the session information 382 may include any one or more of: a session identifier; information identifying (e.g. by way of the personal identifier) the person who initiated the communications session; information identifying (e.g. by way of the personal identifier) the person who invited the team member to join the communications session; start and stop times of the communications session; as well as any other information that may be desirable for administration, management, or archiving purposes in relation to the communications session. The listing of current participants 388 may be used during initiation of the communications session, as described above with reference to FIG. 21, to control the start-up of the voice communications session following the launch of a MakeCall message (at 392) to the collaboration services suite 2. During the course of the communications session, other persons (who may or may not be members of the team) may be invited to join the communications session (at 394), either by using "drag and drop" functionality of the VTE client application 44 to drag the personal identifier of the invitee from the team view 14 of the team space display 122 into the current participants list 388 of the voice session object 380, or alternatively by clicking on an Invite icon or button. In either case, an Invitation object 374 is opened to enable the team member to launch an Invitation message to the selected invitee, in a manner which will be described in greater detail below with respect to FIG. 24. Conversely, the current participants list 388 can also be used to remove a participant from the active voice session (at 396). This may be accomplished either by using the "drag and drop" functionality of the VTE client application 44 to drag the personal identifier of the selected participant out of the current participant's frame 388, or by clicking on a Remove icon or button. In either case, the VTE client application 44 responds by forwarding a RemoveParticipant message to the collaboration services suite 2 to effect the removal of the identified participant from the communications session.

The session topic frame 384 of the voice session object may be used to enable the participants in the communications session to input and/or edit a text description of a session topic. During the course of the communications session, a change in the topic frame entered by the team member can be forwarded to the collaboration services suite 2 by means of an Update message (at 398), and subsequently propagated to each of the session participants by way of a StatusEvent message. Upon receipt of a StatusEvent message containing revised text of the topic frame (at 400), the VTE client application 44 extracts the revised topic text and updates the topic frame 384 of the voice session object 380.

Similarly, the meeting or session notes frame 386 of the voice session object 380 is used to store text information (which may take the form of messages, memos, notes, or any other text information) which the participants wish to have recorded in association with the communications session. As with the topic frame 384, new session notes (and/or changes to existing session notes) are forwarded by the VTE client application 44 to the collaboration services suite 2 (at 398), which then propagates the changes to the other participants in the communications session by way of a StatusEvent message. Upon receipt of a StatusEvent message (at 400) containing updated text of the session notes frame 386, the VTE client application 44 extracts the updated text, and uses this information to update the contents of the session notes frame 386.

The exchanged documents frame 390 is considered to be optional, and may or may not form a part of an instance of a voice session object 380. In general, the exchanged documents frame 390 is used to record information identifying any documents exchanged, or otherwise discussed during the course of the communications session. This information may take the form of: a copy of the document itself; a document name; an address or path specification for locating the document on a network; or a hypertext link enabling the user to open the document in a suitable browser or word processor window. Changes in the information contained in the exchanged documents frame 390 are forwarded (at 402) by the VTE client application 44 to the collaboration services suite 2, which propagates the revised information to each of the other participants in the communications session. Updated exchanged document information contained within Update messages received (at 404) from the collaboration services suite 2 is extracted from the message by the VTE client application 44 and used to update the contents of the shared documents frame 390.

FIG. 23 is a block diagram schematically illustrating functionality of the VTE client application 44 with respect to multi-media communications sessions. This functionality is implemented by the VTE client application 44 by means of a multi-media session object 406 which includes many of the characteristics and features of the voice session object 380 described above with respect to FIG. 22. This includes: functionality with respect to instantiation of the multi-media session object 406 (for both initialization of a new multi-media session and for joining an active multi-media session that is already in progress); session information 408 for administration, management, and archiving purposes; a session topic 410; session notes 412; session participants 414; and exchanged documents 416. Accordingly, these elements will not be described in further detail below. The primary difference between the multi-media session object 406 and the voice session object 380 described above with respect to FIG. 22, is that the multi-media session object 406 also includes a "real time events" frame 418 for processing multi-media events in real time. Exemplary real time events of the type contemplated by the present invention include: a video stream such as, for example, a video stream of a video conferencing session; user and other session participant input respecting a shared white board; and application events generated by a software application or document being shared by two or more of the participants in the multi-media session. Events generated within the VTE client application 44, either due to team member input or from some other multi-media device (e.g. a video camera) are forwarded (at 420) as an event stream to respective multi-media communications devices associated with each of the other participants in the multi-media session via, for example, IP multicasting as discussed in greater detail below. Corresponding event streams from each of the other participants are used (at 422) by the VTE client application 44 to update the contents of one or more associated real time displays (not shown).

FIG. 24 is a block diagram schematically illustrating exemplary functionality of an invitation object 374 opened by the VTE client application 44 for inviting one or more new participants to join an active communications session. These new participants may be a member of the team, or alternatively may be any other individual for whom appropriate contact information is available. Accordingly, the invitation object 374 includes a directory search frame 422 which provides access to one or more directories enabling the user to identify and select each person to whom they wish to direct the invitation. The directories accessed by the directory search frame 422 may be a personal directory compiled by the team member, a corporate or enterprise directory, or a public directory such as, for example, the "Canada 411" directory accessible through the public internet. In addition to the directory search frame 422, the invitation object 374 may contain information relevant to the associated communications session. Conveniently, this information will be composed of an extract of the information contained in the IM, voice or Multi-media session object 354, 380 or 406 respectively from which the invitation object 374 was opened. The intention of this information is to both enable the collaboration services suite 2 to associate the invitation message (and any invitation responses received from the invitee) with the communications session, as well as to provide the invitee with sufficient information concerning the communications session to enable them to make a decision regarding whether or not they wish to join the communications session. Thus in the illustrated embodiment, the invitation object 374 contains an extract of the session information 424 (containing at least the session identifier); a session topic 426; a listing of the personal identifiers of each of the current participants in the communications session 428; a record of any session notes 430 and/or session messages 432 entered by the participants in the communications session; as well as a text message 434 that the team member wishes to forward to the invitee as part of the invitation. Most of this information can be extracted automatically by the VTE client application 44 from the associated communications session object, so that the team member may merely identify and select each person to whom the invitation is to be directed, and optionally enter a message 434, concerning the invitation, to the proposed invitees. The team member can then cause the VTE client application 44 to formulate and send an appropriate Invitation message (at 436) to the collaboration services suite 2, by clicking on an appropriate Invite button or icon of the invitation object 374. In general, the Invitation message will contain the information contained in the invitation object (extracted from the communications object), along with information identifying the invitee. In cases where the invitee is a member of the team, the information identifying the invitee will consist of the invitee's personal identifier. In other cases, the information identifying the invitee will include an address (e.g. a PSTN Destination Number, an IP address, or an e-mail address) of a communications device associated with the invitee. Based on this information, the virtual team environment 3 formulates and sends an Invitation message to the invitee. Exemplary steps and message flows in respect of Invitation messages are described in greater detail below with respect to FIGS. 28-36a.

FIG. 25 is a block diagram schematically illustrating exemplary functionality of the VTE client application 44 associated with an Invitation message received (at 438) from the collaboration services suite 2. As described above with reference to FIG. 14, in cases where the invitee's communications device already has an installed instance of a VTE client application 44 (regardless of whether or not they are a member of the team), this functionality may be provided by the installed VTE client application 44. If the invitee does not have a VTE client application 44, then either one can be installed, or the functionality may be provided by an invitation object (which may, for example be implemented as a java applet) provided by the collaboration services suite 2, and adapted to be instantiated within a suitable browser window. In a still further alternative, in cases where the invitation must be delivered to the invitee through a voice communications device, the functionality of FIG. 25 can be provided by an interactive voice response (IVR) interface of the collaboration services suite 2.

In general, the Invitation message 440 received by the invitee contains the information assembled by the invitation object 374 from which the invitation was launched. The functionality associated with the received invitation 440 enables the invitee to respond to the invitation 440 by indicating their willingness to join the communications session immediately (at 442), decline the invitation (at 444) and not join the communications session, or join the communications session at a later time (at 446). In each case, the invitee may send a reply message (not shown) back to the individual who caused the invitation to be forwarded to the invitee. This reply message will normally take the form of a one-way message. However, the invitee may also choose to initiate an instant messaging session with the invitor.

If the invitee elects to join the communications session immediately (at 442), which may be indicated by clicking an appropriate button or icon, a Join message is returned (at 448) to the collaboration services suite 2, and an appropriate session object 354, 380 or 406 instantiated in respect of the communications session (at 450). In response to the Join message, the collaboration services suite 2 operates to join the invitee into the communications session. Exemplary steps and message flows in respect of adding an invitee into an active communications session are described below with respect to FIGS. 28-36*a*.

In the event that the invitee elects to decline the invitation (at 444), an associated Decline message is forwarded (at 452) back to the person who initiated the invitation. In cases where the invitation is delivered to the invitee using a GUI-enabled communications device, the invitee may also be presented with a messaging window (not shown) to enable the invitee to enter a message to the invitor (e.g. to explain their unwillingness to join the communications session). An analogous functionality can also be implemented when the invitation is delivered to the invitee through a voice communications device via an IVR interface. In this case, the IVR interface may prompt the invitee to provide a Voice message, which can be recorded by the IVR interface and then forwarded as a VoiceMail message to the invitor.

If the invitee wishes to join the communications session at a later time (446), a deferral message may be returned to the collaboration services suite 2 and/or the person who initiated the invitation message, to indicate that the invitee has deferred joining the communications session. Whether or not a deferral message is sent, the invitation object remains active, so that the invitee can join the communications session (at 454) by clicking an appropriate button or icon to send a Join message (at 448) to the collaboration services suite 2, as described above. In response to the Join message, the collaboration services suite 2 operates to join the invitee into the communications session. Exemplary steps and message flows in respect of adding an invitee into an active communications session are described below with respect to FIGS. 28-36*a*.

Establishing Voice Communications Sessions

Collaboration between geographically-dispersed members of a team is facilitated by instantiating a virtual team environment (VTE) 3 in accordance with the invention. In the VTE 3, voice communications sessions are preferably established in such a way that the collaboration services suite can exercise control over the calls at any time required by members of the team. In one embodiment, control is exercised using a virtual switching point (VSP), also referred to as an enhanced application node (EAN) in the public switched telephone network (PSTN). As described, for example, in co-Applicant's U.S. Pat. No. 6,097,804, a plurality of Integrated Services Digital Network User Part (ISUP) voice trunks in the PSTN are provisioned such that the VSP is a virtual switching point logically situated between opposite ends of the respective ISUP trunks. Trunks provisioned in this way are hereinafter referred to as "Enhanced ISUP (E-ISUP)" trunks, designated as E-ISUP (A), (B) and (C) in FIG. 30. The respective E-ISUPs may be located anywhere in the PSTN. Since the VSP is a virtual switching point, its physical relationship with the respective E-ISUP trunks is arbitrary.

Establishing Two-Way Voice Communications Sessions

FIG. 26 is a message flow diagram showing messages exchanged between components of the collaboration services suite of the VTE in accordance with the invention, as well as certain components of the public switched telephone network (PSTN) involved in voice communications establishment. The components of the PSTN include: service switching point (SSP) (X), which serves the telephone of a team member using VTE client A; SSP (Y), which serves a telephone of a team member using VTE client (B); SSP (Z), which serves a telephone of a team member using VTE client (C); SSP (D), which serves a conference bridge in a manner well known in the art; an SSP1 connected to one end of an E-ISUP trunk (A); an SSP2 connected to the other end of the E-ISUP trunk (A); an SSP3 connected to one end of an E-ISUP trunk (B); an SSP4 connected to the other end of the E-ISUP trunk (B); an SSP5 connected to one end of an E-ISUP trunk (C); and, an SSP6 connected to the other end of the E-ISUP trunk (C). As will be understood by those skilled in the art, the SSPs 1-6 can be a single SSP equipped with loop-back trunks, different SSPs, or two or more SSPs, depending on the network configuration used to implement the invention. For simplicity of illustration, the SSPs 1-6 are represented as separate service switching points.

For simplicity of illustration, only the three E-ISUP trunks are shown in FIG. 26. More E-ISUP trunks may be used in any given implementation of a VTE in accordance with the invention.

As explained above with reference to FIG. 22, team members can use their GUI to initiate a voice communications session with other team members, or other parties who may be reached by telephone even if they are not team members. In the example shown in FIG. 26, a team member using VTE client (A) wishes to establish a two-way voice communications session with another team member using VTE client (B). The team member using VTE client (A) initiates the voice communications session (step 500) using the GUI, for example, by clicking on a voice communications icon associated with the personal identifier of the team member using VTE client (B). This action prompts the VTE client (A) to generate (step 502) a SessionRequest message that includes a personal identifier of the requesting team member (optional), a session type, and a personal identifier of the party or parties to be invited to join the voice communications session (team member using VTE client (B) in this example). On receipt of the SessionRequest, the VTE server parses the request message to determine the session type and extracts the personal identifier(s) of the parties to be invited (step 504). The VTE server also assigns a session ID (step 506) to the session. The VTE server then translates the personal identifiers of the team members using VTE clients (A) and (B) to determine an available voice communications device associated with the respective team members. The determination of an available voice communications device is performed, for example, by referencing a team member profile and sending a query to the Presence Server (FIG. 2) to determine the availability of a preferred voice communications device specified in the profile associated with each of the team members using VTE clients (A) and (B). If a voice communications device is available for each of the team members, as shown in this example, the VTE server sends a MakeCall message to the VSP to initiate call setup in step 508. The MakeCall message includes a dialed number for the team members using VTE clients (A), (B), as well as the session ID. The session ID is used by the VSP to create a session record for the purposes of tracking the session, should there be a subsequent request for the addition of other parties or for a change to some other type of communications medium, as will be explained below in more detail with reference to FIGS. 32-32b.

On receipt of the MakeCall message in step 508, the VSP formulates an ISUP Initial Address Message (ISUP-IAM). The ISUP-IAM includes the dialed number of team member using VTE client (A). It also includes a circuit identification code (CIC) associated with the E-ISUP (A). A Destination Point Code (DPC) of the ISUP-IAM is set to the point code of an SSP1 associated with a first end of the E-ISUP (A). The VSP then sends the message in step 510 through the SS7 network that controls the switched telephone network, and SS7 routing protocols route the message through the common channel signaling network to the SSP1. On receipt of the message, the SSP1 translates the dialed number and forwards the ISUP-IAM through the SS7 network in a manner well known in the art.

In this example, the team member using VTE client (A) is provided telephone service by an SSP (X). The message is therefore forwarded through the network in step 512 to the SSP (X). On receipt of the message, the SSP (X) checks the availability of the subscriber line associated with the team member using VTE client (A) and, finding the line available, applies ringing to the line in step 514. Thereafter, the SSP (X) returns an ISUP Address Complete Message (ISUP-ACM) in step 516 which is forwarded back through the network by SSP1 in step 518 to the VSP. In step 520, the team member using VTE client (A) responds to the ringing signal by answering his voice communications device, which sends a signal to SSP (X) that the call has been answered. The SSP (X) responds by sending an ISUP Answer Message (ISUP-ANM) in step 524 to SSP1. The ISUP-ANM contains the CIC of E-ISUP (A), as is well known in the art. The SSP1 then forwards the ISUP-ANM back through the common channel signaling network to the VSP in step 526. On receipt of the ISUP-ANM, the VSP is informed that a connection has been established between the voice communications device of the team member using VTE client (A) and the SSP1.

In order to complete the call while maintaining control of respective first and second legs of the call, the VSP formulates a new ISUP-IAM in which the VSP inserts a routing code rather than a dialed number in order to establish a connection between an SSP2 associated with the other end of the E-ISUP (A) and an SSP3 associated with a first end of the E-ISUP (B). The ISUP-IAM includes the routing code, a CIC equal to the E-ISUP (B), and a DPC set to a point code of the SSP2 associated with the other end of the E-ISUP (A). The routing code may be a dialed number, a Carrier Identification Code, or any other routing mechanism known in the art that can be used to force the call onto another E-ISUP trunk. The ISUP-IAM is forwarded through the common channel signaling network in step 530. On receipt of the ISUP-IAM, the SSP2 translates the routing code and determines that the ISUP-IAM should be routed to the SSP3. The message is therefore forwarded through the SS7 signaling network establishing a connectivity path in step 532 to SSP3 (for the sake of network efficiencies at the physical transport level, SSP2 and SSP3 may be the same SSP or adjacent SSPs). In step 534, the SSP3 forwards the message back to the VSP, because the VSP is a virtual node associated with the E-ISUP (B) to which the call was forced by the routing code inserted by the VSP in step 528. On receipt of the ISUP-IAM, the VSP extracts the routing code and inserts the dialed number of the team member using VTE client (B) (step 536). The VSP then inserts a DPC equal to the point code of SSP4 and forwards the message through the common channel signaling network in step 538. On receipt of the message, the SSP4 translates the dialed number and determines that the ISUP-IAM should be forwarded through the common channel signaling network towards the SSP (Y) (step 540). On receipt of the ISUP-IAM, the SSP (Y) applies a ringing signal to the subscriber line of the team member using VTE client (B) in step 542. Thereafter, the SSP (Y) returns an ISUP-ACM which is forwarded in steps 544, 546 to the VSP. In step 548, the team member using VTE client (B) responds to the ringing signal by answering his voice communications device. The answer signal prompts the SSP (Y) to formulate an ISUP-ANM which is forwarded through the network in steps 550, 552 to the VSP.

On receipt of the ISUP-ANM, the VSP has confirmation that each leg of the call has been answered by the respective team members, who are parties to the communications session, and that a connection now exists between the parties. Consequently, the VSP sends a CallCreated message in step 554 to inform the VTE server that the call has been created between the team members using VTE clients (A) and (B), as requested. The message sent in step 554 is sent through a data packet network, such as the Internet. On receipt of the CallCreated message, the VTE server updates the communications session display area of each member of the team. For the sake of simplicity of illustration, only three team members are shown in FIG. 26. Regardless of the number of team members, a StatusEvent message is sent to each available VTE client (A), (B) and (C) to permit the GUI to be updated to display the communications session.

It should be noted that only public communications sessions are displayed on the GUI of all team members. If a SessionRequest message indicates that the session is to be a private session between two or more team members, only the GUI of participating team members is updated. If, however, the communications session is not marked "private", the GUI of each team member is updated. In the example shown in FIG. 30, the conversation was not marked "private". Therefore, a StatusEvent message indicating a voice communication session between team members using VTE clients (A) and (B) is sent to each of the team members using VTE clients (A)-(C) and the respective GUIs are updated to display the session in the communications session display window (steps 556-566). It should be noted that the VTE server also preferably sends status data to the Presence Server to update availability information respecting the voice communications devices in use. This is not shown.

Closing the Two-Way Voice Communications Sessions

While any team member may leave a voice communications session by simply hanging up the voice communications device used during the session, voice communications sessions are preferably closed using an explicit command sent to the VTE server from a VTE client.

FIG. 27 illustrates the principal steps in a preferred procedure for closing a two-way voice communications session. The process begins in step 570 when the team member using VTE client (A) selects a CloseSession option from the communications session window displayed on his GUI. Choosing the option prompts the VTE client (A) to formulate and send a CloseSession message to the VTE server (step 572). The CloseSession message includes the session ID, which is used by the VTE server in step 574 to optionally archive a record of the voice communications session. Thereafter the VTE server sends a CloseSession message to the VSP in step 576. The CloseSession message includes the session ID. The VSP uses the session ID to retrieve details related to the voice communications session from a session log table, or the like. In step 578, the VSP formulates an ISUP Release message (ISUP-REL) including a circuit identification code (CIC) of E-ISUP (A), and forwards the ISUP-REL through the common channel signaling network toward SSP1, which releases resources associated with the voice communications session and returns an ISUP Release Complete (ISUP-RLC) message to the VSP in step 580, indicating that the SSP1 has released E-ISUP (A). The SSP1 then forwards the ISUP-REL through the common channel signaling network toward SSP (X) in step 582, releasing resources along the way in a manner well known in the art. SSP (X) releases resources associated with the subscriber line of the team member using VTE client (A) and returns an ISUP-RLC which is routed back through the network in step 584 to the SSP1. The SSP (X) also a release the subscriber line of the team member using VTE client (A) in step 586, if the communications device is still online.

In the meantime, the VSP has formulated an ISUP-REL containing a CIC equal to E-ISUP (A) and forwards the ISUP-REL through the common channel signaling network toward the SSP2 in step 588 to release the E-ISUP (A) at SSP2. The SSP2 releases resources and returns an ISUP-RLC through the network to the VSP in step 590, indicating that E-ISUP (A) resources have been released and are available for the next call. The ISUP-REL message is then forwarded through the network by SSP2 (step 591) to the SSP3 which returns an ISUP-RLC in step 592. The ISUP-REL is relayed by SSP3 to the VSP in step 594, and the VSP returns an ISUP-RLC to the SSP3 in step 596. Meanwhile, the VSP formulates a third ISUP-REL message, which includes a CIC equal to E-ISUP (B) that causes the release of the connection to the team member using VTE client (B), as described above with respect to the team member using VTE client (A). The release of resources is illustrated in steps 600-608. On receipt of the ISUP-RLC in step 602, the VSP sends a SessionClosed message to the VTE server (step 610), which sends StatusEvent messages to the respective VTE clients (A)-(C) to update the GUI display to reflect the fact that the session has been closed, as shown in steps 612-622. The VTE server preferably also sends status updates to the Presence Server (not shown) to indicate that the respective voice communications devices are available.

The VTE in accordance with the invention permits a third party to be added to the two-way voice communications session. FIG. 28 is a message flow diagram illustrating the principal messages exchanged between components of the distributed application when the team member using VTE client (A) requests that the team member using VTE client (C) be added to the two-way conference call set up between the team members using VTE clients (A) and (B), as explained above with reference to FIG. 26. In the example that follows, the third party is asked to join the voice communications session by using an invitation object described above. It should be understood, however, that an invitation is not required to add a third party to a voice communications session. The invitation is optional and is not used, for example, when the third party's available communications device is a cellular phone or the third party is not logged on to a VTE client.

In step 624, the team members using VTE clients (A) and (B) decide that the team member using VTE client (C) should be brought into the voice communications session in which they are participating. Consequently, the team member using VTE client (A) uses options available in a communications session window opened on the GUI (step 624) to initiate an AddParty message, which is sent in step 625 to the VTE server. The AddParty message includes the session ID, a personal identifier associated with the new party using VTE client (C); a topic of the discussion, if entered by the team member using VTE client (A) in step 624; a message related to the voice session, if a message was entered in step 624; plus, any meeting notes which have been entered by either of the team members using VTE clients (A) or (B) since the start of the two-way voice communications session described above with reference to FIG. 26. It should be noted that a topic of discussion can be added or modified by any participant in a voice communications session at any time, and will thereafter be displayed in invitation messages sent during the voice communications session. The AddParty message is forwarded by the GUI (A) to the VTE server (step 625). On receipt of the AddParty message, the VTE server translates the personal identifier of the team member using VTE client (C) (step 626) to determine an available voice communications device associated with the team member using VTE client (C) by sending a query message to the Presence Server (not shown). The VTE server may also, optionally, send StatusEvent messages back to the GUIs of the team members using VTE clients (A) and (B) to inform the respective team members that the AddParty message has been received, and that the VTE server is acting to establish connection with team member using VTE client (C). The respective messages are shown in steps 627 and 629, and are displayed by the respective VTE clients (A) and (B) in steps 628 and 630. Subsequently, the VTE server uses information derived from the translation performed in step 626 to forward an Invitation message in step 631 to the GUI of the team member using VTE client (C). The Invitation message includes a personal identifier associated with the inviting team member, in this example, the team member using VTE client (A); the topic of discussion related to the voice communications session, if entered by team member (A); the message, if entered; meeting notes; a list of the personal identifiers associated with all participants in the voice communications session; and, a session ID. That invitation information is displayed (step 632) in an Invitation window opened by the VTE client (C) on the GUI (C), except for the session ID. Since the session ID is only useful information to the distributed application of the collaboration services suite, it is not displayed.

In the example shown, the team member using VTE client (C) is available and decides to accept the Invitation on receipt (step 633). In response to acceptance, the VTE client (C) generates a Join message that includes the session ID and forwards the Join message in step 634 to the VTE server. On receipt of the Join message, the VTE server translates the session ID (step 635) to retrieve information stored in step 626 and optionally sends StatusEvent messages (steps 636, 638) to the team members using VTE clients (A) and (B) to advise that the VTE server is now "trying" to connect the team member using VTE client (C). The respective StatusEvent messages are displayed in steps 637 and 639. The VTE server subsequently forwards an AddLeg message (step 646) to the VSP requesting that a leg be added to the two-way voice communications session to include the team member using VTE client (C). The AddLeg message also includes the dialed number of the team member using VTE client (C) as well as the session ID. The VTE server likewise sends a NewSession message (step 648) to the conference bridge, to advise the conference bridge that a voice communications session is to be setup. The NewSession message includes a dialed number that will be used to connect to the conference bridge (the dialed number that was just passed to the VSP in step 646) and the session ID. As is well known in the art, one method of associating calls to a conference bridge is the use of a unique dialed number for each communications session. Other methods are also known, and no particular method is a preferred implementation in accordance with the invention. On receipt of the NewSession message, the conference bridge creates a new session record in step 650 so that it will be able to handle calls related to the new session as they are answered. Meanwhile, the VSP uses the session ID to reference records related to the two-way conference call. In accordance with the invention, voice communications sessions that include more than two parties are preferably instantiated using the conference bridge. The VSP is therefore programmed to release parts of the two-way voice connection and connect all three parties to the conference bridge.

In step 652, the VSP sends an ISUP Release (ISUP-REL) message to SSP2 to release the call in a forward direction. The SSP2 therefore releases resources associated with the terminating end of the E-ISUP (A) and returns an ISUP-RLC to the VSP in step 653. The SSP2 then forwards an ISUP-REL message in step 654 to the SSP3 associated with the first end of the E-ISUP (B). After releasing resources associated with the first end of E-ISUP (B), the SSP3 returns an ISUP-RLC to SSP2 (step 655) and forwards an ISUP-REL to the VSP (step 656). On receipt of the ISUP-REL, the VSP discards the message in step 658, to prevent the call connection to the team member using VTE client (B) from being torn down. Immediately thereafter, the VSP returns an ISUP-RLC message (step 659) to the SSP3 to satisfy a trunk state requirement of the trunk just released. The VSP then formulates an ISUP-IAM, which includes the dialed number of the conference bridge and a CIC equal to the E-ISUP (A), which is still supporting the connection to the team member using VTE client (A) and forwards the IAM (step 660) towards the SSP2. On receipt of the IAM, the SSP2 translates the number and determines that the ISUP-IAM should be forwarded (step 662) through the switched telephone network to an SSP (D) that serves the conference bridge. On receipt of the ISUP-IAM, the SSP (D) sends an ISDN-Setup message to the conference bridge in step 664, and passes the dialed number to the conference bridge in a manner well known in the art.

Illustration of the voice communications session setup is continued in FIG. 28*a*. The conference bridge responds with an Acknowledge message in step 665. The SSP (D) returns an ISUP-ACM in step 666 to the SSP2, which forwards the message in step 668 back to the VSP. In step 670, the conference bridge sends an Answer message, which prompts SSP (D) to forward an ISUP-ANM in step 672 to the SSP2. In step 674, the SSP2 forwards the ISUP-ANM to the VSP, which provides confirmation to the VSP that the team member using VTE client (A) is now connected to the conference bridge. The VSP therefore sends a CallCreated message through packet network to the VTE server in step 678. The conference bridge associates a dialed number passed in the ISDN-Setup message with the session recorded in step 650 above, and connects the call to a portion of the conference bridge reserved for the session. The conference bridge optionally also plays a recorded message to the team member using VTE client (A) in step 684. The message played in step 684 may be, for example, a message such as: "You are now connected to the conference bridge."

Meanwhile, the VSP formulates a second ISUP-IAM message that includes the dialed number of the conference bridge and the CIC of E-ISUP (B), which still supports a call connection to the team member using VTE client (B). The ISUP-IAM is forwarded in step 686 to the SSP3, which translates the dialed number and determines that the ISUP-IAM should be forwarded through the network to the SSP (D) that serves the conference bridge. The SSP3, therefore forwards the message in step 688 and the message progresses through the common channel signaling network to the SSP (D). On receipt of the ISUP-IAM, the SSP (D) sends an ISDN Setup message in step 690 to the conference bridge, and the conference bridge responds with an Acknowledge message (step 691). On receipt of the Acknowledge message, the SSP (D) returns (step 692) an ISUP-ACM to SSP3, and SSP3 forwards the message in step 694 to the VSP. Meanwhile, the conference bridge sends an Answer message in step 696 to the SSP (D), which prompts the SSP (D) to formulate an ISUP-ANM that is sent in step 700 to the SSP3 and forwarded in step 702 to the VSP.

On receipt of the ISUP-ANM, the VSP sends a CallCreated message through the data packet network in step 704 to indicate that the team member using VTE client (B) is now connected to the conference bridge. The VTE server responds by sending an Add message (step 706) to the conference bridge. The Add message specifies the session ID, and may also specify the dialed number. The conference bridge responds in step 800 by joining the call associated with the team member using VTE client (A) with the connection associated with the team member using VTE client (B), and immediately thereafter provides notification that a party has joined the conference call. The notification may be, for example, the playing of an audio tone, as shown in step 802. The conversation between parties (A) and (B) may therefore ensue, as shown at 803.

Parties (A) and (B) are therefore connected to the conference bridge, but party (C) has not yet been added to the communications session. The events associated with adding the team member using VTE client (C) to the voice session are shown in FIGS. 28*a* and 28*b*. In step 804, the VSP continues its activity by formulating an ISUP-IAM in which the dialed number equals the dialed number of an available voice communications device associated with the team member using VTE client (C) and a CIC equal to the E-ISUP (C) and forwards the message toward SSP5, which translates the dialed the number and forwards the message through the common channel signaling network in step 805 to the SSP (Z), which serves the team member using VTE client (C). On receipt of the ISUP-IAM, the SSP (Z) applies ringing to a subscriber line of the team member using VTE client (C) in step 806. After applying ringing, the SSP (Z) returns an ISUP-ACM in step 807 to SSP5, which is forwarded in step 808 to the VSP. As shown in FIG. 28*b*, on receipt of the ISUP-ACM, the VSP optionally returns a CallRinging message in step 809 to the VTE server. The VTE server responds to the CallRinging message in steps 810 and 812 by sending StatusEvent messages to advise the team members using VTE clients (A) and (B) that the call to join the team member using VTE client (C) has progressed to a point that the voice communications device of that team member is ringing. The StatusEvent messages are displayed on the respective GUIs of the team members using VTE clients (A) and (B) in steps 811 and 813. Meanwhile, the team member using VTE client (C) responds to the ringing signal by answering the call which sends an answer signal in step 814 to the SSP (Z). The SSP (Z) forwards an ISUP-ANM in step 816 to SSP5. The SSP5 forwards the ISUP-ANM in step 818 to the VSP, which informs the VSP that a call connection has been established with the team member using VTE client (C).

In the meantime, the VSP has formulated another ISUP-IAM with a dialed number of the conference bridge and a CIC equal to the E-ISUP (C), and forwards the message in step 820 to the SSP6, which translates the dialed number and forwards an ISUP-IAM through the common channel signaling network towards the SSP (D), which serves the conference bridge (step 822). On receipt of the ISUP-IAM message, the SSP (D) passes an ISDN-Setup message in step 824 to the conference bridge, which responds with an Acknowledge message in step 825. The SSP (D) returns an ISUP-ACM in step 826 to the SSP6, which forwards the ISUP-ACM in step 828 to the VSP. Meanwhile, the conference bridge responds to the ISDN-Setup message with an Answer message in step 830, which prompts the SSP (D) to formulate an ISUP-ANM that is forwarded through the common channel signaling network in steps 832 and 834 to the VSP. On receipt of the ISUP-ANM, the VSP responds by sending a CallCreated message through the data packet network in step 836 to the VTE server. The VTE server may respond by sending an Add message to the conference bridge (step 838). The Add message includes the session ID and, optionally, the dialed number used to set up the call to the conference bridge. On receipt of the Add message, the conference bridge joins the team member using VTE client (C) to the voice session in step 840. Alternatively, the conference bridge may have used a dialed number passed in the ISDN-Setup message (step 824) to join the team member to the voice session. The conference bridge preferably plays a tone in step 842 to advise the team members using VTE clients (A) and (B) that the team member using VTE client (C) has joined the voice communications session. Meanwhile, the VTE server sends StatusEvent messages through the data packet network, which cause the session display area of the GUIs (A)-(C) to be updated, as shown in steps 844-854. Thereafter, conversation ensues between team members using VTE clients (A), (B) and (C) as shown at 856.

Closing the Three-Way Voice Communications Session

FIG. 29 illustrates a method for closing the three-way voice session in accordance with an embodiment of the invention. In step 858, the team member using VTE client (A) selects a Close option on a communications session window displayed on the GUI of the VTE client (A). This prompts the VTE client (A) to formulate a Close message which is sent to the VTE server in step 900. The Close message includes the session ID. The VTE server responds to a Close message by archiving a record (optional) of the voice communications session in step 902. In step 904, the VTE server sends a CloseSession message to the VSP. The CloseSession message includes the session ID, which the VSP uses to retrieve session information from a log table, or the like. Having retrieved the session information, the VSP formulates an ISUP-REL which is forwarded through the common channel signaling network and releases the connection to the team member using VTE client (A) as shown in steps 906-914. The messages exchanged and their effect in the network are the same as explained in detail above with reference to FIG. 27. The VSP meanwhile formulates another ISUP-REL, which is forwarded through the network to release the connection between SSP2 and the conference bridge as shown in steps 916-924.

The Release sequence is repeated in steps 928-936 to release the team member using VTE client (B) from the SSP4. The release of SSP3 is likewise accomplished, as illustrated in steps 938-948. A similar process is repeated to release the team member using VTE client (C) from SSP5 as illustrated in step 950-958, as shown in FIG. 29a. The last connection is released from the conference bridge as shown in steps 960-970. When all the releases are complete, the VSP sends a SessionClose message in step 974 indicating the session ID to the VTE server. The VTE server then sends a StatusEvent message indicating session type, session ID and an action indicating that the session was closed, which prompts the respective VTE clients to update the respective GUIs to remove information related to the session from the communications session window, as shown in steps 976-986.

Establishing a Two-Way Voice Communications Session-Enterprise Network

The virtual team environment 3 in accordance with the invention may also be implemented in an enterprise network. FIG. 30 shows the principal messages exchanged during setup of a two-way voice communications session in an enterprise network in which a Private Branch Exchange (PBX) is used for at least a part of call setup. In the example shown in FIG. 30, the team members using VTE clients (B) and (C) are employees of the enterprise and their voice communications devices are therefore served by the enterprise network. The team member using VTE client (A) is not an employee of the enterprise and his voice communications devices are served by an SSP (X) which is in the PSTN, for example. In the example shown in FIG. 30, the team member using VTE client (B) initiates a two-way voice communications session, as described above with reference to FIG. 26. The session initiation causes the VTE client (B) to formulate a Session Initiation request, which is forwarded to the VTE server in step 990. In step 992, the VTE server assigns a session ID to the session request and translates the SessionRequest message in step 994 to determine session type. Using session type information, the VTE server queries the Presence Server (not shown) to determine the availability of voice communications devices associated with the team members using VTE clients (B) and (C). On determining that a voice communications device is available for each team member, the VTE server sends a Software Control Application Interface (SCAI) message, for example, to the PBX in step 996 to initiate connection to the first team member using VTE client (B). The SCAI message contains the extension number of the team member using VTE client (B) as well as the extension number of the team member using VTE client (C). On receiving the message, the PBX completes a first leg of the call by applying ringing to the extension line of the team member using VTE client (B) in step 998. A message sequence required to complete this connection is well understood by persons skilled in the art, and not all messages are shown in this representation. In step 1000, the team member using VTE client (B) answers the call which sends an Answer signal to the PBX. On receiving the Answer signal, the PBX applies ringing to the extension line of the voice communications device of team member using VTE client (C) in step 1002 and the team member using VTE client (C) answers the call which sends an off-hook signal in step 1004 to the PBX. In step 1006, the PBX returns a Connect message to the VTE server to inform the VTE server that the call has been completed. The VTE server responds by sending StatusEvent messages with session type and participants to the respective GUIs of the three team members which causes the session information to be displayed in steps 1008-1018. Although not illustrated, it will be understood by those skilled in the art that the VTE server may also pass device-in-use information to the Presence Server, as explained above with reference to FIG. 30. Thereafter, conversation ensues between the team members using VTE clients (B) and (C) as shown at 1019.

As shown in FIG. 30a, after a period of time, it is decided that the team member using VTE client (A) should be added to the voice session. The team member using VTE client (B) therefore initiates the addition of the team member using VTE client (A) using options in a communications session window opened on the GUI of the team member using VTE client (B). The action causes the VTE client (B) to send an Add message to the VTE server. The Add message (step 1020) includes a session ID and a personal identifier associated with the team member using VTE client (A). On receipt of the Add message, the VTE server responds by sending StatusEvent messages to VTE clients (B) and (C) in steps 1022 and 1026, to advise that the Add message has been received and is being processed. The respective messages are displayed by the GUIs of the team members using VTE clients (B) and (C) in steps 1024 and 1028. Thereafter, the VTE server sends an Invitation message to the VTE client of the team member using VTE client (A) (step 1030). As explained above with reference to FIG. 28, the invitation is optional and the call can be initiated directly to a voice communications device of the team member using VTE client (A) without using an invitation object. In this example, an invitation is used and the Invitation message includes a personal identifier of the team member that initiated the invitation; optionally a topic associated with the communication session; an optional message associated with the communication session; meeting notes as entered by either of the team members using VTE clients (B) and (C) during the course of the communications session; personal identifiers associated with the participants; and, a session ID. On receipt of the message, the VTE client (A) displays the Invitation message in step 1032.

In response to the invitation displayed, client (A) is available and selects a Join option on the invitation display. This prompts the VTE client (A) to send a Join message including the session ID back to the VTE server in step 1034. The VTE server translates the Join message in step 1036 and determines an available voice termination associated with the team member using VTE client (A) using profile and presence information, as described above.

The available voice communications device retrieved from the profile in step 1036 indicates that the team member using VTE client (A) is located outside the enterprise network. Consequently, the VTE server determines that it is preferable to complete the call using a conference bridge in the public switched telephone network. Therefore, in step 1038, the VTE server sends an SCAI ThirdPartyCall (step 1038) command to the PBX designating an originating number as the extension number of team member using VTE client (B) and dialed number as that of the conference bridge. The VTE server also sends a NewSession message (step 1039) to the conference bridge to advise the conference bridge that a new voice communications session is to be established. The NewSession message includes the dialed number just sent to the VSP in step 1038, and the session ID. The conference bridge responds to the message by creating a session record in step 1040 and reserving bridge resources to handle the new session. Meanwhile, on receipt of the SCAI command, the PBX sends an ISDN Setup message to an SSP (Y) in the PSTN that serves the PBX (step 1041). The SSP (Y) responds by formulating an ISUP-IAM, which it forwards through the common channel signaling network in step 1042 to the SSP (D) that serves the conference bridge. On receipt of the ISUP-IAM, the SSP (D) sends an ISDN Setup message to the conference bridge in step 1044, which responds with an Acknowledge message in step 1045. The SSP (D) then returns an ISUP-ACM message in step 1046 to the SSP (Y). The SSP (Y) responds by returning an ISDN Acknowledge message to the PBX in step 1047. In the meantime, the conference bridge returns an Answer message in step 1048, which prompts the SSP (D) to send an ISUP-ANM message in step 1050 through the common channel signaling network to SSP (Y). An ISDN Answer message is then returned to the PBX in step 1052. On receipt of the ISDN Answer message, the PBX sends a message through the data packet network to the VTE server (step 1054) to advise that the third party call was successfully completed. Meanwhile, the conference bridge acknowledges the connection of the team members using VTE clients (A) and (C) by a message in step 1060 such as, for example, "You have been connected to the conference bridge." Thereafter, conversation between the team members using VTE clients (B) and (C) can then resume as shown in step 1070.

FIG. 31a illustrates the principal steps in the addition of the team member using VTE client (A) to the voice communication session. After the team members using VTE clients (B) and (C) are connected to the conference bridge, the VTE server sends StatusEvent messages to the VTE clients (B) and (C), to advise that the connection of the team members using VTE client (A) is now underway ("trying"). The Status messages are displayed on the respective GUIs, as shown in steps 1072-1078. The VTE server also sends a command to the VSP in step 1080, requesting that it add a leg to the voice communications session identified by the session ID, and providing the dialed numbers of the team member using VTE client (A) and the conference bridge. The VSP responds by formulating an ISUP-IAM containing the dialed number of the team member using VTE client (A) and specifying a CIC of E-ISUP (A). The ISUP-IAM is forwarded in step 1082 to SSP1 which translates the dialed number and determines that the ISUP-IAM should be forwarded through the signaling network toward SSP (X) (step 1084). On receipt of the ISUP-IAM, the SSP (X) applies ringing to the subscriber line in step 1086, and an ISUP-ACM message is returned to the VSP in steps 1088 and 1090. On receipt of the ISUP-ACM, the VSP may send a CallRinging message to the VTE server, which may in turn send StatusEvent messages to VTE clients (A) and (B), as described above with reference to FIG. 28b, steps 809-813. Meanwhile, the team member using VTE client A answers their phone in step 1092 which prompts SSP (X) to forward an ISUP-ANM message back toward the VSP in steps 1094 and 1096. On receipt of the ISUP-ANM, the VSP formulates another ISUP-IAM which it sends toward the SSP2 in step 1098. On receipt of the IAM, the SSP2) translates the number of the conference bridge and determines that the ISUP-IAM should be forwarded to the SSP (D) (step 1100). On receipt of the ISUP-IAM, the SSP (D) sends an ISDN-Setup message to the conference bridge (step 1102), which returns an Acknowledge message in step 1103. On receipt of the Acknowledge message, the SSP (D) and returns an ACM (step 1104). The SSP2 forwards the ISUP-ACM in step 1106 to the VSP.

In the meantime, the conference bridge sends an Answer message in step 1108 which prompts the SSP (D) to return an ISUP-ANM in steps 1110 and 1112 to the VSP. The VSP responds by sending a CallCreated message in step 1114 to the VTE server. On receipt of the CallCreated message, the VTE server optionally sends an Add message (step 1116) to the conference bridge providing the session ID and optionally including the dialed number. On receipt of the Add message, the conference bridge joins the team member using VTE client (A) with the team members using VTE clients (B) and (C) in step 1118 and plays a tone to announce the arrival of the team member using VTE client (C) in step 1120. Alternatively, the conference bridge may have automatically joined (C) to the voice session on receipt of a dialed number passed in the ISDN-Setup message (step 1002), described above. Meanwhile, the VTE server sends StatusEvent messages which cause the session display on the respective GUIs of each team member to be updated in steps 1122-1132. Thereafter conversation ensues between the team members using VTE clients (A), (B) and (C) as shown at 1134.

Converting Communications Sessions from One Media to Another

As described above with reference to the graphical user interface (GUI) of the VTE, the VTE provides a facility for automatically converting a communications session from one communications medium to another. By way of example, FIGS. 32, 32a and 32b illustrate the principal messages exchanged during the conversion of an Instant Message session involving the team members using VTE clients (A), (B) and (C) to a voice communications session involving the same team members. During the Instant Messaging session between the three team members, it is decided that the discussion is becoming too complex to be efficiently handled through an Instant Messaging session. The team members therefore agree to convert to a voice communications session and the team member using VTE client (A) initiates a ConvertSession message from a communications session window displayed on the GUI (A) The selection causes the VTE client (A) to formulate a ConvertSession message which provides session ID and a new session type. The message is forwarded through the data packet network to the VTE server in step 1136. On receipt of the message, the VTE server translates the session ID (step 1138) to determine the session type and the participants. The VTE server then closes the Instant Message session (step 1140) and sends StatusEvent messages to the respective GUIs to remove the Instant Message session from the session display window in steps 1142-1150. Status information may also be sent to the Presence Server (not shown) as explained above. The VTE server then translates (step 1152) the personal identifiers associated with the respective team members to determine the dialed numbers of a preferred telephone device associated with each team member, as explained above. The VTE server then formulates a MakeCall message providing the dialed numbers of the team members using VTE clients (A), (B) and (C) as well as a dialed number for the conference bridge and the session ID (step 1154). The VTE server then sends a NewSession message to the conference bridge, to provide the dialed number to be used to call the conference bridge, and a session ID (step 1155). The conference bridge responds to the NewSession message by creating a session record (step 1156) and allocating resources in a manner well known in the art.

Meanwhile, on receipt of the MakeCall message, the VSP formulates a first ISUP-IAM including a dialed number of the team member using VTE client (A) and a CIC of E-ISUP (A) which is forwarded through the network in steps 1156 and 1158 to SSP (X). On receipt of the ISUP-IAM, the SSP (X) applies a ringing signal to the subscriber line of a voice communications device of the team member using VTE client (A) (step 1160), and returns ISUP-ACM messages in steps 1162 and 1164 back to the VSP. In the meantime, team member using VTE client (A) responds to the ringing by answering the call, which sends an Answer signal to the SSP (X) in step 1166. In response, the SSP (X) formulates an ISUP-ANM message, which is forwarded through the network to VSP in steps 1168 and 1170. On receipt of the ANM, the VSP formulates another ISUP-IAM, which includes the dialed number of the conference bridge and a CIC of E-ISUP (A) and forwards the ISUP-IAM in step 1172 to SSP2. In step 1174, the SSP2 forwards the ISUP-IAM to SSP (D) that serves the conference bridge. The SSP (D) then sends an ISDN-Setup message to the conference bridge in step 1176, which responds with an Acknowledge message in step 1177. On receipt of the Acknowledge message, the SSP (D) returns an ISUP-ACM to the SSP2 in step 1178 and it is forwarded to the VSP in step 1180.

Meanwhile, the conference bridge sends an Answer message in step 1182, which prompts SSP (D) to formulate and return ISUP-ANM messages to the SSP2 in step 1184 and it is forwarded to the VSP in step 1186. On receipt of the ISUP-ANM message, the VSP has confirmation that the call has been completed between the team member using VTE client (A) and the conference bridge. The VSP therefore sends a CallCreated message to the VTE server in step 1188. The conference bridge may also play a Welcome message to the team member using VTE client (A) (step 1192) as explained above with reference to FIG. 31, for example.

Meanwhile, as shown in FIG. 32a, the VSP formulates a third ISUP-IAM, which includes a dialed number of a preferred telephone device of the team member using VTE client (B) and a CIC equal to the E-ISUP (B). The ISUP-IAM is forwarded through the SS7 network to SSP4, which is connected to the second end of E-ISUP (B) (step 1194). On receipt of the ISUP-IAM, the SSP4 translates the dialed number of the team member using VTE client (B) and determines that the IAM should be forwarded through the common channel signaling network toward SSP (Y) (step 1196). On receipt of the ISUP-IAM, SSP (Y) applies ringing to the subscriber line (step 1198) and returns an ACM message in steps 1200 and 1202 to the VSP. Meanwhile, the team member using VTE client (B) answers the call, which sends an Answer signal (step 1204) to the SSP (Y). The SSP (Y) responds by sending an ISUP-ANM in steps 1206, 1208 back to the VSP. The VSP responds by formulating a fourth ISUP-IAM with the dialed number equal to that of the conference bridge and a CIC equal to the E-ISUP (B). The fourth ISUP-IAM is forwarded in step 1210 to the SSP3, and from there (step 1212) to SSP (D). On receipt of the ISUP-IAM, the SSP (D) sends an ISDN-Setup message to the conference bridge (step 1214) and the conference bridge returns an Acknowledge message (step 1215). On receipt of the Acknowledge message, the SSP (D) returns an ISUP-ACM message, which is forwarded in step 1216 to the SSP3 and in step 1218 to the VSP.

Meanwhile, the conference bridge sends an Answer message in step 1220 to SSP (D), which prompts the SSP (D) to formulate an ISUP-ANM that is forwarded to the SSP3 in step 1222 and on to the VSP in step 1224. The VSP then sends a CallCreated message (step 1226) to the VTE server advising that the team member using VTE client (B) has been connected to the conference bridge. The VTE server may respond by formulating an Add message, which is forwarded to the conference bridge (step 1228). The Add message includes the session ID, and optionally includes the dialed number used to call the conference bridge. The conference bridge responds in step 1230 by joining the team members using VTE clients (A) and (B) and playing a tone to announce that the team member using VTE client (B) has joined the voice communications session (step 1232). Alternatively, as explained above, the conference bridge may automatically join the team members using VTE clients (A) and (B) when a dialed number passed in the ISDN-Setup message (step 1214) is received, as explained above in greater detail. Thereafter, conversation ensues between the team members using VTE clients (A) and (B) as shown at 1234.

As shown in FIG. 32b, the VSP connects team member using VTE client (C) to the conference bridge by formulating a fifth ISUP-IAM that includes the dialed number of a preferred voice communications device for voice communications with the team member using VTE client (C) and a CIC equal to the E-ISUP (C). The ISUP-IAM is forwarded through the common channel signaling network in step 1236 to SSP5 and in step 1238 to the SSP (Z). The SSP (Z) responds by applying ringing to the subscriber line of team member using VTE client (C) (step 1240) and returns an ISUP-ACM message which is forwarded back to the SSP5 in step 1242 and on to the VSP in step 1244. Meanwhile, the team member using VTE client (C) answers the telephone, which sends an Answer signal (step 1246) to SSP (Z), which formulates an ISUP-ANM message that is forwarded through the common channel signaling network in step 1248 to SSP5 and in step 1250 the ISUP-ANM is forwarded on to the VSP. On receipt of the ISUP-ANM message, the VSP formulates a sixth ISUP-IAM message that includes a dialed number of the conference bridge and a CIC equal to E-ISUP (C). The ISUP-IAM is forwarded in step 1252 to the SSP6 and in step 1254 on to the SSP (D), which responds by sending an ISDN-Setup message to the conference bridge (step 1256), which returns an Acknowledge message in step 1257. On receipt of the Acknowledge message, the SSP (D) returns an ISUP-ACM message, which is forwarded in step 1258 to SSP6 and in step 1260 to the VSP. Meanwhile, the conference bridge sends an Answer message in step 1262. This prompts the SSP (D) to formulate an ISUP-ANM, which is forwarded in steps 1264 and 1268 to the VSP. On receipt of the ISUP-ANM, the VSP sends a CallCreated message to the VTE server (step 1270) to advise that all three parties are now connected to the conference bridge. The VTE server may respond by sending an Add message, which includes session ID, and optionally dialed number, to the conference bridge in step 1272. The conference bridge responds in step 1274 by joining the team member using VTE client (C) to the team members using VTE clients (A) and (B). Alternatively, the join may be automatically accomplished by the conference bridge using a dialed number passed in the ISDN-Setup message in step 1256, as explained above with reference to FIG. 31. The conference bridge then plays a tone in step 1276 to alert the team members using VTE clients (A) and (B) that (C) has joined the voice communications session. Thereafter, the VTE server sends StatusEvent messages to the respective GUIs of the team members using VTE clients (A), (B) and (C), which generate a display of the voice communications session, as shown in steps 1278-1288. Thereafter conversation ensues between the team members using VTE clients (A), (B) and (C) as shown at 1290.

Multi-Media Session Setup

The VTE in accordance with the invention also supports multi-media sessions. In accordance with an embodiment of the invention, a multi-media session is set up using streaming video for visual display, and a switched telephone network for the audio transmission during the communications session. This improves video performance, while ensuring the best voice quality, and overall reliability. While Voice over Internet Protocol (VoIP) is supported by the VTE, a PSTN/Internet solution provides superior quality and user satisfaction. Furthermore, in accordance with the invention setup of a multi-media session is automatically handled by the VTE, which uses profile and presence information to determine an Internet Protocol address of a VTE client used by each team member. The VTE then automatically supplies Internet Protocol (IP) addresses to the VTE clients of other team members to enable transparent setup of multi-media communications sessions, as will be explained below in more detail with reference to FIGS. 33 through 36.

FIG. 33 illustrates the principal messages exchanged between elements of the VTE and the PSTN during the setup of a two-way multi-media session between two team members. In the example shown, the team member using VTE client (A) initiates a multi-media session by, for example, clicking on a communications icon on the team member interface (GUI) in step 1292. In response to the session initiation, VTE client (A) formulates a session request message containing a personal identifier of the team member using VTE client (B) with whom the team member using VTE client (A) wishes to conduct the multi-media session, a session type, and, optionally, a session topic and a session text message entered by the team member using VTE client (A). The SessionRequest message is sent to the VTE server in step 1294. On receipt of the SessionRequest message, the VTE server assigns a session ID in step 1296 and translates the SessionRequest message in step 1298 to determine what devices are available to the team member using VTE client (B) for setting up the multi-media session. The team member profile of team member using VTE client (B) and presence information associated with team member using VTE client (B) are used to determine the devices available for use in the multi-media session, as explained above. The VTE server determines that the team member using VTE client (B) is logged on, and that the VTE client (B) is available. The VTE server therefore formulates an invitation which is sent to the VTE client (B) in step 1300.

The Invitation message includes an identifier of the requester, the session type, and, optionally, the session topic and the session text message related to or describing the session, which was sent from the session initiator, the team member using VTE client (A) in step 1294. On receipt of the information, the VTE client (B) displays the invitation in an invitation window on the GUI of the team member using VTE client (B) (step 1302). Subsequently, the team member using VTE client (B) accepts the invitation by selecting an Accept button from the invitation window displayed in step 1302. Acceptance (step 1304) of the invitation prompts the VTE client (B) to generate and forward an AcceptInvitation message, which includes the session ID. On receiving the Accept-Invitation message, the VTE server translates (step 1306) the session ID and determines that a multi-media session is to be created between the team members using VTE clients (A) and (B). Consequently, the VTE server sets up the voice connection first by sending a MakeCall message that includes the dialed number of the team members using VTE clients (A) and (B), as well as the session ID, and forwards the message to the VSP in step 1308. The VSP then performs steps substantially identical to steps 510-554 of FIG. 26 to set up a voice communications session between the team members using VTE clients (A) and (B), as shown at 1310. Following establishment of the voice communications session, the VTE server sends notification to VTE clients (A) and (B) in steps 1312 and 1316. The notifications include an identification of the other team member as participant as well as the other team member's IP address and the session ID. On receipt of the notifications, the respective VTE clients (A) and (B) display the session information in steps 1314 and 1318. A StatusEvent message is sent to VTE client (C) in step 1320 which responds by updating the GUI of the team member using VTE client (C) with a display of communications session information in the communications session window (step 1322). Concurrently, VTE clients (A) and (B) perform IP setup (step 1324) using the IP addresses supplied by the VTE server in steps 1312 and 1316. IP setup may include, for example, content, negotiations to determine the capabilities of respective IP devices supporting the VTE clients (A) and (B). The content negotiations are required to determine, among other things, a template to be used to build a multi-media window for the multi-media session. Once IP setup is completed, data transfer between the VTE clients (A) and (B) ensues. The data transfer started in step 1326 permits the respective VTE clients (A) and (B) to build multi-media windows in step 1328 and 1330 for displaying streaming video information, if available, exchanging documents, sharing applications, sharing a white board, or performing any other supported shared function during the multi-media session. Thereafter, the multi-media session proceeds between the team members using VTE clients (A) and (B) as shown at 1332. The content exchanges between VTE clients (A) and (B) are direct exchanges between the two devices.

FIG. 34 shows the principal messages exchanged between components of the VTE server and the PSTN when a third party is added to the two-way multi-media session shown in FIG. 33. In step 1334, the team member using VTE client (A) initiates an AddParty action from the GUI to add party (C) to the multi-media session. The AddParty action may be accomplished in a plurality of ways, including selecting an Invite button from a communications session window or using a pointing device such as a mouse to drag and drop a communications device icon associated with the personal identifier of the team member into the communications session window, by way of two examples. The initiation of the AddParty action prompts the VTE client (A) to send an AddParty message to the VTE server. The AddParty message includes a personal identifier associated with the team member using VTE client (C), an optional topic related to the multi-media session, an optional text message related to the multi-media session, and any meeting notes entered by either of the team members using VTE clients (A) and (B) up to the time that the AddParty action was initiated. The AddParty message is forwarded to the VTE server in step 1336. The VTE server responds by preparing an Invitation message, which is forwarded in step 1338 to the VTE client (C) and displayed on the GUI of the team member using VTE client (C). The Invitation message includes information respecting the requesting party (the team member using VTE client (A)), the optional topic, the optional text message, the meeting notes (if any were entered), a list of participants and invitees, and the session ID. In step 1340, VTE client (C) displays the Invitation in the GUI of the team member using VTE client (C). In steps 1342 and 1346, the VTE server sends StatusEvent messages to VTE clients (A) and (B) to advise that the team member using VTE client (C) has been invited, and that the status respecting acceptance of the Invitation is still pending. In steps 1344 and 1348, the StatusEvent messages are displayed on the respective GUIs. In step 1350, the team member using VTE client (C) accepts the Invitation by selecting an Accept button on the invitation display window. Acceptance of the invitation prompts the VTE client (C) to send a Join message that includes the session ID to the VTE server in step 1352.

On receipt of the Join message, the VTE server translates the session ID to determine preferred communications devices from a profile of the team member using VTE client (C) and determines an availability of those devices using dynamic presence information retrieved from the Presence Server. Presence information indicates that a voice communications device of the team member using VTE client (C) is available to set up a voice communications session. The components of the collaboration services suite therefore perform steps 652-842 of FIGS. 28-28b, as indicated at 1358.

Thereafter the VTE server returns notifications to VTE clients (A) and (B) in steps 1360 and 1364. The notifications prompt VTE clients (A) and (B) to update the session display to add team member using VTE client (C) as a participant (steps 1362 and 1366). The VTE server also sends a StatusEvent message to VTE client (C) (step 1368) which prompts VTE client (C) to update the communications session display to show the team member using VTE client (C) as a participant. In step 1372, VTE client (A) sends IP setup messages to VTE client (C) and in step 1374 VTE client (B) sends the IP setup messages to VTE client (C). Content negotiations between VTE clients (A) and (C), and (B) and (C) then ensue, as described above with reference to FIG. 33. Data transfer between the VTE clients (A) and (C) is performed in step 1376 and data transfer between VTE clients (B) and (C) occurs at 1380. Data transfer at 1376 and 1380 enables VTE clients (A) and (B) to rebuild their multi-media window displays at 1378 and 1382, respectively. VTE client (C) also uses the data transferred at 1376 and 1380 to build a multi-media window in step 1384. As is well understood by those skilled in the art, the data transfers are preferably performed using IP multicast protocols in order to conserve system resources. Thereafter, the multi-media session between the team members using VTE clients (A), (B) and (C) proceeds, as shown at 1386.

FIG. 35 illustrates the principal steps involved in adding a third party to a multi-media session in which acceptance of the invitation is deferred by the invited party. A significant advantage of the VTE in accordance with the invention is that any invitee to any communications session may defer acceptance of an invitation for any reason, pending availability. As shown in FIG. 35, an invitation is sent (at 1388) from the team member using VTE client (A) to the team member using VTE client (C) to join a multi-media communications session in progress between the team member using VTE client (A) and the team member using VTE client (B), as explained above. The invitation is formulated and sent to invite the team member using VTE client (C) to the multi-media session, as described above with reference to steps 1334-1348 of FIG. 34, as shown at 1388. In step 1390, the team member using VTE client (C) responds to the invitation by selecting a Join-Later option, which permits the team member using VTE client (C) to provide a reason for not joining the communications session immediately. VTE client (C) formulates the Reply message, along with the reason entered by the team member using VTE client (C), and the session ID, and forwards the Reply message to the VTE server in step 1392. On receipt of the Reply message, the VTE server sends (step 1394) a notification including the reason back to VTE client (A), which displays the message on the GUI of the VTE client (A), as shown at 1396.

It should be noted that even though the team member using VTE client (C) does not join the session immediately, the Invitation window remains open on the GUI of VTE client (C) as a portal of the session. This is true of any communications session invitation window. The invitee can use this portal to join the session at any time. After the team member using VTE client (C) becomes available to participate in the multi-media session, the team member using VTE client (C) accepts the invitation at 1398 by, for example, selecting a Join option from the communications session invitation window displayed on the GUI of VTE client (C). In response to the acceptance, the VTE client (C) formulates a Join message that includes the session ID and returns it in step 1400 to the VTE server. On receipt of the Join message, the VTE server translates (step 1402) the session ID to retrieve information that permits the profile of the team member using VTE client (C) to be examined and a query to be formulated and sent to the Presence Server (not shown) to determine preferred devices available to enable a multi-media communications session between team members using VTE clients (A), (B) and (C). The VTE server determines that a voice communications device associated with the team member using VTE client (C) is available. The VTE server therefore sends an AddLeg message to the VSP at 1404. The AddLeg message includes the dialed number of the team member using VTE client (C) as well as the session ID. Steps 652-842 of FIGS. 28-28b are then performed, as shown at 1406. When voice communication is established between the team members using VTE clients (A), (B) and (C) the VTE server sends a notification at 1408 and 1412 to VTE clients (A) and (B) which prompts the respective VTE clients to update their session displays at 1410 and 1414. The notification also includes the IP address of the team member using VTE client (C). The respective VTE clients (A) and (B) use the IP address of VTE client (C) to perform IP setup procedures with VTE client (C) as shown at 1420 and 1422. The ID setup includes content negotiations, as described above. Meanwhile, the VTE server also sends a StatusEvent message at 1416 to advise the VTE client (C) that the team member using VTE client (C) is a participant in the multi-media session, which permits VTE client (C) to update the session display as shown at 1418.

Data transfer between VTE clients (A) and (C) occurs as shown at 1424, which permits VTE client (A) to rebuild its multi-media window (step 1426) to accommodate new data received from VTE client (C). Data transfer also occurs between VTE client (B) and VTE client (C) as shown at 1428, which permits VTE client (B) to rebuild its multi-media window, as shown at 1430. The exchange of data between VTE clients (A) and (B) with VTE client (C) permits VTE client (C) to build a multi-media window, as shown at 1432. Thereafter, the multi-media session proceeds between the team members using VTE clients (A), (B) and (C), as shown at 1434, preferably using IP multicast protocols, as described above.

To further illustrate the flexibility of the communications collaboration suite enabled by the VTE in accordance with the invention, FIGS. 36 and 36a illustrate principal messages exchanged between components of the VTE when another team member is invited to a multi-media communications session, but the other team member is not logged on to the VTE server.

In the example illustrated in FIGS. 36 and 36a, the team members using VTE clients (A) and (B) are participating in a multi-media communications system when they decide that the team member using VTE client (C) should be added to the multi-media communications session. Consequently, the team member using VTE client (A) initiates an invitation at 1436 to add the team member using VTE client (C) to the multi-media session, even though the team members using VTE clients (A) and (B) can see that the team member using VTE client (C) is not logged on to the VTE server, because the status of the team member using VTE client (C) devices is displayed on the respective GUIs (see FIG. 1). Initiation of the invitation prompts the VTE client (A) to formulate an AddParty message, which is forwarded in step 1438 to the VTE server. The AddParty message contains a personal identifier of the team member using VTE client (C) and optionally a topic associated with the communications session, as well as an optional text message and meeting notes entered by either party during the communications session. On receipt of the AddParty message, the VTE server translates (step 1440) the session ID, as well as the personal identifier of the team member using VTE client (C), and returns StatusEvent messages in steps 1442, 1446 to VTE clients (A) and (B) to inform the respective team members that the team member using VTE client (C) is being invited to join the multi-media communications session, but is pending.

In steps 1444 and 1448, the respective VTE clients (A) and (B) display the StatusEvent messages to inform the team members using VTE clients (A) and (B) of the status of the invitation. In step 1450, the VTE server determines from presence information retrieved from the Presence Server (not shown) that the team member using VTE client (C) is not logged on to the VTE server. Consequently, an Invitation message cannot be sent to the VTE client (C) for display on the GUI of the team member using VTE client (C). The VTE server therefore searches profile information for another media for delivering the invitation, and determines that a voice communications device is available and the Presence Server indicates that it is idle. Consequently, the VTE server sends (step 1452) a MakeCall message to the VSP. The Make-Call message includes the dialed number of the team member using VTE client (C) as well as the dialed number of the conference bridge. The VTE server then sends an Invitation via the data packet network to the conference bridge informing the conference bridge of the invitation and providing personal identifiers of the team members using VTE clients (A) and (C) as well as the optional communications session topic and message, plus session type and session ID (step 1454). Meanwhile, the VSP executes the requested MakeCall by performing steps 804-834 of FIG. 28b a shown at 1456.

After a voice connection is established between the voice communications device of the team member using VTE client (C) and the conference bridge, the VSP advises the VTE server in step 1458 that the call has been created. In response, the VTE server sends a PlayInvitation message through the data packet network to the conference bridge instructing the conference bridge to play an Invitation message and providing the session ID (step 1460). The conference bridge uses a session ID to correlate the instruction with the earlier Invitation message sent in step 1454. The conference bridge retrieves the information related to the invitation and uses text-to-speech conversion as shown as 1462 to play an announcement to the team member using VTE client (C) at 1464. The announcement informs the team member using VTE client (C) that he has been invited by the team member using VTE client (A) to participate in a multi-media communications session taking place between the team members using VTE clients (A) and (B). The conference bridge also announces the topic and message, if provided, and session type to the team member using VTE client (C) followed by a menu of options for responding to the invitation.

As shown in FIG. 36a, the team member using VTE client (C) accepts the invitation to join the multi-media communications session by selecting an appropriate key from the voice communications device keypad, which transmits a dual-tone modulated frequency (DTMF) signal (or by speaking an appropriate voice command which is interpreted by speech recognition) to the conference bridge to inform the conference bridge that the invitation is accepted (step 1468). On receiving the confirmation, the conference bridge responds at 1470 by instructing the team member using VTE client (C) to log on to the VTE server in order to permit the multi-media session to proceed. The conference bridge then sends a message to the VTE server via the data packet network to inform the VTE server that the team member using VTE client (C)

has accepted the invitation (step 1472). The Accept message includes the session ID. In response, the VTE server instructs the VSP to set up a three-way voice communications session between the team members using VTE clients (A), (B) and (C) as described above with reference to FIGS. 28-28*b*, as shown at 1474. When the VSP reports that the calls have been created and that the team members using VTE clients (A), (B) and (C) have been connected to the conference bridge, the VTE server sends a notification at 1480 and 1484 to the respective VTE clients (A) and (B), which prompts the respective VTE clients to update the session display at steps 1482 and 1486. The VTE server likewise sends session information at 1490 to the VTE client (C) which permits the VTE client to build a communications session window at step 1492. The VTE server also sends a StatusEvent message to the VTE client (C) in step 1494 informing the VTE client (C) that the team member using VTE client (C) is a participant in the multi-media communications session, to permit the VTE client (C) to update the session display as shown at 1496. In the meantime, VTE client (A) uses the IP address provided in step 1480 to perform IP setup and content negotiation with the VTE client (C) at step 1498. The VTE client (B) likewise uses the IP address provided at step 1484 to perform IP setup and content negotiation with the VTE client (C) at step 1500. Data transfer between VTE client (A) and VTE client (C) ensues, as shown at 1502 and the VTE client (A) rebuilds the multi-media window as shown at 1504. Data transfer also ensues between VTE client (B) and VTE client (C) as shown at 1506. Thereafter, VTE client (B) rebuilds its multi-media window as shown at 1508 and the VTE client (C) builds a multi-media window for the multi-media session as shown at 1510. Multi-media communications then ensue between the team members using VTE clients (A), (B) and (C), as shown at 1512.

As will be understood by those skilled in the art, the exemplary message flows described above are not comprehensive and illustrate only a small part of the options and inherent flexibility of the VTE in accordance with the invention. The integration of text, voice, and multi-media communications facilities in a single, seamless virtual team environment 3 provides a powerful tool to facilitate collaboration in a way that closely simulates physical collocation of team members. Furthermore, flexible profile management and round-the-clock presence information tracking extend the virtual team environment 3 far beyond the reachability provided in a collocated work environment. The invention therefore provides a new standard for facilitation of collaboration for work teams or other interest groups.

The embodiment(s) of the invention described above is (are) intended to be exemplary only. The scope of the invention is therefore intended to be limited solely by the scope of the appended claims.

We claim:

1. A method for facilitating collaboration between geographically-dispersed members of a team, comprising:
   providing a collaboration services suite operative to:
      maintain information identifying each team member and respective communications devices associated with each team member, the respective communications devices of each team member including at least one communications device operative for communications over a first communications network, and at least one communications device operative for communications over a second communications network;
      obtain, from at least the first and second communications networks, information indicating an availability of each team member for communication using each of their respective communications devices; and
      to establish a communications session between two or more members of the team in response to a request from any one of the team members; and
   providing a team member interface operative to:
      display on a user terminal, for each team member, a respective indicator corresponding to each of the team member's associated communications devices and the information indicating the availability of each team member for communication using each of their respective communications devices; and
      enable a team member to request initiation by the collaboration services suite of a communications session with at least one other team member using a selected one of the communications devices associated with the other team member;
   wherein the first communications network is a data network, and the second communications network is a switched telephone network;
   wherein the communications session comprises a voice connection between first and second voice communications devices having respective unique extension numbers on an enterprise network connected to a Public Switch Telephone Network (PSTN) via a private branch exchange (PBX), and the collaboration services suite is operative to convert the communications session into a multi-party voice communications session by:
      sending a connection request message to the PBX to establish a third-party call connection between the first voice communications device on the enterprise network and a conference bridge;
      sending a connection request message to a virtual switching point in the PSTN to establish a call connection between an Enhanced Integrated Services Digital Network User Part (E-ISUP) trunk in the PSTN and a third voice communications device associated with the new party; and
      establishing a call connection between the E-ISUP trunk and the conference bridge to enable voice communications between each of the voice communications devices via the conference bridge.

2. A method as claimed in claim 1 wherein the team member interface displays only graphical information respecting other team member's communications devices, and team members initiate a communications session without requiring knowledge of a device type, device location or device address of a communications device associated with another team member with which a communications session is established by the collaboration services suite.

3. A method as claimed in claim 2 wherein the graphical information displayed by the team member interface is derived in part from an active profile for each team member.

4. A method as claimed in claim 3 wherein the graphical information displayed by the team member interface is derived in part from dynamic presence information obtained by determining the presence and state of communications devices specified in the active profile.

5. A method as claimed in claim 1 wherein the team member initiates the communications session by selecting a communications icon associated with a personal identifier that represents the at least one other team member.

6. A method as claimed in claim 5 wherein the team member opens a communications session initiation window by performing an activation operation using a pointing device, after selecting the communications icon.

7. A method as claimed in claim 5 wherein the communications session initiation window permits the team member to optionally enter a topic to be discussed during the communications session.

8. A method as claimed in claim 7 wherein the communications session initiation window further permits the team member to optionally enter a an invitation message related to the communications session.

9. A method as claimed in claim 7 wherein the communications session initiation window further permits the team member to attach meeting notes input during the communications session.

10. A method as claimed in claim 5 wherein a start communications session message is sent to the collaboration services suite when the team member performs a selection to begin the communications session.

11. A method as claimed in claim 10 wherein the message sent to the collaboration services suite is received by a connection manager that is operative to initiate the communications session in response to the message received from the team member.

12. A method as claimed in claim 11, wherein the message comprises at least one of:
 information indicative of a type of communications session to be initiated; and
 a personal identifier associated with the at least one other team member invited to join the communications session.

13. A method as claimed in claim 6, wherein selecting a communications device associated with the other team member is accomplished by selecting one of a plurality of communications icons using one or more of:
 information indicative of one of a voice, text or multimedia type of communications session; and
 preference information provided by the other team member and indicative of one or more preferred communications devices to be used for communications sessions.

14. A method as claimed in claim 1 wherein the team member initiates the communications session by opening a communications session initiation window, and dragging a personal identifier that represents the at least one other team member into a predetermined area of the window.

15. A method as claimed in claim 1, wherein the collaboration services suite maintains a session record including session information related to respective communications sessions.

16. A method as claimed in claim 15, wherein the session information comprises at least one of:
 a participant record identifying each team member participating in the communications session; and
 a topic of the communications session.

17. A method as claimed in claim 16, wherein the team member interface is operative to display at least a portion of the session information respecting each public communications session to every member of the team.

18. A method as claimed in claim 16, wherein the team member interface is operative to display at least a portion of the session information respecting a private communications session to only those members of the team who are participants in the private communications session.

19. A method as claimed in claim 15, wherein the team member interface is operative to enable a team member to interact with the collaboration services suite to mark the communications session as either one of a public and a private communications session.

20. A method as claimed in claim 15, wherein the respective session record is archived following completion of the communications session.

21. A method as claimed in claim 1, wherein the collaboration services suite is operative to facilitate exchange of text messages between team members participating in a communications session.

22. A method as claimed in claim 21, wherein the collaboration services suite is operative to:
 receive a text message from a party in a communications session; and
 forward the text message to the respective text communications device associated with each party to the communications session.

23. A method as claimed in claim 22, wherein the party information further comprises a class identification designating respective parties as one of a participant and a monitor of the communications session.

24. A method as claimed in claim 23, wherein the collaboration services suite is operative to forward to each party to the communication session any text message related to the communications session that is received from a participant in the communications session, and to discard any text message related to the communications session that is received from a monitor of the communications session.

25. A method as claimed in claim 22, wherein the collaboration services suite is further operative to enable a new party to join the communications session.

26. A method as claimed in claim 25, wherein, when the new party is a member of the team, the collaboration services suite is operative to enable the new party to join the communications session as either a monitor or a participant.

27. A method as claimed in claim 26, wherein, when the communications session is a public communications session, the team member interface is operative to enable a team member to join the public communications session as the new party, independently of an invitation from any existing party to the public communications session.

28. A method as claimed in claim 27, wherein, when the team member joins the public communications session as a participant, the collaboration services suite is operative to forward a an announcement to each of the parties to the public communications session to advertise of the presence of the new party.

29. A method as claimed in claim 25, wherein the collaboration services suite is operative to receive an add-message from an existing party to the communications session, the add message containing at least information identifying the new party, and to forward an invitation message to the identified new party inviting the new party to join the communications session.

30. A method as claimed in claim 29, wherein the invitation message comprises at least at one of:
 an identifier of the team member who sent the invitation;
 a topic of the communications session;
 a message related to the discussion;
 a list of participants in the communications session; and
 a list of invitees to the communications session.

31. A method as claimed in claim 29, wherein the team member interface is operative to enable the new party to send a response message to the collaboration services suite in response to the invitation.

32. A method as claimed in claim 31, wherein the response message comprises any one of:
 a decline message indicating that the new party wishes to decline the invitation;

a join message indicating that the new party wishes to join the communications session; and a deferral message indicating that the new party wishes to join the communications session at a later time.

33. A method as claimed in claim 32, wherein, when the response message is a decline message, the collaboration services suite is operative to forward an invitation declined message to the existing party from which the add-message was received.

34. A method as claimed in claim 32, wherein, when the response message is a join message, the collaboration services suite is operative to add the new party to the communications session and to notify each party to the communications session that the new party has joined the communications session.

35. A method as claimed in claim 32, wherein, when the response message is a deferral message, the collaboration services suite is operative to advise the existing parties to the communications session of the deferral.

36. A method as claimed in claim 32, wherein, when the response message is a join message, the collaboration services suite is operative to:

add party information identifying the new party to the session display; and notify each team member involved in the communications session that the new party has joined the communications session.

37. A method as claimed in claim 32 wherein, when the response message is a deferral message, the collaboration services suite is operative to forward the deferral message to the existing party from which the add-message was received.

38. A method as claimed in claim 1, wherein a session window of the team member interface displays for each public communications session at least one of:

a team identifier;

a discussion topic; and a personal identifier associated with each party to the communications session.

39. A method as claimed in claim 1, wherein a archive record is stored each time a communications session is terminated and the archive record comprises at least one of:

a communications session type;

a team identifier;

a discussion topic;

a personal identifier associated with each party to the communications session;

a session start and stop time;

a session identification number; and any text messages exchanged between the parties during the communications session.

40. A method as claimed in claim 39 wherein the personal identifier is a team member identifier if the party is a team member.

41. A method as claimed in claim 1, wherein the collaboration services suite is operative to track each communications session, and to store an address of a preferred text communications device associated with each team member that is a participant in the communications session, so that text messages associated with the communications session are forwarded to the preferred text communications device of each participant.

42. A method as claimed in claim 41, wherein the selected text communications device is selected using preference information provided by the respective team member to the collaboration services suite.

43. A method as claimed in claim 1 wherein communications session information displayed on the team member interface comprises at least one of:

an identifier associated with the team;

a personal identifier associated with each party participating in the communications session;

text information describing a session topic;

a record of one or more meeting notes entered by each party to the communications session; and a record of documents shared by the parties to the communications session.

44. A method as claimed in claim 43, wherein the session topic is defined by a team member at a time of initiation of the communications session.

45. A method as claimed in claim 44, wherein the voice communications session comprises a multi-party voice communications session between three or more voice communications devices respectively associated with three or more parties to the communications session.

46. A method as claimed in claim 45, wherein the collaboration services suite is operative to:

send a connection request message to the PBX to establish a two-party call connection between a first and second voice communications devices on the enterprise network;

send a connection request message to the PBX to establish a third-party call connection between the first voice communications device on the enterprise network and a conference bridge;

send a connection request message to a virtual switching point in the public switched telephone network (PSTN) to establish a call connection between an E-ISUP trunk of the PSTN and a third voice communications device associated with a respective third party to the communications session; and establish a call connection between the E-ISUP trunk and the conference bridge to enable voice communications between each of the first voice communications devices via the conference bridge.

47. A method as claimed in claim 1, wherein, and the collaboration services suite sends a connection request message to the PBX to establish a two-party call connection between the first and second voice communications devices within the enterprise network.

48. A method as claimed in claim 1, wherein, when the communications session is a public communications session, the team member interface is operative to enable a team member to join the public communications session as the new party, independently of an invitation from any existing party to the public communications session.

49. A method as claimed in claim 1, wherein the collaboration services suite is operative to:

receive an add-message from an existing party to the communications session, the add message containing at least information identifying the new party; and forward an invitation message to the identified new party.

50. A method as claimed in claim 1, wherein when each of the first and second voice communications devices have respective dial numbers (DNs) on the PSTN, and the existing two-party voice communications session comprises a voice connection between the first and second voice communications devices via respective first and second E-ISUP trunk, the collaboration services suite comprises a virtual switching point operative to:

release a call connection between the first E-ISUP trunk and the second E-ISUP trunk;

establish a call connection between the first E-ISUP trunk and a conference bridge;

establish a call connection between the second E-ISUP trunk and the conference bridge;

establish a call connection between a third E-ISUP trunk and a respective third voice communications device associated with the new party; and establish a call connection between the third E-ISUP trunk and the conference bridge.

51. A method as claimed in claim 1, wherein the collaboration services suite is operative to join the new party to the existing multi-party communications session.

52. A method as claimed in claim 51, wherein the collaboration services suite comprises a virtual switching point operative to:

establish a call connection between a respective E-ISUP trunk of the PSTN and the voice communications device associated with the new party; and establish a call connection between the E-ISUP trunk and the conference bridge to enable voice communications between the each of the voice communications devices via their respective E-ISUP trunk and the conference bridge.

* * * * *